US012707442B2

(12) United States Patent
Yu et al.

(10) Patent No.: US 12,707,442 B2
(45) Date of Patent: Aug. 11, 2026

(54) PPDU COMMUNICATION METHOD AND RELATED APPARATUS

(71) Applicant: HUAWEI TECHNOLOGIES CO., LTD., Shenzhen (CN)

(72) Inventors: Jian Yu, Shenzhen (CN); Mengshi Hu, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 580 days.

(21) Appl. No.: 18/148,671

(22) Filed: Dec. 30, 2022

(65) Prior Publication Data

US 2023/0137534 A1 May 4, 2023

Related U.S. Application Data

(63) Continuation of application No. PCT/CN2021/104045, filed on Jul. 1, 2021.

(30) Foreign Application Priority Data

Jul. 1, 2020 (CN) ........................ 202010625292.3

(51) Int. Cl.
*H04W 72/0453* (2023.01)
*H04L 1/1607* (2023.01)
(Continued)

(52) U.S. Cl.
CPC ....... *H04W 72/0453* (2013.01); *H04L 1/1642* (2013.01); *H04W 72/0446* (2013.01); *H04B 7/0626* (2013.01); *H04W 84/12* (2013.01)

(58) Field of Classification Search
CPC ............. H04W 72/0453; H04W 84/12; H04W 72/0457; H04W 88/06; H04W 74/004;
(Continued)

(56) References Cited

U.S. PATENT DOCUMENTS

2016/0066338 A1 3/2016 Kwon et al.
2017/0237532 A1 8/2017 Li et al.
(Continued)

FOREIGN PATENT DOCUMENTS

CN 106797295 A 5/2017
CN 108605367 A 9/2018
(Continued)

OTHER PUBLICATIONS

Liu et al., "On RU Allocation Singling in EHT-SIG," IEEE 802. 11-19/0578r0, Mar. 31, 2020, 14 pages.
(Continued)

*Primary Examiner* — Vinncelas Louis
(74) *Attorney, Agent, or Firm* — Fish & Richardson P.C.

(57) ABSTRACT

This application discloses communication methods and apparatuses. In an example method, a physical layer protocol data unit (PPDU) is generated and sent. The PPDU includes multiple resource unit allocation subfields. The multiple resource unit allocation subfields include a resource unit allocation subfield corresponding to a multiple resource unit (MRU) to indicate that a 242-tone resource unit (RU) corresponding to the resource unit allocation subfield belongs to the MRU. A number of resource unit allocation subfields corresponding to the MRU in a resource unit allocation subfield corresponding to each 80 MHz subblock in a bandwidth for transmitting the PPDU is for determining or indicating a type of the MRU. A station can determine, based on the number of resource unit allocation subfields corresponding to the MRU in the resource unit allocation subfield corresponding to each 80 MHz subblock, which type of MRU is included in the bandwidth for transmitting the PPDU.

15 Claims, 30 Drawing Sheets

(51) Int. Cl.
*H04W 72/0446* (2023.01)
*H04B 7/06* (2006.01)
*H04W 84/12* (2009.01)

(58) Field of Classification Search
CPC .... H04W 72/20; H04L 1/1642; H04L 5/0064; H04L 5/0044; H04L 5/0007; H04L 27/2602; H04L 5/0094; H04L 5/0058; H04B 7/0452
See application file for complete search history.

(56) References Cited

U.S. PATENT DOCUMENTS

| | | | | |
|---|---|---|---|---|
| 2018/0184429 | A1* | 6/2018 | Gan | H04W 72/20 |
| 2018/0248591 | A1 | 8/2018 | Geng et al. | |
| 2018/0255537 | A1 | 9/2018 | Park et al. | |
| 2019/0069298 | A1 | 2/2019 | Chen et al. | |
| 2020/0136773 | A1 | 4/2020 | Chen et al. | |
| 2021/0045151 | A1* | 2/2021 | Chen | H04W 74/004 |
| 2021/0282146 | A1* | 9/2021 | Kim | H04W 72/0453 |
| 2023/0232385 | A1* | 7/2023 | Huang | H04B 7/0452 370/329 |
| 2023/0344571 | A1* | 10/2023 | Huang | H04W 72/23 |

FOREIGN PATENT DOCUMENTS

| | | | |
|---|---|---|---|
| CN | 110768757 | A | 2/2020 |
| EP | 4132173 | A1 | 2/2023 |
| EP | 4142404 | A1 | 3/2023 |

OTHER PUBLICATIONS

Zheng et al., "Retransmission Number Aware Channel Access Scheme for IEEE 802.11ax Based WLAN," Chinese Journal of Electronics, vol. 29, No. 2, Mar. 2020, 10 pages.
Hu et al., "Multi-RU Indication in RU Allocation Subfield Follow up," IEEE 802.11-20/1623r1, Oct. 2020, 16 pages.
IEEE Std 802.11-2016, "IEEE Standard for Information technology—Telecommunications and information exchange between systems Local and metropolitan area networks—Specific requirements, Part 11: Wireless LAN Medium Access Control (MAC) and Physical Layer (PHY) Specifications," Dec. 7, 2016, 3534 pages.
Yu et al., "Multi-RU indication in RU allocation subfield," IEEE 802.11-20/0970r1, Jul. 2020, 24 pages.
Hu et al., "Multi-RU Indication in Trigger Frame," IEEE 802.11-20/0416r0, Mar. 2020, 14 pages.
IEEE P802.11ax/D6.0, "Draft Standard for Information technology—Tele-communications and information exchange between systems Local and metropolitan area networks—Specific requirements, Part 11: Wireless LAN Medium Access Control (MAC) and Physical Layer (PHY) Specifications," Nov. 2019, 780 pages.
Wu, "Discussions on Multi RU Aggregation," IEEE 802.11-20/0495r1, Mar. 2020, 14 pages.
International Search Report and Written Opinion in International Appln. No. PCT/CN2021/104045. mailed on Sep. 22, 2021, 18 pages (with English translation).
Hu et al., "Multi-RU Indication in Trigger Frame," IEEE 802.11-20/0416R0, Mar. 2020, pp. 1-14.
Wu, "Discussions on Multi RU Aggregation," IEEE 802.1120/0495r1, Mar. 2020, pp. 1-14.
Notice of Allowance in Australian Appln. No. 2021302193, mailed on May 30, 2024, 3 pages.
Kim et al., "RU Allocation Subfield Design for EHT Trigger Frame," IEEE 802.11-20/0828r0, May 26, 2020, 24 pages.
Lim et al., "Signaling of RU allocation follow-up," IEEE 802.11-20/798r3, Jun. 9, 2020, 22 pages.
Lim et al., "Management of RU allocation field," IEEE 802.11-20/0839r1, Jun. 1, 2020, 20 pages.
Extended European Search Report in European Appln No. 21833515.6, dated Nov. 27, 2023, 12 pages.
Lim et al., "Management of RU allocation field," IEEE 802.11-20/0839r0, Jun. 1, 2020, 21 pages.
Kim, "LB238 CID 20742, 20751," IEEE P802.11 Wireless LANs, IEEE 802.11-19/1530r0, Sep. 10, 2019, 10 pages.
Office Action in Japanese Appln. No. 2024-159200, mailed on Nov. 4, 2025, 9 pages (with English translation).

* cited by examiner

CONT. FROM FIG. 6F-1
Mode 6: (996+484)+(242+484), 2*4*8=64 cases
Mode 7: (996+484)+(484+242)+(484+242), 2*4*16=128 cases
Mode 8: (996+484)+(996+484), 4*4=16 cases
Mode 9: 3*996, 4 cases
Four out of four belong to an MRU
Two out of four belong to an MRU
Three out of four belong to an MRU
Zero out of four belong to an MRU
MRU
Non-MRU
TO FIG. 6F-3

CONT. FROM FIG. 6F-2

PPDU COMMUNICATION METHOD AND RELATED APPARATUS

CROSS-REFERENCE TO RELATED APPLICATIONS

This application is a continuation of International Application No. PCT/CN2021/104045, filed on Jul. 1, 2021, which claims priority to Chinese Patent Application No. 202010625292.3, filed on Jul. 1, 2020. The disclosures of the afore-mentioned applications are hereby incorporated by reference in their entireties.

TECHNICAL FIELD

This application relates to the field of mobile communication technologies, and in particular, to a PPDU communication method and a related apparatus.

BACKGROUND

With the development of a wireless local area network (wireless local area network, WLAN), an orthogonal frequency division multiple access (orthogonal frequency division multiple access, OFDMA) technology is newly introduced, and an entire bandwidth is divided into a plurality of resource units (resource units, RUs). In other words, frequency domain resources of users are not allocated by channel but are allocated by resource unit. For example, a 20 MHz channel may include a plurality of RUs, which may be a 26-tone RU, a 52-tone RU, and a 106-tone RU. tone indicates a number of subcarriers. In addition, the RU may alternatively be a 242-tone RU, a 484-tone RU, a 996-tone RU, or the like.

In 802.11ax, a channel bandwidth of a physical layer protocol data unit (PHY protocol data unit, PPDU) sent by an access point is allocated to a plurality of stations for data communication. A high efficient signal field (High Efficient Signal Field, HE-SIG-B) of the PPDU includes one or more resource unit allocation subfields, and a resource unit is allocated to an RU to which a frequency domain resource corresponding to the resource unit allocation subfield belongs and a number of user fields corresponding to the RU. It can be learned that an existing resource unit allocation subfield can support allocating only one RU to one or more users, but cannot support allocating a plurality of RUs to one or more users.

SUMMARY

This application provides a PPDU communication method, to indicate to allocate a plurality of RUs to one or more users.

According to a first aspect, a PPDU communication method is provided, and includes: generating a PPDU, where the PPDU includes a plurality of resource unit allocation subfields, the plurality of resource unit allocation subfields include a resource unit allocation subfield corresponding to an MRU, the resource unit allocation subfield corresponding to the MRU indicates that a 242-tone RU corresponding to the resource unit allocation subfield belongs to the MRU, and a number of resource unit allocation subfields corresponding to the MRU in a resource unit allocation subfield corresponding to each 80 MHz subblock in a plurality of 80 MHz subblocks in a bandwidth for transmitting the PPDU is for determining or indicating a type of the MRU; and sending the PPDU.

The bandwidth for transmitting the PPDU is greater than or equal to 80 MHz. The bandwidth includes one or more 80 MHz subblocks. For example, three 80 MHz subblocks are included when the bandwidth is 240 MHz, and four 80 MHz subblocks are included when the bandwidth is 320 MHz. In this way, a resource unit allocation subfield indication manner is simple, and a PPDU receiving apparatus can determine or indicate the type of the MRU based on the number of resource unit allocation subfields corresponding to the MRU in the resource unit allocation subfield corresponding to each 80 MHz subblock in the plurality of 80 MHz subblocks in the bandwidth for transmitting the PPDU. That the bandwidth for transmitting the PPDU is greater than or equal to 80 MHz can implement combination of a plurality of RUs into one MRU and allocation of the MRU to one or more users.

According to a second aspect, this application further provides a PPDU communication method, including: generating a PPDU, where the PPDU includes a plurality of resource unit allocation subfields, the plurality of resource unit allocation subfields include a resource unit allocation subfield indicating two first MRUs, a 240 MHz bandwidth to which the two first MRUs belong is consecutive 240 MHz in a bandwidth for transmitting the PPDU, and frequency locations, in the 240 MHz bandwidth, of a 996-tone RU and a 484-tone RU that form each of the first RUs are set according to a standard; and sending the PPDU. One first RU in the two first RUs is a 996+484-tone RU, and the other first RU is a 484-tone+996-tone RU.

For example, as specified in a communication standard, a 240 MHz bandwidth may include a 996-tone RU, a 484-tone RU, a 484-tone RU, and a 996-tone RU in an increasing absolute-frequency order. The lower-frequency 996-tone RU and 484-tone RU are combined into a 996+484-tone RU, and the higher-frequency 484-tone RU and 996-tone RU are combined into a 484+996-tone RU.

In this way, the communication standard specifies the frequency locations, in the 240 MHz bandwidth, of the 996-tone RU and the 484-tone RU that form each first MRU, and a PPDU receiving apparatus can accurately determine the frequency locations, in the 240 MHz bandwidth, of the 996-tone RU and the 484-tone RU that form each first MRU, thereby allocating an MRU obtained by combining a 996-tone RU and a 484-tone RU to one or more users. In addition, in such a solution, different combination cases do not need to be indicated by different indices of a resource unit allocation subfield, and a number of indices used for the resource unit allocation subfield to indicate a 996+484-tone RU and a 484+996-tone RU can be reduced.

According to a third aspect, this application further provides a PPDU communication method, including: generating a PPDU, where the PPDU includes a plurality of resource unit allocation subfields, the plurality of resource unit allocation subfields include a resource unit allocation subfield indicating a first MRU and a resource unit allocation subfield indicating a second MRU, and frequency locations, in a bandwidth for transmitting the PPDU, of a 996-tone RU and a 484-tone RU that form the first RU and a 2*996-tone RU and a 484-tone RU that form the second MRU are set according to a standard; and sending the PPDU.

For example, as specified in a communication standard, when a 320 MHz bandwidth includes a 2*996+484-tone RU and a 996+484-tone RU, the 320 MHz bandwidth includes a 2*996-tone RU, a 484-tone RU, a 484-tone RU, and a 996-tone RU in an increasing absolute-frequency order. That is, in an increasing frequency order, a 2*996-tone RU corresponding to the first 80 MHz subblock and the second 80 MHz subblock in the 320 MHz bandwidth and a 484-tone RU corresponding to the first 40 MHz subblock of the third 80 MHz subblock form the 2*996+484-tone RU, and a 484-tone RU corresponding to the second 40 MHz subblock of the third 80 MHz subblock and a 996-tone RU corresponding to the fourth 80 MHz subblock form the 996+484-tone RU.

For another example, as specified in a communication standard, when a 320 MHz bandwidth includes a 2*996-tone+484 RU and a 996+484-tone RU, the 320 MHz bandwidth includes a 996-tone RU, a 484-tone RU, a 484-tone RU, and a 2*996-tone RU in an increasing absolute-frequency order. That is, a 996-tone RU corresponding to the first 80 MHz subblock in the 320 MHz bandwidth and a 484-tone RU corresponding to the first 40 MHz subblock of the second 80 MHz subblock form the 996+484-tone RU, and a 484-tone RU corresponding to the second 40 MHz subblock of the second 80 MHz subblock and a 2*996-tone RU corresponding to the third 80 MHz subblock and the fourth 80 MHz subblock form the 996+484-tone RU.

In this way, the standard specifies the frequency locations, in the 320 MHz bandwidth, of the 996-tone RU and the 484-tone RU that form the first RU and the 2*996-tone RU and the 484-tone RU that form the second MRU. A PPDU receiving apparatus can accurately determine the frequency locations, in the 320 MHz bandwidth, of the 996-tone RU and the 484-tone RU that form the first RU and the 2*996-tone RU and the 484-tone RU that form the second MRU, thereby allocating an MRU obtained by combining a 2*996-tone RU and a 484-tone RU to one or more users. In addition, in such a solution, different combination cases do not need to be indicated by different indices of a resource unit allocation subfield, and a number of indices used for the resource unit allocation subfield to indicate a 2*996+484-tone RU and a 484+2*996-tone RU can be reduced.

According to a fourth aspect, this application further provides a PPDU communication method, including: generating a PPDU, where the PPDU includes a plurality of resource unit allocation subfields, the plurality of resource unit allocation subfields include a resource unit allocation subfield indicating a first MRU, the first MRU consists of a 996-tone RU and a 484-tone RU, and a frequency location of a 160 MHz subblock to which the first MRU belongs in a bandwidth for transmitting the PPDU is a frequency location that is set according to a standard or is a frequency location indicated by indication information sent by an AP; and sending the PPDU.

That is, a 996-tone RU and a 484-tone RU can be combined into an MRU only in an allowed 160 MHz subblock specified in a standard or in an allowed 160 MHz subblock indicated by the indication information sent by the AP.

For example, when the bandwidth is 240 MHz, the 996-tone RU and the 484-tone RU can be allowed to be combined into an MRU only in a primary 160 MHz subblock, or the AP sends the indication information to indicate that the 996-tone RU and the 484-tone RU are allowed to be combined into an MRU only in a primary 160 MHz subblock (a 160 MHz subblock including a primary 80 MHz subblock and a secondary 80 MHz subblock).

For another example, the bandwidth is 320 MHz, where 80 MHz is punctured. If one 80 MHz subblock of a primary 160 MHz subblock is punctured, a secondary 160 MHz subblock may be allowed to include a 996+484-tone RU or a 484+996-tone RU. If one 80 MHz subblock of a secondary 160 MHz subblock is punctured, a primary 160 MHz subblock may be allowed to include a 996+484-tone RU or a 484+996-tone RU.

In this way, a PPDU receiving apparatus can accurately determine that the 996+484-tone RU or the 484+996-tone RU includes a 996-tone RU and a 484-tone RU of which 160 MHz subblock, thereby allocating an MRU obtained by combining a 996-tone RU and a 484-tone RU to one or more users. In addition, in such a solution, different combination cases do not need to be indicated by different indices of a resource unit allocation subfield, and a number of indices used for the resource unit allocation subfield to indicate a 996+484-tone RU and a 484+996-tone RU can be reduced.

According to a fifth aspect, this application further provides a PPDU communication method, including: generating a PPDU, where the PPDU includes a plurality of resource unit allocation subfields, the plurality of resource unit allocation subfields include a resource unit allocation subfield indicating a first MRU, a bandwidth for transmitting the PPDU includes consecutive 240 MHz, the first MRU includes a 996-tone RU and a 484-tone RU in the 240 MHz bandwidth, the resource unit allocation subfield indicating the first MRU further indicates frequency locations of the 996-tone RU and the 484-tone RU in a 160 MHz subblock to which the first MRU belongs, and a resource unit allocation subfield indicating the first MRU in a resource unit allocation subfield corresponding to the lowest 80 MHz frequency and/or a resource unit allocation subfield corresponding to the highest 80 MHz frequency in the 240 MHz bandwidth is for determining or indicating frequency locations of the 996-tone RU and the 484-tone RU in the 240 MHz bandwidth; and sending the PPDU.

It should be understood that this solution may be applied to a scenario in which the 240 MHz bandwidth includes one first MRU, or may be applied to a scenario in which the 240 MHz bandwidth includes two first MRUs.

In an increasing frequency order, the 240 MHz bandwidth includes the first 80 MHz subblock, the second 80 MHz subblock, and the third 80 MHz subblock.

Optionally, the PPDU may further include a resource unit allocation subfield indication field, to indicate that the PPDU does not include a resource unit allocation subfield corresponding to the second 80 MHz subblock. The resource unit allocation subfield indication field may be, for example, a bitmap. Each bit in the bitmap corresponds to one 20 MHz subblock in the 240 MHz bandwidth, and indicates whether the PPDU includes a resource unit allocation subfield corresponding to the 20 MHz subblock. For example, the bitmap may be 111100001111, indicating that the PPDU does not include the resource unit allocation subfield corresponding to the second 80 MHz subblock.

In such a solution, when determining frequency locations of a 996-tone RU and a 484-tone RU that form a 996+484-tone RU or a 484+996-tone RU, a PPDU receiving apparatus skips a resource unit allocation subfield corresponding to the second lowest 80 MHz frequency in the 240 MHz bandwidth, and can accurately determine, based on the resource unit allocation subfield corresponding to the lowest 80 MHz frequency and/or the resource unit allocation subfield corresponding to the highest 80 MHz frequency, frequency locations, in the 240 MHz bandwidth, of the 996-tone RU and the 484-tone RU that form the 996+484-tone RU or the 484+996-tone RU, thereby allocating an MRU obtained by combining a 996-tone RU and a 484-tone RU to one or more users.

According to a sixth aspect, an embodiment of this application further provides a PPDU communication method, including: generating a PPDU, where the PPDU includes a plurality of resource unit allocation subfields, the plurality of resource unit allocation subfields include a resource unit allocation subfield indicating a first MRU, a bandwidth for transmitting the PPDU includes consecutive 240 MHz, the first MRU includes a 996-tone RU and a 484-tone RU in the 240 MHz bandwidth, the resource unit allocation subfield indicating the first MRU further indicates frequency locations of the 996-tone RU and the 484-tone RU in a 160 MHz subblock to which the first MRU belongs and a location of the 160 MHz subblock in the 240 MHz bandwidth, and a resource unit allocation subfield indicating the first MRU in a resource unit allocation subfield corresponding to the second lowest 80 MHz frequency in the 240 MHz bandwidth is for determining or indicating frequency locations of the 996-tone RU and the 484-tone RU in the 240 MHz bandwidth; and sending the PPDU.

In an increasing frequency order, the 240 MHz bandwidth includes the first 80 MHz subblock, the second 80 MHz subblock, and the third 80 MHz subblock. The second lowest 80 MHz frequency is the second 80 MHz subblock in the 240 MHz bandwidth.

The PPDU may include a resource unit allocation subfield corresponding to the first 80 MHz subblock and a resource unit allocation subfield corresponding to the third 80 MHz subblock, or may not include the resource unit allocation subfield corresponding to the first 80 MHz subblock and/or the resource unit allocation subfield corresponding to the third 80 MHz subblock.

In such a solution, when determining frequency locations of a 996-tone RU and a 484-tone RU that form a 996+484-tone RU or a 484+996-tone RU, a PPDU receiving apparatus can accurately determine, based on the resource unit allocation subfield corresponding to the second lowest 80 MHz frequency and/or a resource unit allocation subfield corresponding to the highest 80 MHz frequency, frequency locations, in the 240 MHz bandwidth, of the 996-tone RU and the 484-tone RU that form the 996+484-tone RU or the 484+996-tone RU, thereby allocating an MRU obtained by combining a 996-tone RU and a 484-tone RU to one or more users.

According to a seventh aspect, this application further provides a PPDU communication method, including: receiving a PPDU, where the PPDU includes a plurality of resource unit allocation subfields, the plurality of resource unit allocation subfields include a resource unit allocation subfield corresponding to an MRU, the resource unit allocation subfield corresponding to the MRU indicates that a 242-tone RU corresponding to the resource unit allocation subfield belongs to the MRU, and a number of resource unit allocation subfields corresponding to the MRU in a resource unit allocation subfield corresponding to each 80 MHz subblock in a plurality of 80 MHz subblocks in a bandwidth for transmitting the PPDU is for determining or indicating a type of the MRU; and parsing at least a part of resource unit allocation subfields in the plurality of resource unit allocation subfields, to determine RUs that form an MRU.

It may be understood that the MRU indicated by the resource unit allocation subfield is an MRU included in the bandwidth for transmitting the PPDU. Specifically, a station may determine, based on the number of resource unit allocation subfields corresponding to the MRU in the resource unit allocation subfield corresponding to each 80 MHz subblock in the plurality of 80 MHz subblocks in the bandwidth for transmitting the PPDU, which type of MRU is included in the bandwidth for transmitting the PPDU.

In this way, a resource unit allocation subfield indication manner is simple, and a PPDU receiving apparatus can determine, based on a resource unit allocation subfield, which type of MRU is included in the bandwidth for transmitting the PPDU. This can implement combination of a plurality of RUs into one MRU and allocation of the MRU to one or more users.

According to an eighth aspect, this application further provides a PPDU communication method, including: receiving a PPDU, where the PPDU includes a plurality of resource unit allocation subfields, the plurality of resource unit allocation subfields include a resource unit allocation subfield indicating two first MRUs, a 240 MHz bandwidth to which the two first MRUs belong is consecutive 240 MHz in a bandwidth for transmitting the PPDU, and frequency locations, in the 240 MHz bandwidth, of a 996-tone RU and a 484-tone RU that form each of the first RUs are set according to a standard; and parsing at least a part of resource unit allocation subfields in the plurality of resource unit allocation subfields, to determine RUs that form an MRU.

In such a solution, the communication standard specifies the frequency locations, in the 240 MHz bandwidth, of the 996-tone RU and the 484-tone RU that form each first MRU. A PPDU receiving apparatus can determine, based on the resource unit allocation subfield, that the bandwidth for transmitting the PPDU includes two first MRUs, and can accurately determine the frequency locations, in the 240 MHz bandwidth, of the 996-tone RU and the 484-tone RU that form each first MRU, thereby allocating an MRU obtained by combining a 996-tone RU and a 484-tone RU to one or more users. In addition, in such a solution, different combination cases do not need to be indicated by different indices of a resource unit allocation subfield, and a number of indices used for the resource unit allocation subfield to indicate a 996+484-tone RU and a 484+996-tone RU can be reduced.

According to a ninth aspect, this application further provides a PPDU communication method, including: receiving a PPDU, where the PPDU includes a plurality of resource unit allocation subfields, the plurality of resource unit allocation subfields include a resource unit allocation subfield indicating a first MRU and a resource unit allocation subfield indicating a second MRU, and frequency locations, in a bandwidth for transmitting the PPDU, of a 996-tone RU and a 484-tone RU that form the first RU and a 2*996-tone RU and a 484-tone RU that form the second MRU are set according to a standard; and parsing at least a part of resource unit allocation subfields in the plurality of resource unit allocation subfields, to determine RUs that form an MRU.

In such a solution, the standard specifies the frequency locations, in a 320 MHz bandwidth, of the 996-tone RU and the 484-tone RU that form the first RU and the 2*996-tone RU and the 484-tone RU that form the second MRU. A PPDU receiving apparatus can determine, based on the resource unit allocation subfields, that the bandwidth for transmitting the PPDU includes the first MRU and the second MRU, and can accurately determine the frequency locations, in the 320 MHz bandwidth, of the 996-tone RU and the 484-tone RU that form the first RU and the 2*996-tone RU and the 484-tone RU that form the second MRU, thereby allocating an MRU obtained by combining a 2*996-tone RU and a 484-tone RU to one or more users. In addition, in such a solution, different combination cases do not need to be indicated by different indices of a resource unit allocation subfield, and a number of indices used for the resource unit allocation subfield to indicate a 2*996+484-tone RU and a 484+2*996-tone RU can be reduced.

According to a tenth aspect, this application further provides a PPDU communication method, including: receiving a PPDU, where the PPDU includes a plurality of resource unit allocation subfields, the plurality of resource unit allocation subfields include a resource unit allocation subfield indicating a first MRU, the first MRU consists of a 996-tone RU and a 484-tone RU, and a frequency location of a 160 MHz subblock to which the first MRU belongs in a bandwidth for transmitting the PPDU is a frequency location that is set according to a standard or is a frequency location indicated by indication information sent by an AP; and parsing at least a part of resource unit allocation subfields in the plurality of resource unit allocation subfields, to determine RUs that form an MRU.

In this way, a PPDU receiving apparatus can determine, based on the resource unit allocation subfields, that the bandwidth for transmitting the PPDU includes an MRU including the 996-tone RU and the 484-tone RU, and can accurately determine that a 996+484-tone RU or a 484+996-tone RU includes a 996-tone RU and a 484-tone RU of which 160 MHz subblock, thereby allocating an MRU obtained by combining a 996-tone RU and a 484-tone RU to one or more users. In addition, in such a solution, different combination cases do not need to be indicated by different indices of a resource unit allocation subfield, and a number of indices used for the resource unit allocation subfield to indicate a 996+484-tone RU and a 484+996-tone RU can be reduced.

According to an eleventh aspect, this application further provides a PPDU communication method, including: receiving a PPDU, where the PPDU includes a plurality of resource unit allocation subfields, the plurality of resource unit allocation subfields include a resource unit allocation subfield indicating a first MRU, a bandwidth for transmitting the PPDU includes consecutive 240 MHz, the first MRU includes a 996-tone RU and a 484-tone RU in the 240 MHz bandwidth, the resource unit allocation subfield indicating the first MRU further indicates frequency locations of the 996-tone RU and the 484-tone RU in a 160 MHz subblock to which the first MRU belongs, and a resource unit allocation subfield indicating the first MRU in a resource unit allocation subfield corresponding to the lowest 80 MHz frequency and/or a resource unit allocation subfield corresponding to the highest 80 MHz frequency in the 240 MHz bandwidth is for determining or indicating frequency locations of the 996-tone RU and the 484-tone RU in the 240 MHz bandwidth; and parsing at least a part of resource unit allocation subfields in the plurality of resource unit allocation subfields, to determine RUs that form an MRU.

Specifically, a PPDU receiving apparatus can determine, based on the resource unit allocation subfield corresponding to the lowest 80 MHz frequency and the resource unit allocation field corresponding to the highest 80 MHz frequency, the frequency locations, in the 240 MHz bandwidth, of the 996-tone RU and the 484-tone RU that form the first MRU, that is, determine RUs at which frequency locations in the 240 MHz bandwidth the RUs that form the first MRU are.

It should be understood that this solution may be applied to a scenario in which the 240 MHz bandwidth includes one first MRU, or may be applied to a scenario in which the 240 MHz bandwidth includes two first MRUs.

In such a solution, when determining frequency locations of a 996-tone RU and a 484-tone RU that form a 996+484-tone RU or a 484+996-tone RU, a PPDU receiving apparatus skips a resource unit allocation subfield corresponding to the second lowest 80 MHz frequency in the 240 MHz bandwidth, and can accurately determine, based on the resource unit allocation subfield corresponding to the lowest 80 MHz frequency and/or the resource unit allocation subfield corresponding to the highest 80 MHz frequency, frequency locations, in the 240 MHz bandwidth, of the 996-tone RU and the 484-tone RU that form the 996+484-tone RU or the 484+996-tone RU, thereby allocating an MRU obtained by combining a 996-tone RU and a 484-tone RU to one or more users.

According to a twelfth aspect, this application further provides a PPDU communication method, including: receiving a PPDU, where the PPDU includes a plurality of resource unit allocation subfields, the plurality of resource unit allocation subfields include a resource unit allocation subfield indicating a first MRU, a bandwidth for transmitting the PPDU includes consecutive 240 MHz, the first MRU includes a 996-tone RU and a 484-tone RU in the 240 MHz bandwidth, the resource unit allocation subfield indicating the first MRU further indicates frequency locations of the 996-tone RU and the 484-tone RU in a 160 MHz subblock to which the first MRU belongs and a location of the 160 MHz subblock in the 240 MHz bandwidth, and a resource unit allocation subfield indicating the first MRU in a resource unit allocation subfield corresponding to the second lowest 80 MHz frequency in the 240 MHz bandwidth is for determining or indicating frequency locations of the 996-tone RU and the 484-tone RU in the 240 MHz bandwidth; and parsing at least a part of resource unit allocation subfields in the plurality of resource unit allocation subfields, to determine RUs that form an MRU.

Specifically, a PPDU receiving apparatus can determine, based on the resource unit allocation subfield corresponding to the second lowest 80 MHz frequency and a resource unit allocation field corresponding to the highest 80 MHz frequency, the frequency locations, in the 240 MHz bandwidth, of the 996-tone RU and the 484-tone RU that form the first MRU, that is, determine RUs at which frequency locations in the 240 MHz bandwidth the RUs that form the first MRU are.

It should be understood that this solution may be applied to a scenario in which the 240 MHz bandwidth includes one first MRU, or may be applied to a scenario in which the 240 MHz bandwidth includes two first MRUs.

In such a solution, when determining frequency locations of a 996-tone RU and a 484-tone RU that form a 996+484-tone RU or a 484+996-tone RU, a PPDU receiving apparatus can accurately determine, based on the resource unit allocation subfield corresponding to the second lowest 80 MHz frequency and/or a resource unit allocation subfield corresponding to the highest 80 MHz frequency, frequency locations, in the 240 MHz bandwidth, of the 996-tone RU and the 484-tone RU that form the 996+484-tone RU or the 484+996-tone RU, thereby allocating an MRU obtained by combining a 996-tone RU and a 484-tone RU to one or more users.

It should be understood that related supplementary descriptions of the methods in the first aspect to the sixth aspect are also applicable to the methods in the seventh aspect to the twelfth aspect.

The methods in the first aspect to the sixth aspect may be performed by a PPDU sending apparatus, and the methods in the seventh aspect to the twelfth aspect may be performed by a PPDU receiving apparatus.

The PPDU sending apparatus may be an access point, or may be a station. The PPDU receiving apparatus may be a station, or may be an access point.

According to a thirteenth aspect, a PPDU communication apparatus is provided, and includes:

a processing unit, configured to generate a PPDU, where the PPDU includes a plurality of resource unit allocation subfields, the plurality of resource unit allocation subfields include a resource unit allocation subfield corresponding to an MRU, the resource unit allocation subfield corresponding to the MRU indicates that a 242-tone RU corresponding to the resource unit allocation subfield belongs to the MRU, and a number of resource unit allocation subfields corresponding to the MRU in a resource unit allocation subfield corresponding to each 80 MHz subblock in a plurality of 80 MHz subblocks in a bandwidth for transmitting the PPDU is for determining or indicating a type of the MRU; and a sending unit, configured to send the PPDU.

The bandwidth for transmitting the PPDU is greater than or equal to 80 MHz. The bandwidth includes one or more 80 MHz subblocks. For example, three 80 MHz subblocks are included when the bandwidth is 240 MHz, four 80 MHz subblocks are included when the bandwidth is 320 MHz. In this way, a resource unit allocation subfield indication manner is simple, and a PPDU receiving device (for example, a station) can determine the type of the MRU based on the number of resource unit allocation subfields corresponding to the MRU in the resource unit allocation subfield corresponding to each 80 MHz subblock in the plurality of 80 MHz subblocks in the bandwidth for transmitting the PPDU. The bandwidth for transmitting the PPDU is greater than or equal to 80 MHz. This can implement combination of a plurality of RUs into one MRU and allocation of the MRU to one or more users.

According to a fourteenth aspect, this application further provides a PPDU communication apparatus, including:

a processing unit, configured to generate a PPDU, where the PPDU includes a plurality of resource unit allocation subfields, the plurality of resource unit allocation subfields include a resource unit allocation subfield indicating two first MRUs, a 240 MHz bandwidth to which the two first MRUs belong is consecutive 240 MHz in a bandwidth for transmitting the PPDU, and frequency locations, in the 240 MHz bandwidth, of a 996-tone RU and a 484-tone RU that form each of the first RUs are set according to a standard; and a sending unit, configured to send the PPDU.

In this way, the communication standard specifies the frequency locations, in the 240 MHz bandwidth, of the 996-tone RU and the 484-tone RU that form each first MRU. The communication apparatus can accurately determine the frequency locations, in the 240 MHz bandwidth, of the 996-tone RU and the 484-tone RU that form each first MRU, thereby allocating an MRU obtained by combining a 996-tone RU and a 484-tone RU to one or more users. In addition, in such a solution, different combination cases do not need to be indicated by different indices of a resource unit allocation subfield, and a number of indices used for the resource unit allocation subfield to indicate a 996+484-tone RU and a 484+996-tone RU can be reduced.

According to a fifteenth aspect, this application further provides a PPDU communication apparatus, including:

a processing unit, configured to generate a PPDU, where the PPDU includes a plurality of resource unit allocation subfields, the plurality of resource unit allocation subfields include a resource unit allocation subfield indicating a first MRU and a resource unit allocation subfield indicating a second MRU, and frequency locations, in a bandwidth for transmitting the PPDU, of a 996-tone RU and a 484-tone RU that form the first RU and a 2*996-tone RU and a 484-tone RU that form the second MRU are set according to a standard; and a sending unit, configured to send the PPDU.

In this way, the standard specifies frequency locations, in a 320 MHz bandwidth, of the 996-tone RU and the 484-tone RU that form the first RU and the 2*996-tone RU and the 484-tone RU that form the second MRU. The communication apparatus can accurately determine the frequency locations, in the 320 MHz bandwidth, of the 996-tone RU and the 484-tone RU that form the first RU and the 2*996-tone RU and the 484-tone RU that form the second MRU, thereby allocating an MRU obtained by combining a 2*996-tone RU and a 484-tone RU to one or more users. In addition, in such a solution, different combination cases do not need to be indicated by different indices of a resource unit allocation subfield, and a number of indices used for the resource unit allocation subfield to indicate a 2*996+484-tone RU and a 484+2*996-tone RU can be reduced.

According to a sixteenth aspect, this application further provides a PPDU communication apparatus, including:

a processing unit, configured to generate a PPDU, where the PPDU includes a plurality of resource unit allocation subfields, the plurality of resource unit allocation subfields include a resource unit allocation subfield indicating a first MRU, the first MRU consists of a 996-tone RU and a 484-tone RU, and a frequency location of a 160 MHz subblock to which the first MRU belongs in a bandwidth for transmitting the PPDU is a frequency location that is set according to a standard or is a frequency location indicated by indication information sent by an AP; and a sending unit, configured to send the PPDU.

That is, a 996-tone RU and a 484-tone RU can be combined into an MRU only in an allowed 160 MHz subblock specified in a standard or in an allowed 160 MHz subblock indicated by the indication information sent by the AP.

In this way, the communication apparatus can accurately determine that a 996+484-tone RU or a 484+996-tone RU includes a 996-tone RU and a 484-tone RU of which 160 MHz subblock, thereby allocating an MRU obtained by combining a 996-tone RU and a 484-tone RU to one or more users. In addition, in such a solution, different combination cases do not need to be indicated by different indices of a resource unit allocation subfield, and a number of indices used for the resource unit allocation subfield to indicate a 996+484-tone RU and a 484+996-tone RU can be reduced.

According to a seventeenth aspect, this application further provides a PPDU communication apparatus, including:

a processing unit, configured to generate a PPDU, where the PPDU includes a plurality of resource unit allocation subfields, the plurality of resource unit allocation subfields include a resource unit allocation subfield indicating a first MRU, a bandwidth for transmitting the PPDU includes consecutive 240 MHz, the first MRU includes a 996-tone RU and a 484-tone RU in the 240 MHz bandwidth, the resource unit allocation subfield indicating the first MRU further indicates frequency locations of the 996-tone RU and the 484-tone RU in a 160 MHz subblock to which the first MRU belongs, and a resource unit allocation subfield indicating the first MRU in a resource unit allocation subfield corresponding to the lowest 80 MHz frequency and/or a resource unit allocation subfield corresponding to the highest 80 MHz frequency in the 240 MHz bandwidth is for determining or indicating frequency locations of the 996-tone RU and the 484-tone RU in the 240 MHz bandwidth; and a sending unit, configured to send the PPDU.

It should be understood that this solution may be applied to a scenario in which the 240 MHz bandwidth includes one first MRU, or may be applied to a scenario in which the 240 MHz bandwidth includes two first MRUs.

In such a solution, when determining frequency locations of a 996-tone RU and a 484-tone RU that form a 996+484-tone RU or a 484+996-tone RU, the communication apparatus skips a resource unit allocation subfield corresponding to the second lowest 80 MHz frequency in the 240 MHz bandwidth, and can accurately determine, based on the resource unit allocation subfield corresponding to the lowest 80 MHz frequency and/or the resource unit allocation subfield corresponding to the highest 80 MHz frequency, frequency locations, in the 240 MHz bandwidth, of the 996-tone RU and the 484-tone RU that form the 996+484-tone RU or the 484+996-tone RU, thereby allocating an MRU obtained by combining a 996-tone RU and a 484-tone RU to one or more users.

Optionally, the PPDU may further include a resource unit allocation subfield indication field, to indicate that the PPDU does not include a resource unit allocation subfield corresponding to the second 80 MHz subblock. The resource unit allocation subfield indication field may be, for example, a bitmap. Each bit in the bitmap corresponds to one 20 MHz subblock in the 240 MHz bandwidth, and indicates whether the PPDU includes a resource unit allocation subfield corresponding to the 20 MHz subblock. For example, the bitmap may be 111100001111, indicating that the PPDU does not include the resource unit allocation subfield corresponding to the second 80 MHz subblock.

According to an eighteenth aspect, an embodiment of this application further provides a PPDU communication apparatus, including:

a processing unit, configured to generate a PPDU, where the PPDU includes a plurality of resource unit allocation subfields, the plurality of resource unit allocation subfields include a resource unit allocation subfield indicating a first MRU, a bandwidth for transmitting the PPDU includes consecutive 240 MHz, the first MRU includes a 996-tone RU and a 484-tone RU in the 240 MHz bandwidth, the resource unit allocation subfield indicating the first MRU further indicates frequency locations of the 996-tone RU and the 484-tone RU in a 160 MHz subblock to which the first MRU belongs and a location of the 160 MHz subblock in the 240 MHz bandwidth, and a resource unit allocation subfield indicating the first MRU in a resource unit allocation subfield corresponding to the second lowest 80 MHz frequency in the 240 MHz bandwidth is for determining or indicating frequency locations of the 996-tone RU and the 484-tone RU in the 240 MHz bandwidth; and a sending unit, configured to send the PPDU.

In such a solution, when determining frequency locations of a 996-tone RU and a 484-tone RU that form a 996+484-tone RU or a 484+996-tone RU, the communication apparatus can accurately determine, based on the resource unit allocation subfield corresponding to the second lowest 80 MHz frequency and/or a resource unit allocation subfield corresponding to the highest 80 MHz frequency, frequency locations, in the 240 MHz bandwidth, of the 996-tone RU and the 484-tone RU that form the 996+484-tone RU or the 484+996-tone RU, thereby allocating an MRU obtained by combining a 996-tone RU and a 484-tone RU to one or more users.

According to a nineteenth aspect, this application further provides a PPDU communication apparatus, including:

a receiving unit, configured to receive a PPDU, where the PPDU includes a plurality of resource unit allocation subfields, the plurality of resource unit allocation subfields include a resource unit allocation subfield corresponding to an MRU, the resource unit allocation subfield corresponding to the MRU indicates that a 242-tone RU corresponding to the resource unit allocation subfield belongs to the MRU, and a number of resource unit allocation subfields corresponding to the MRU in a resource unit allocation subfield corresponding to each 80 MHz subblock in a plurality of 80 MHz subblocks in a bandwidth for transmitting the PPDU is for determining a type of the MRU; and a processing unit, configured to parse at least a part of resource unit allocation subfields in the plurality of resource unit allocation subfields, to determine RUs that form an MRU.

It may be understood that the MRU indicated by the resource unit allocation subfield is an MRU included in the bandwidth for transmitting the PPDU. Specifically, the communication apparatus may determine, based on the number of resource unit allocation subfields corresponding to the MRU in the resource unit allocation subfield corresponding to each 80 MHz subblock in the plurality of 80 MHz subblocks in the bandwidth for transmitting the PPDU, which type of MRU is included in the bandwidth for transmitting the PPDU.

In this way, a resource unit allocation subfield indication manner is simple, and the communication apparatus can determine, based on a resource unit allocation subfield, which type of MRU is included in the bandwidth for transmitting the PPDU. This can implement combination of a plurality of RUs into one MRU and allocation of the MRU to one or more users.

According to a twentieth aspect, this application further provides a PPDU communication apparatus, including:

a receiving unit, configured to receive a PPDU, where the PPDU includes a plurality of resource unit allocation subfields, the plurality of resource unit allocation subfields include a resource unit allocation subfield indicating two first MRUs, a 240 MHz bandwidth to which the two first MRUs belong is consecutive 240 MHz in a bandwidth for transmitting the PPDU, and frequency locations, in the 240 MHz bandwidth, of a 996-tone RU and a 484-tone RU that form each of the first RUs are set according to a standard; and a processing unit, configured to parse at least a part of resource unit allocation subfields in the plurality of resource unit allocation subfields, to determine RUs that form an MRU.

In such a solution, the communication standard specifies the frequency locations, in the 240 MHz bandwidth, of the 996-tone RU and the 484-tone RU that form each first MRU. The communication apparatus can determine, based on the resource unit allocation subfield, that the bandwidth for transmitting the PPDU includes two first MRUs, and can accurately determine the frequency locations, in the 240 MHz bandwidth, of the 996-tone RU and the 484-tone RU that form each first MRU, thereby allocating an MRU obtained by combining a 996-tone RU and a 484-tone RU to one or more users. In addition, in such a solution, different combination cases do not need to be indicated by different indices of a resource unit allocation subfield, and a number of indices used for the resource unit allocation subfield to indicate a 996+484-tone RU and a 484+996-tone RU can be reduced.

According to a twenty-first aspect, this application further provides a PPDU communication apparatus, including:

a receiving unit, configured to receive a PPDU, where the PPDU includes a plurality of resource unit allocation subfields, the plurality of resource unit allocation subfields include a resource unit allocation subfield indicating a first MRU and a resource unit allocation subfield indicating a second MRU, and frequency locations, in a bandwidth for transmitting the PPDU, of a 996-tone RU and a 484-tone RU that form the first RU and a 2*996-tone RU and a 484-tone RU that form the second MRU are set according to a standard; and a processing unit, configured to parse at least a part of resource unit allocation subfields in the plurality of resource unit allocation subfields, to determine RUs that form an MRU.

In such a solution, the standard specifies the frequency locations, in a 320 MHz bandwidth, of the 996-tone RU and the 484-tone RU that form the first RU and the 2*996-tone RU and the 484-tone RU that form the second MRU. The communication apparatus can determine, based on the resource unit allocation subfields, that the bandwidth for transmitting the PPDU includes the first MRU and the second MRU, and can accurately determine the frequency locations, in the 320 MHz bandwidth, of the 996-tone RU and the 484-tone RU that form the first RU and the 2*996-tone RU and the 484-tone RU that form the second MRU, thereby allocating an MRU obtained by combining a 2*996-tone RU and a 484-tone RU to one or more users. In addition, in such a solution, different combination cases do not need to be indicated by different indices of a resource unit allocation subfield, and a number of indices used for the resource unit allocation subfield to indicate a 2*996+484-tone RU and a 484+2*996-tone RU can be reduced.

According to a twenty-second aspect, this application further provides a PPDU communication apparatus, including:

a receiving unit, configured to receive a PPDU, where the PPDU includes a plurality of resource unit allocation subfields, the plurality of resource unit allocation subfields include a resource unit allocation subfield indicating a first MRU, the first MRU consists of a 996-tone RU and a 484-tone RU, and a frequency location of a 160 MHz subblock to which the first MRU belongs in a bandwidth for transmitting the PPDU is a frequency location that is set according to a standard or is a frequency location indicated by indication information sent by an AP; and a processing unit, configured to parse at least a part of resource unit allocation subfields in the plurality of resource unit allocation subfields, to determine RUs that form an MRU.

In this way, the communication apparatus can determine, based on the resource unit allocation subfields, that the bandwidth for transmitting the PPDU includes an MRU including the 996-tone RU and the 484-tone RU, and can accurately determine that a 996+484-tone RU or a 484+996-tone RU includes a 996-tone RU and a 484-tone RU of which 160 MHz subblock, thereby allocating an MRU obtained by combining a 996-tone RU and a 484-tone RU to one or more users. In addition, in such a solution, different combination cases do not need to be indicated by different indices of a resource unit allocation subfield, and a number of indices used for the resource unit allocation subfield to indicate a 996+484-tone RU and a 484+996-tone RU can be reduced.

According to a twenty-third aspect, this application further provides a PPDU communication apparatus, including:

a receiving unit, configured to receive a PPDU, where the PPDU includes a plurality of resource unit allocation subfields, the plurality of resource unit allocation subfields include a resource unit allocation subfield indicating a first MRU, a bandwidth for transmitting the PPDU includes consecutive 240 MHz, the first MRU includes a 996-tone RU and a 484-tone RU in the 240 MHz bandwidth, the resource unit allocation subfield indicating the first MRU further indicates frequency locations of the 996-tone RU and the 484-tone RU in a 160 MHz subblock to which the first MRU belongs, and a resource unit allocation subfield indicating the first MRU in a resource unit allocation subfield corresponding to the lowest 80 MHz frequency and/or a resource unit allocation subfield corresponding to the highest 80 MHz frequency in the 240 MHz bandwidth is for determining or indicating frequency locations of the 996-tone RU and the 484-tone RU in the 240 MHz bandwidth; and a processing unit, configured to parse at least a part of resource unit allocation subfields in the plurality of resource unit allocation subfields, to determine RUs that form an MRU.

Specifically, the processing unit of the communication apparatus can determine, based on the resource unit allocation subfield corresponding to the lowest 80 MHz frequency and the resource unit allocation field corresponding to the highest 80 MHz frequency, the frequency locations, in the 240 MHz bandwidth, of the 996-tone RU and the 484-tone RU that form the first MRU, that is, determine RUs at which frequency locations in the 240 MHz bandwidth the RUs that form the first MRU are.

It should be understood that this solution may be applied to a scenario in which the 240 MHz bandwidth includes one first MRU, or may be applied to a scenario in which the 240 MHz bandwidth includes two first MRUs.

In such a solution, when determining frequency locations of a 996-tone RU and a 484-tone RU that form a 996+484-tone RU or a 484+996-tone RU, the communication apparatus skips a resource unit allocation subfield corresponding to the second lowest 80 MHz frequency in the 240 MHz bandwidth, and can accurately determine, based on the resource unit allocation subfield corresponding to the lowest 80 MHz frequency and/or the resource unit allocation subfield corresponding to the highest 80 MHz frequency, frequency locations, in the 240 MHz bandwidth, of the 996-tone RU and the 484-tone RU that form the 996+484-tone RU or the 484+996-tone RU, thereby allocating an MRU obtained by combining a 996-tone RU and a 484-tone RU to one or more users.

According to a twenty-fourth aspect, this application further provides a PPDU communication apparatus, including:

a receiving unit, configured to receive a PPDU, where the PPDU includes a plurality of resource unit allocation subfields, the plurality of resource unit allocation subfields include a resource unit allocation subfield indicating a first MRU, a bandwidth for transmitting the PPDU includes consecutive 240 MHz, the first MRU includes a 996-tone RU and a 484-tone RU in the 240 MHz bandwidth, the resource unit allocation subfield indicating the first MRU further indicates frequency locations of the 996-tone RU and the 484-tone RU in a 160 MHz subblock to which the first MRU belongs and a location of the 160 MHz subblock in the 240 MHz bandwidth, and a resource unit allocation subfield indicating the first MRU in a resource unit allocation subfield corresponding to the second lowest 80 MHz frequency in the 240 MHz bandwidth is for determining or indicating frequency locations of the 996-tone RU and the 484-tone RU in the 240 MHz bandwidth; and a processing unit, configured to parse at least a part of resource unit allocation subfields in the plurality of resource unit allocation subfields, to determine RUs that form an MRU.

Specifically, the communication apparatus can determine, based on the resource unit allocation subfield corresponding to the second lowest 80 MHz frequency and a resource unit allocation field corresponding to the highest 80 MHz frequency, the frequency locations, in the 240 MHz bandwidth, of the 996-tone RU and the 484-tone RU that form the first MRU, that is, determine RUs at which frequency locations in the 240 MHz bandwidth the RUs that form the first MRU are.

It should be understood that this solution may be applied to a scenario in which the 240 MHz bandwidth includes one first MRU, or may be applied to a scenario in which the 240 MHz bandwidth includes two first MRUs.

In such a solution, when determining frequency locations of a 996-tone RU and a 484-tone RU that form a 996+484-tone RU or a 484+996-tone RU, the communication apparatus can accurately determine, based on the resource unit allocation subfield corresponding to the second lowest 80 MHz frequency and/or a resource unit allocation subfield corresponding to the highest 80 MHz frequency, frequency locations, in the 240 MHz bandwidth, of the 996-tone RU and the 484-tone RU that form the 996+484-tone RU or the 484+996-tone RU, thereby allocating an MRU obtained by combining a 996-tone RU and a 484-tone RU to one or more users.

It should be understood that the communication apparatuses in the thirteenth aspect to the eighteenth aspect are PPDU sending apparatuses, and the communication apparatuses in the nineteenth aspect to the twenty-fourth aspect are PPDU receiving apparatuses. The PPDU transmitting end may be an access point, or may be a station. The PPDU receiving end may be an access point, or may be a station.

Related supplementary descriptions of the communication methods in the first aspect to the twelfth aspect are also applicable to the communication apparatuses in the thirteenth aspect to the twenty-fourth aspect.

According to a twenty-fifth aspect, an implementation of this application further provides a communication apparatus, configured to transmit a PPDU. The communication apparatus may include a processor, a transceiver, and optionally further include a memory. When the processor executes a computer program or instructions in the memory, the method according to any one of the implementations of the first aspect to the twelfth aspect is performed.

According to a twenty-sixth aspect, an implementation of this application further provides a computer-readable storage medium. The computer-readable storage medium stores instructions, and the instructions indicate a communication apparatus to perform the method according to any one of the implementations of the first aspect to the twelfth aspect.

According to a twenty-seventh aspect, an implementation of this application further provides a computer program product. The computer program product includes a computer program. When the computer program is run on a computer, the computer is enabled to perform the method according to any one of the implementations of the first aspect to the twelfth aspect.

According to a twenty-eighth aspect, this application further provides a processor, configured to perform the method according to any one of the implementations of the first aspect to the twelfth aspect. In a process of performing these methods, a process of sending the foregoing information and a process of receiving the foregoing information in the foregoing methods may be understood as a process of outputting the foregoing information by the processor and a process of receiving the foregoing input information by the processor. Specifically, when outputting the information, the processor outputs the information to a transceiver, so that the transceiver transmits the information. Still further, after the information is output by the processor, other processing may further need to be performed on the information before the information arrives at the transceiver. Similarly, when the processor receives the input information, the transceiver receives the information and inputs the information into the processor. Still further, after the transceiver receives the information, other processing may need to be performed on the information before the information is input into the processor.

In this case, for operations such as communication, sending, and receiving related to the processor, if there is no particular statement, or if the operations do not contradict an actual function or internal logic of the operations in related descriptions, the operations may be more generally understood as operations such as input, receiving, and output of the processor, instead of operations such as communication, sending, and receiving directly performed by a radio frequency circuit and an antenna.

In a specific implementation process, the processor may be a processor specially configured to perform these methods, or a processor, for example, a general purpose processor, configured to execute a computer instruction in a memory to perform these methods. The memory may be a non-transitory memory such as a read-only memory (read only memory, ROM). The memory and the processor may be integrated on a same chip, or may be separately disposed on different chips. A type of the memory and a manner of disposing the memory and the processor are not limited in the embodiments of the present invention.

According to a twenty-ninth aspect, this application provides a chip system. The chip system includes a processor and an interface, configured to support a communication communication device in implementing a function in the method according to any one of the first aspect to the eighth aspect, for example, determining or processing at least one of data and information involved in the foregoing method. In a possible design, the chip system further includes a memory, and the memory is configured to store information and data that are necessary for the foregoing communication apparatus. The chip system may include a chip, or may include the chip and another discrete component.

According to a thirtieth aspect, this application provides a functional entity. The functional entity is configured to implement the method according to any one of the first aspect to the eighth aspect.

BRIEF DESCRIPTION OF DRAWINGS

FIG. 6F-1 to FIG. 6F-3 are a schematic scenario diagram of MRU combination cases included in 320 MHz;

DESCRIPTION OF EMBODIMENTS

To make the objectives, technical solutions and advantages of embodiments of this application clearer, the following further describes the embodiments of this application in detail with reference to the accompanying drawings.

Embodiments of this application may be applied to a wireless local area network (wireless local area network, WLAN) scenario, and may be applied to an IEEE 802.11 system standard, for example, the IEEE 802.11be standard, or a next-generation standard or a further next-generation standard. Alternatively, embodiments of this application may be applied to a wireless local area network system, for example, an internet of things (internet of things, IoT) or a vehicle-to-everything (Vehicle to X, V2X) network. Certainly, embodiments of this application may be further applied to other possible communication systems, for example, a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communication system, and a future 5G communication system.

Figure 1:
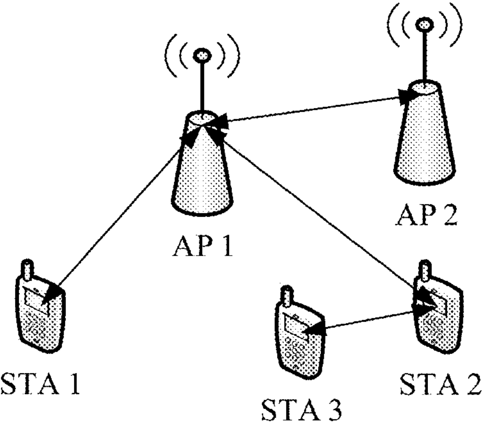
FIG. 1 is a schematic diagram of a network structure according to an embodiment of this application.

For example, FIG. 1 shows a network structure to which the PPDU communication method in this application is applicable. FIG. 1 is a schematic diagram of a network structure according to an embodiment of this application.

The network structure may include one or more access point (access point, AP) stations and one or more non-access point stations (non access point stations, non-AP STAs). For ease of description, an access point station is referred to as an access point (AP), and a non-access point station is referred to as a station (STA) in this specification. The APs are, for example, AP1 and AP2 in FIG. 1, and the STAs are, for example, STA1, STA2, and STA3 in FIG. 1.

The access point may be an access point used by a terminal device (such as a mobile phone) to access a wired (or wireless) network, and is mainly deployed at home, in a building, and in a park. A typical coverage radius is tens of meters to 100-odd meters. Certainly, the access point may also be deployed outdoors. The access point is equivalent to a bridge that connects a wired network and a wireless network. A main function of the access point is to connect various wireless network clients together and then connect the wireless network to an Ethernet. Specifically, the access point may be a terminal device (such as a mobile phone) or a network device (such as a router) with a wireless fidelity (wireless fidelity, Wi-Fi) chip. The access point may be a device that supports the 802.11be standard. Alternatively, the access point may be a device that supports a plurality of wireless local area network (wireless local area network, WLAN) standards of the 802.11 family such as 802.11be, 802.11ax, 802.11ac, 802.11n, 802.11g, 802.11b, and 802.11a. The access point in this application may be a high efficient (high efficiency, HE) AP or an extremely high throughput (extremely high throughput, EHT) AP, or may be an access point applicable to a future Wi-Fi standard.

The access point may include a processor and a transceiver. The processor is configured to control and manage an action of the access point, and the transceiver is configured to receive or send information.

The station may be a wireless communication chip, a wireless sensor, a wireless communication terminal, or the like, and may be referred to as a user. For example, the station may be a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communications device supporting a Wi-Fi communication function, or a computer supporting a Wi-Fi communication function. Optionally, the station may support the 802.11be standard. The station may further support a plurality of wireless local area network (wireless local area network, WLAN) standards of the 802.11 family such as 802.11be, 802.11ax, 802.11ac, 802.11n, 802.11g, 802.11b, and 802.11a.

The station may include a processor and a transceiver. The processor is configured to control and manage an action of the access point, and the transceiver is configured to receive or send information.

The access point in this application may be a high efficient (high efficiency, HE) STA or an extremely high throughput (extremely high throughput, EHT) STA, or may be a STA applicable to a future Wi-Fi standard.

For example, the access point and the station may be devices applied to the internet of vehicles, internet of things nodes or sensors on the internet of things (IoT, internet of things), smart cameras, smart remote controls, and smart water meters in a smart home, and sensors in a smart city.

The access point and the station in embodiments of this application may also be collectively referred to as a communication apparatus. The communication apparatus may include a hardware structure and a software module, and the foregoing functions are implemented in a form of a hardware structure, a software module, or a combination of the hardware structure and the software module. A function in the foregoing functions may be implemented in a form of a hardware structure, a software module, or a combination of the hardware structure and the software module.

Figure 2:
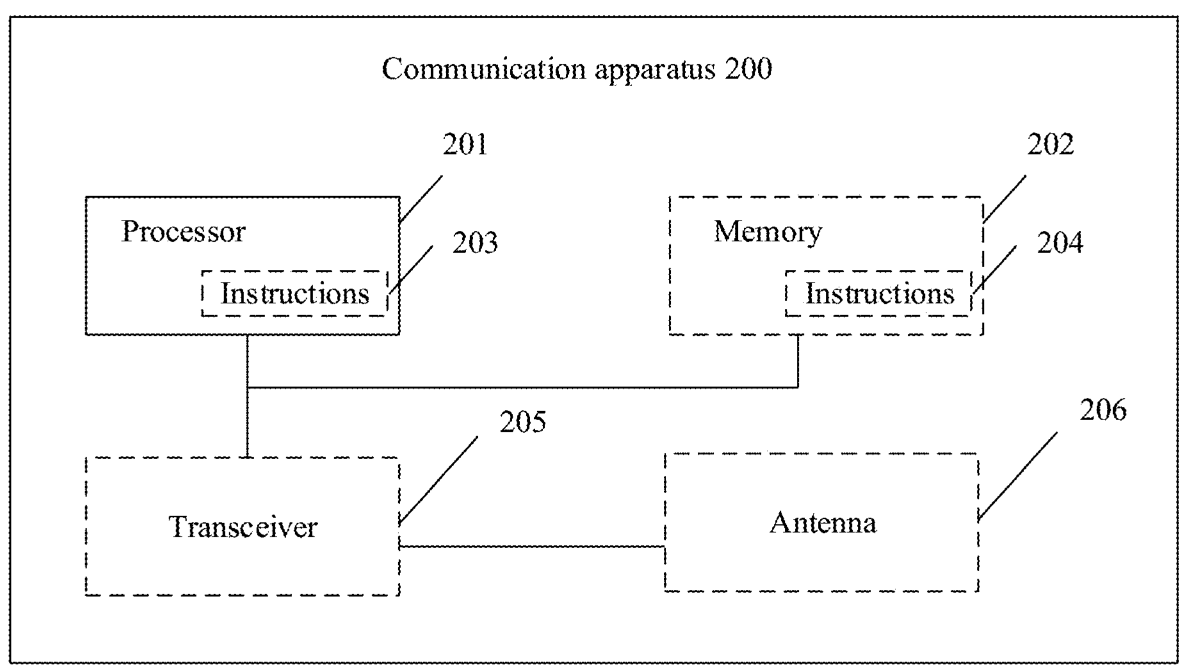
FIG. 2 is a schematic diagram of a structure of a communication apparatus according to an embodiment of this application.

FIG. 2 is a schematic diagram of a structure of a communication apparatus according to an embodiment of this application. As shown in FIG. 2, the communication apparatus 200 may include a processor 201 and a transceiver 205, and optionally further include a memory 202.

The transceiver 205 may be referred to as a transceiver unit, a transceiver machine, a transceiver circuit, or the like, and is configured to implement a transceiver function. The transceiver 205 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function.

The memory 202 may store a computer program, software code, or instructions 204, where the computer program, the software code, or the instructions 204 may further be referred to as firmware. The processor 201 may control a MAC layer and a PHY layer by running a computer program, software code, or instructions 203 in the processor 201, or by invoking the computer program, the software code, or the instructions 204 stored in the memory 202, to implement a PPDU communication method provided in the following embodiments of this application. The processor 201 may be a central processing unit (central processing unit, CPU), and the memory 202 may be, for example, a read-only memory (read-only memory, ROM), or a random access memory (random access memory, RAM).

The processor 201 and the transceiver 205 described in this application may be implemented in an integrated circuit (integrated circuit, IC), an analog IC, a radio frequency integrated circuit RFIC, a mixed-signal IC, an application-specific integrated circuit (application-specific integrated circuit, ASIC), a printed circuit board (printed circuit board, PCB), an electronic device, or the like.

The communication apparatus 200 may further include an antenna 206. The modules included in the communication apparatus 200 are merely examples for description, and are not limited in this application.

As described above, the communication apparatus 200 described in the foregoing embodiment may be an access point or a station. However, the scope of the communication apparatus described in this application is not limited thereto, and the structure of the communication apparatus may not be limited in FIG. 2. The communication apparatus may be an independent device or may be a part of a relatively large device. For example, the communication apparatus may be implemented in the following form:

(1) an independent integrated circuit (IC), a chip, a chip system, or a subsystem; (2) a set including one or more ICs, where optionally, the set of ICs may also include a storage component for storing data and instructions; (3) a module that can be embedded in other devices; (4) a receiver, an intelligent terminal, a wireless device, a handheld device, a mobile unit, a vehicle-mounted device, a cloud device, an artificial intelligence device, or the like; or (5) others.

Figure 3:
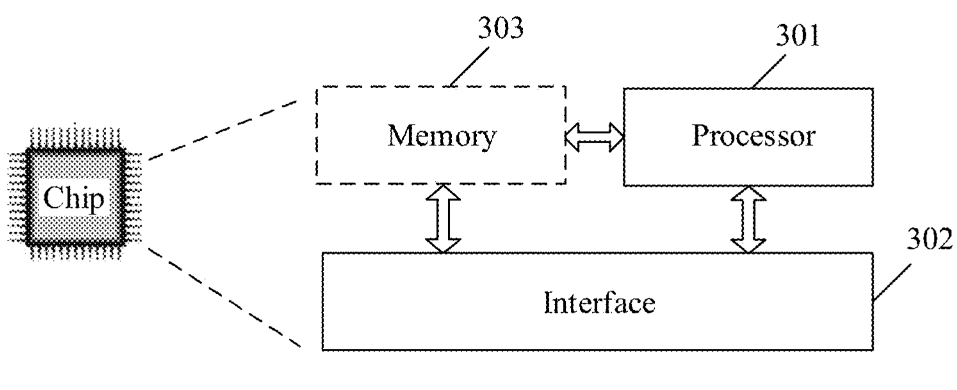
FIG. 3 is a schematic diagram of a structure of a chip or a chip system according to an embodiment of this application.

For the communication apparatus implemented in the form of the chip or the chip system, refer to a schematic diagram of a structure of a chip or a chip system shown in FIG. 3. The chip or the chip system shown in FIG. 3 includes a processor 301 and an interface 302. There may be one or more processors 301, and there may be a plurality of interfaces 302. Optionally, the chip or the chip system may include a memory 303.

Embodiments of this application do not limit the protection scope and applicability of the claims. A person skilled in the art may adaptively change functions and deployments of elements in this application, or omit, replace, or add various processes or components as appropriate without departing from the scope of the embodiments of this application.

The AP communicates with the STA. The AP may allocate a resource to the STA. The STA performs data communication on the allocated resource. For example, an orthogonal frequency division multiple access (orthogonal frequency division multiple access, OFDMA) technology or a multi-user multiple-input multiple-output (multi-users multiple-input multiple-output, MU-MIMO) technology may be used for wireless communication between the AP and the STA. In an OFDMA communication scenario, a spectrum bandwidth is divided into several resource units (resource units, RUs) according to the WLAN protocol. For example, bandwidth configurations supported by the 802.11ax protocol include 20 MHz, 40 MHz, 80 MHz, 160 MHz, and 80+80 MHz. A difference between 160 MHz and 80+80 MHz lies in that the former is a consecutive frequency band, and two 80 MHz subblocks of the latter may be separated, that is, a 160 MHz subblock formed by 80+80 MHz is non-consecutive.

The 802.11ax standard supports a maximum bandwidth of 160 MHz. As specified in the 802.11ax standard, for 20 MHz, 40 MHz, 80 MHz, and 160 MHz, a spectrum bandwidth may be divided into a plurality of types of RUs, and the RUs may be a 26-tone RU, a 52-tone RU, and a 106-tone RU. These RUs are generally referred to as small RUs. A tone represents a subcarrier. For example, the 26-tone RU represents an RU including 26 subcarriers, and the 26-tone RU may be allocated to one user for use. In addition, sizes of the RUs may alternatively be 242-tone, 484-tone, 996-tone, or the like, and these RUs are generally referred to as large RUs. Generally, an RU whose size is greater than or equal to 106-tone can be allocated to one or more users. In 802.11be, a plurality of RUs can be allocated to one user, and the user in this application may be understood as a STA.

Figure 4A:
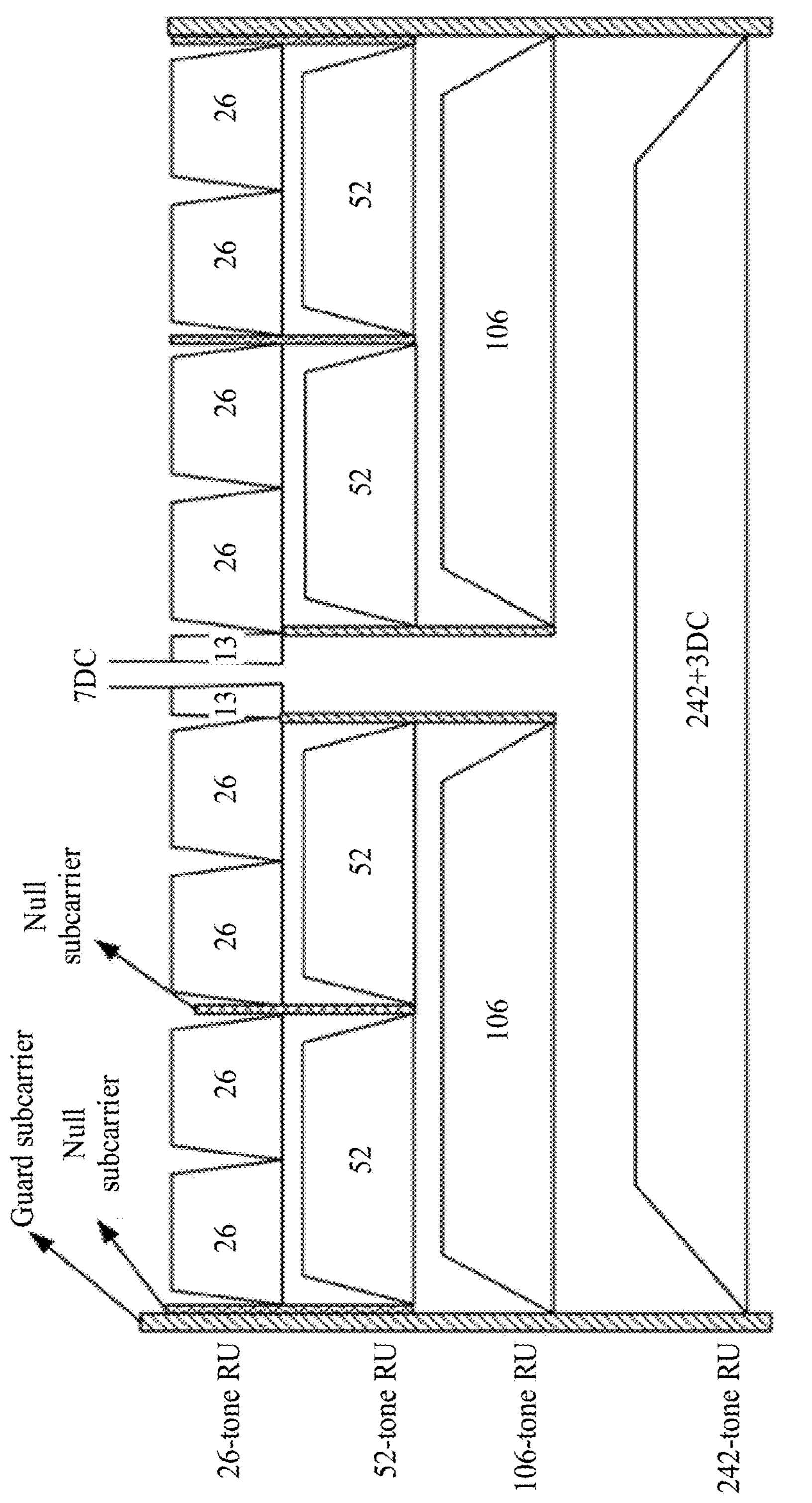
FIG. 4A is a schematic diagram of a possible resource unit allocation manner.

When a channel bandwidth for transmitting a PPDU is 20 MHz, a possible resource unit allocation manner is shown in FIG. 4A. FIG. 4A is a schematic diagram of a possible resource unit allocation manner used when the bandwidth for transmitting the PPDU is 20 MHz. The entire 20 MHz bandwidth may include an entire resource unit (242-tone RU) that includes 242 subcarriers, or may include various combinations of resource units (26-tone RUs) including 26 subcarriers, resource units (52-tone RUs) including 52 subcarriers, or resource units (106-tone RUs) including 106 subcarriers. In addition to the RUs used to transmit data, some guard (Guard) subcarriers, null subcarriers, or direct current (Direct Current, DC) subcarriers are further included.

Figure 4B:
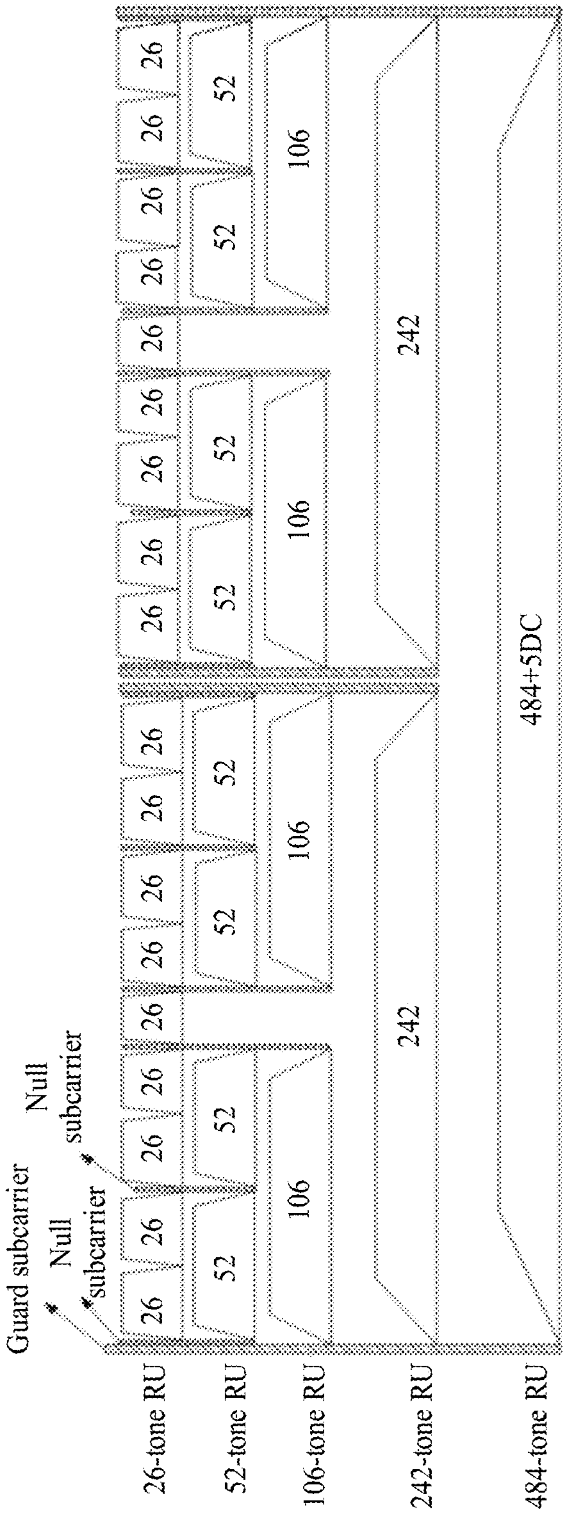
FIG. 4B is a schematic diagram of another possible resource unit allocation manner.

When a channel bandwidth for transmitting a PPDU is 40 MHz, a possible resource unit allocation manner is as shown in FIG. 4B. FIG. 4B is a schematic diagram of a possible resource unit allocation manner used when the channel bandwidth for transmitting the PPDU is 40 MHz. The entire bandwidth is approximately equivalent to replication of a tone plan of 20 MHz. The entire 40 MHz bandwidth may include an entire resource unit (484-tone RU) that includes 484 subcarriers, or may include various combinations of 26-tone RUs, 52-tone RUs, 106-tone RUs, or 242-tone RUs.

When a channel bandwidth for transmitting a PPDU is 80 MHz, the entire channel bandwidth is approximately equivalent to two replications of a tone plan of 40 MHz. The entire 80 MHz bandwidth may include an entire resource unit (996-tone RU) that includes 996 subcarriers, or may include various combinations of 484-tone RUs, 242-tone RUs, 106-tone RUs, 52-tone RUs, or 26-tone RUs. In addition, a center 26-tone RU (Center 26-Tone RU) including two 13-tone subunits exists in the middle of the entire 80 MHz channel bandwidth.

When a bandwidth is 160 MHz or 80+80 MHz, the entire bandwidth may be considered as two replications of a tone plan of 80 MHz. The entire bandwidth may include an entire 2*996-tone RU, or may include various combinations of 26-tone RUs, 52-tone RUs, 106-tone RUs, 242-tone RUs, 484-tone RUs, or 996-tone RUs.

The AP allocates a resource to the STA by RU, and may notify, by using a physical layer protocol data unit (physical layer protocol data unit, PPDU), the STA of the resource allocated to the STA. Specifically, the AP may include resource allocation information in a signal field (Signal Field, SIG) included in the PPDU, to indicate an allocated RU to the STA. For example, the signal field may be a high efficiency signal field B (High Efficient Signal Field-B, HE-SIG-B), or may be an extremely high-throughput signal field (Extremely High Throughput Signal Field, EHT-SIG).

Figure 5A:
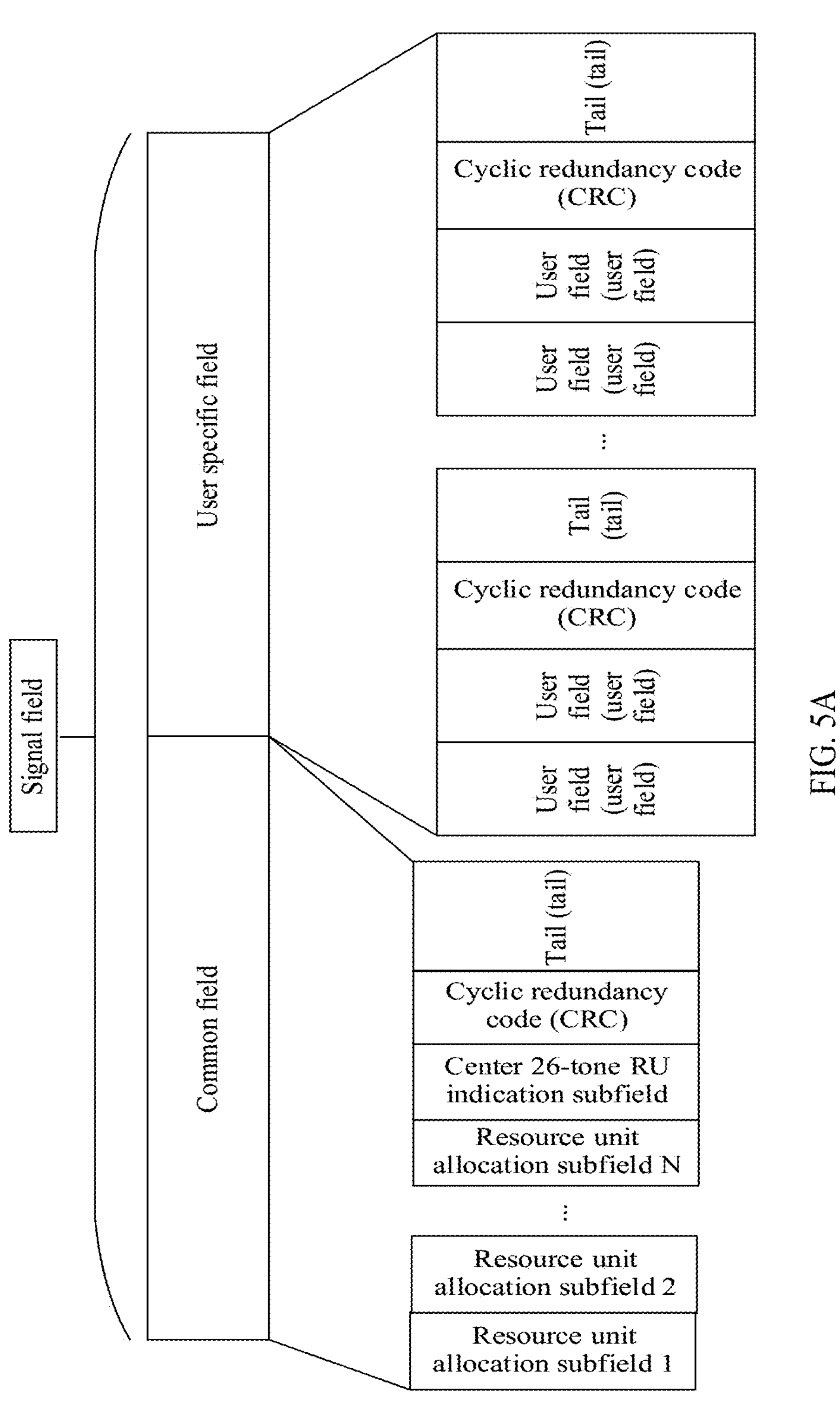
FIG. 5A is a schematic diagram of a structure of a signal field.

In 802.11ax, the AP notifies the user of RU allocation by using a signal field (signal field, SIG). FIG. 5A is a schematic diagram of a structure of a signal field. As shown in FIG. 5A, HE-SIG includes a common field (common field) and a user specific field (user specific field).

The common field includes 1 to N resource unit allocation subfields (RU allocation subfields), a cyclic redundancy code (cyclic redundancy code, CRC) used for checking, and a tail (Tail) subfield used for cyclic decoding. The user specific field includes a user field corresponding to an RU indicated by the resource unit allocation subfield.

One resource unit allocation subfield is one resource unit allocation index, and one resource unit allocation index indicates a size and a location of one or more resource units corresponding to one 242-tone RU. It should be understood that one resource unit allocation subfield corresponds to one 242-tone RU, and one 20 MHz subblock corresponds to one 242-tone RU. In this case, it may also be understood as that one resource unit allocation subfield corresponds to one 20 MHz subblock.

The resource unit allocation index is indicated by one or more indices, where each index corresponds to one 20 MHz subblock of a bandwidth. For example, in the 802.11ax protocol, an index table of resource unit allocation subfields is Table 1. Because the index table indicates an allocated resource, the index table may also be referred to as a resource allocation information table.

TABLE 1

| Resource unit allocation subfield (B7, B6, B5, B4, B3, B2, B1, B0) | #1 | #2 | #3 | #4 | #5 | #6 | #7 | #8 | #9 | Entry quantity |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |

TABLE 1-continued

| Resource unit allocation subfield (B7, B6, B5, B4, B3, B2, B1, B0) | #1 | #2 | #3 | #4 | #5 | #6 | #7 | #8 | #9 | Entry quantity |
|---|---|---|---|---|---|---|---|---|---|---|
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| $00010y_2y_1y_0$ | 52 | | 52 | | — | 106 | | | | 8 |
| $00011y_2y_1y_0$ | 106 | | | | — | 52 | | 52 | | 8 |
| $00100y_2y_1y_0$ | 26 | 26 | 26 | 26 | 26 | 106 | | | | 8 |
| $00101y_2y_1y_0$ | 26 | 26 | 52 | | 26 | 106 | | | | 8 |
| $00110y_2y_1y_0$ | 52 | | 26 | 26 | 26 | 106 | | | | 8 |
| $00111y_2y_1y_0$ | 52 | | 52 | | 26 | 106 | | | | 8 |
| $01000y_2y_1y_0$ | 106 | | | | 26 | 26 | 26 | 26 | 26 | 8 |
| $01001y_2y_1y_0$ | 106 | | | | 26 | 26 | 26 | 52 | | 8 |
| $01010y_2y_1y_0$ | 106 | | | | 26 | 52 | | 26 | 26 | 8 |
| $01011y_2y_1y_0$ | 106 | | | | 26 | 52 | | 52 | | 8 |
| $0110y_1y_0z_1z_0$ | 106 | | | | — | 106 | | | | 16 |
| 01110000 | 52 | | 52 | | — | 52 | | 52 | | 1 |
| 01110001 | 242-tone RU empty (zero users) | | | | | | | | | 1 |
| 01110010 | 48-tone RU; contributes zero user fields to a user specific field in a same HE-SIG-B content channel as this resource unit allocation subfield (contributes zero user fields to the user specific field in the same HE-SIG-B content channel as this RU allocation subfield) | | | | | | | | | 1 |
| 01110011 | 996-tone RU; contributes zero user fields to a user specific field in a same HE-SIG-B content channel as this resource unit allocation subfield (contributes zero user fields to the user specific field in the same HE-SIG-B content channel as this RU allocation subfield) | | | | | | | | | 1 |
| $011101x_1x_0$ | | | | | Reserved | | | | | 4 |
| $01111y_2y_1y_0$ | | | | | Reserved | | | | | 8 |
| $10y_2y_1y_0z_2z_1z_0$ | 106 | | | | 26 | 106 | | | | 64 |
| $11000y_2y_1y_0$ | | | | | 242 | | | | | 8 |
| $11001y_2y_1y_0$ | | | | | 484 | | | | | 8 |
| $11010y_2y_1y_0$ | | | | | 996 | | | | | 8 |
| $11011y_2y_1y_0$ | | | | | Reserved | | | | | 8 |
| $111x_4x_3x_2x_1x_0$ | | | | | Reserved | | | | | 32 |

In Table 1, the first column indicates indices, and the middle column indicates composition statuses of an RU indicated by the indices in the first column. The resource unit allocation subfield may be an index in the first column in Table 1, and indicates a resource unit allocation status corresponding to 20 MHz corresponding to the resource unit allocation subfield. For example, the resource unit allocation subfield is "$00111y_2y_1y_0$", indicating that a 242-tone RU corresponding to the resource unit allocation subfield is divided into four RUs: a 52-tone RU, a 52-tone RU, a 26-tone RU, and a 106-tone RU.

When an RU corresponding to an index includes an RU including 106 or more subcarriers, the first three characters of the index indicate an RU allocation status corresponding to 20 MHz corresponding to the resource unit allocation subfield, and the last three characters of the index indicate a number of MU-MIMO users supported by the RU including the 106 or more subcarriers. For example, for an index $01000y_2y_1y_0$, "01000" indicates that 20 MHz corresponding to the resource unit allocation subfield includes one 106-tone RU and five 26-tone RUs, and $y_2y_1y_0$ is 010, indicating that the 106-tone RU is allocated to three users.

The user specific field of the signal field (HE-SIG) includes 1 to M user fields (User Field) according to a resource unit allocation sequence. The M user fields are usually two in a group, and every two user fields are followed by a CRC field and a tail field. If a number of user fields is an odd number, the last user field is separately in a group, and the last user field is followed by a CRC field and a tail field. For an RU including fewer than 106 subcarriers, a specific field part includes a user field corresponding to the RU. For an RU including 106 or more subcarriers, a specific field part includes one or more user fields corresponding to the RU.

A concept of a content channel (Content Channel, CC) is further introduced in the 802.11ax protocol. When a bandwidth is greater than or equal to 40 MHz, the signal field may be transmitted in two content channels (Content Channel, CC). The resource unit allocation subfield in the signal field is divided into a first part and a second part. The first part of the resource unit allocation subfield is transmitted in a CC 1, and the second part of the resource unit allocation subfield is transmitted in a CC 2. Correspondingly, a user field corresponding to the first part of the resource unit allocation subfield is transmitted in the CC 1, and a user field corresponding to the second part of the resource unit allocation subfield is transmitted in the CC 2.

Figure 5B:
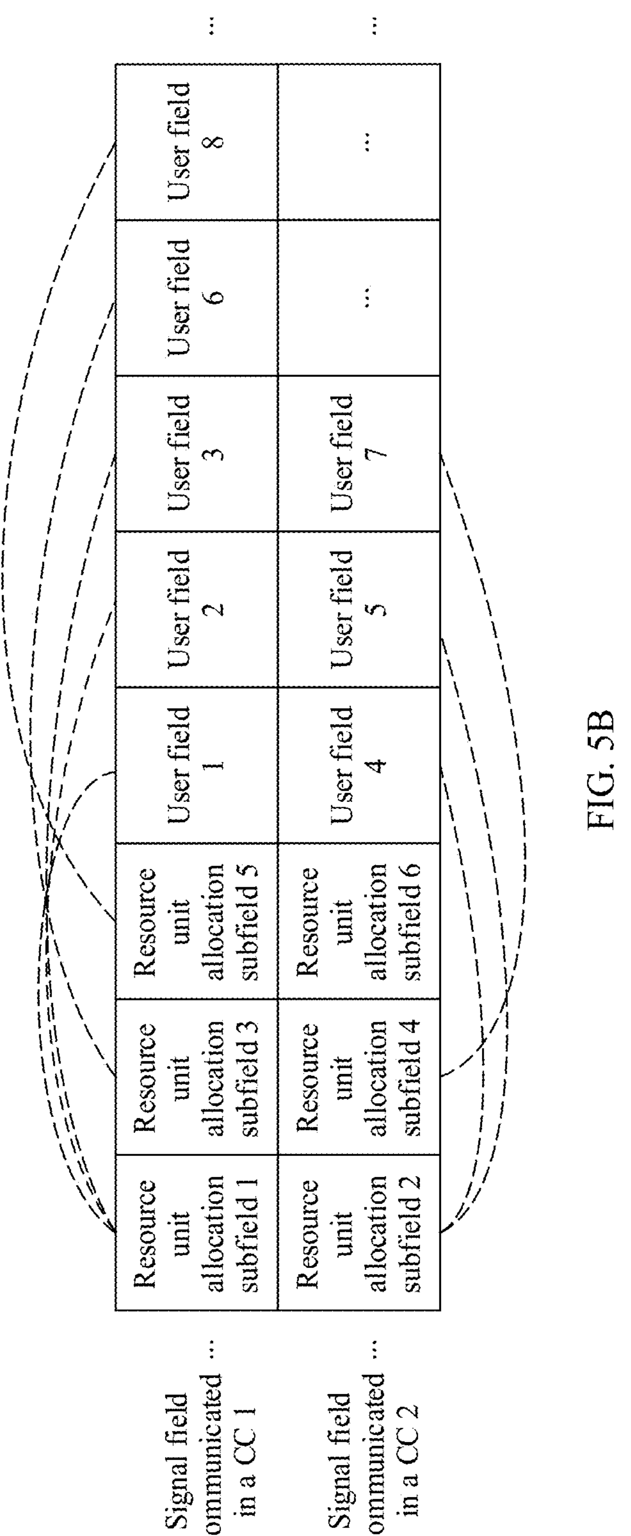
FIG. 5B is a schematic diagram of another structure of a signal field.

For example, in a schematic diagram of a structure of a signal field shown in FIG. 5B, an odd-numbered resource unit allocation subfield in the signal field is transmitted in the CC 1, and a user field corresponding to the odd-numbered resource unit allocation subfield is also transmitted in the CC 1; an even-numbered resource unit allocation subfield in the signal field is transmitted in the CC 1, and a user field corresponding to the even-numbered resource unit allocation subfield is also transmitted in the CC 2.

Specifically, as shown in FIG. 5B, resource unit allocation subfields 1, 3, and 5 are transmitted in the CC 1, and resource unit allocation subfields 2, 4, and 6 are transmitted in the CC 2. A user field 1 to a user field 3 corresponding to the resource unit allocation subfield 1 are transmitted in the CC 1, a user field 4 and a user field 5 corresponding to the resource unit allocation subfield 2 are transmitted in the CC 2, a user field 6 corresponding to the resource unit allocation subfield 3 is transmitted in the CC 1, a user field 7 corresponding to the user field 4 is transmitted in the CC 2, and a user field 8 corresponding to the resource unit allocation subfield 5 is transmitted in the CC 1. A number of user fields corresponding to the resource unit allocation subfield 6 is 0, that is, the resource unit allocation subfield 6 does not correspond to any user field.

The user field includes an association identifier (association identifier, AID). A STA that receives a PPDU obtains a user field of the STA based on an AID, and obtains an RU indicated by a resource unit allocation subfield corresponding to the user field, to determine the RU allocated to the STA.

Although a plurality of RU allocation modes are configured for the resource unit allocation subfield shown in Table 1, only one RU can be allocated to one or more stations, and a plurality of consecutive or inconsecutive RUs cannot be allocated to one or more stations. For example, there are three RUs, the three RUs are an RU 1, an RU 2, and an RU 3, and channel conditions of the RU 1 and the RU 3 are better than a channel condition of the RU 2. In an ideal case, the RU 1 and the RU 3 may be allocated to a same user. However, in a resource unit allocation subfield indication manner shown in Table 1, only the RU 1 or the RU 3 can be allocated to a same user, but the RU 1 and the RU 3 cannot be allocated to a same user. It can be learned that RU allocation flexibility is low, and spectrum utilization is also low.

Figure 5C:
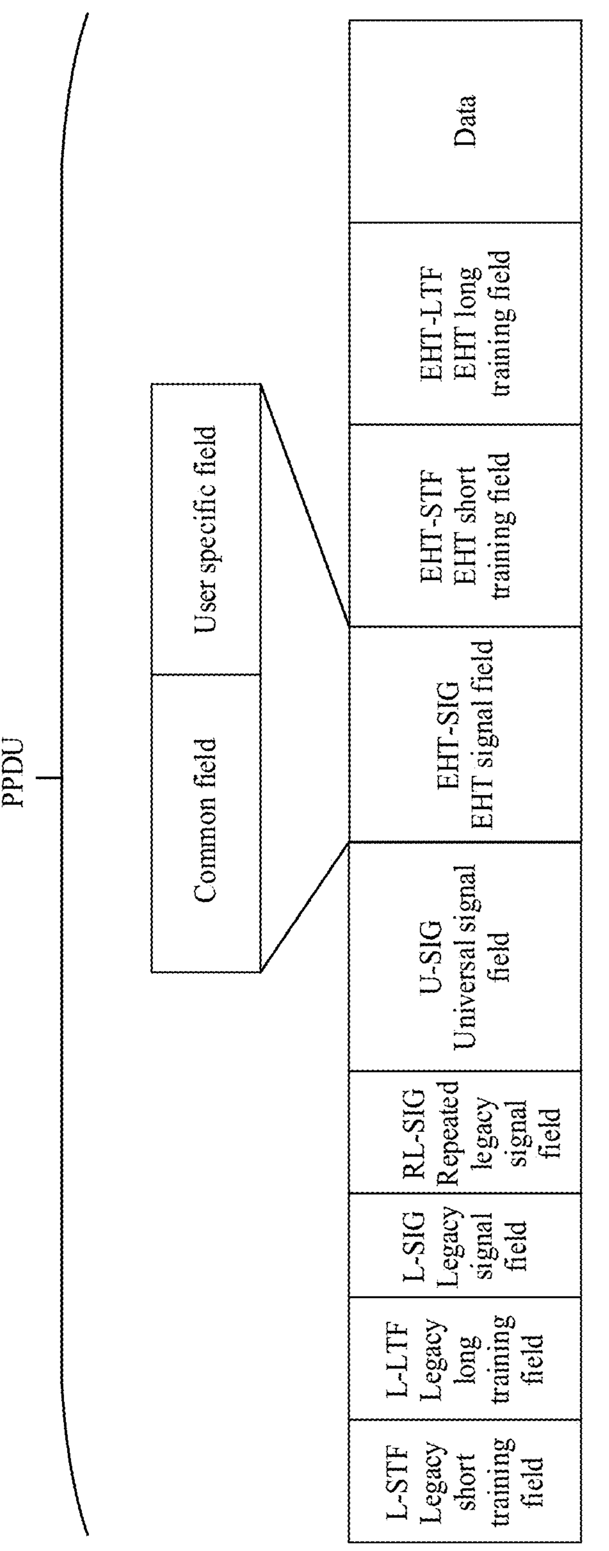
FIG. 5C is a schematic diagram of a structure of a PPDU.

FIG. 5C is a schematic diagram of a structure of a PPDU according to an embodiment of this application. The PPDU includes a legacy short training field (Legacy Short Training Field, L-STF), a legacy long training field (Legacy Long Training Field, L-LTF), a legacy signal field (Legacy Signal Field, L-SIG), a repeated legacy signal field (RL-SIG), a universal signal field U-SIG (universal SIG, U-SIG), an ultra high-throughput signal field or extremely high-throughput signal field (extremely high throughput signal field, EHT-SIG), an EHT short training field (EHT-STF), an EHT long training field (EHT-LTF), and data (data). The L-STF, the L-LTF, the L-SIG, the RL-SIG, the U-SIG, the EHT-SIG, the EHT-STF, and the EHT-LTF are a part of structures in a physical layer header (or referred to as a preamble part) of the PPDU.

The L-STF, the L-LTF, and the L-SIG may be understood as legacy preamble fields, and are used to ensure coexistence of a new device and a legacy device. The RL-SIG is used to enhance reliability of a legacy signal field.

The U-SIG and the EHT-SIG are signal fields. The U-SIG is used to carry some common information, for example, information indicating a PPDU version, information indicating an uplink/downlink, information indicating a frequency domain bandwidth of the PPDU, and puncturing indication information. The EHT-SIG includes information indicating resource allocation, information indicating data demodulation, and the like. A structure of the EHT-SIG is similar to a structure of the HE-SIG in 802.11ax shown in FIG. 5A. A common field of the EHT-SIG does not include a center 26-tone RU indication subfield.

It should be noted that, in this embodiment of this application, a field in a PPDU in an 802.11be scenario is used as an example for description. Fields in the PPDU mentioned in embodiments of this application are not limited to fields related to 802.11be, and the fields in the PPDU mentioned in embodiments of this application may alternatively be fields related to a standard version later than 802.11be.

The 802.11be standard under discussion supports a maximum bandwidth of 320 MHz. In the 802.11be standard, a possible resource unit allocation manner used when a bandwidth is 20 MHz or 40 MHz is the same as the foregoing possible resource unit allocation manner used when the bandwidth is 20 MHz or 40 MHz in the 802.11ax standard. The bandwidth in embodiments of this application is a bandwidth for transmitting the PPDU.

When the bandwidth is 160 MHz, the bandwidth may be considered as four replications of a tone plan of 40 MHz, and there is no intermediate 26-tone RU. The entire bandwidth may include an entire 2*996-tone RU, or may include various combinations of 26-tone RUs, 52-tone RUs, 106-tone RUs, 242-tone RUs, 484-tone RUs, or 996-tone RUs.

Similarly, when the bandwidth is 320 MHz, the entire bandwidth may be considered as two replications of a tone plan of 160 MHz. The entire bandwidth may include an entire 4*996-tone RU, or may include various combinations of 26-tone RUs, 52-tone RUs, 106-tone RUs, 242-tone RUs, 484-tone RUs, or 996-tone RUs.

All the foregoing tone plans are in units of 242-tone RU. A left side of the figure may be considered as a lowest frequency, and a right side of the figure may be considered as a highest frequency. From left to right, the 242-tone RUs may be numbered: the first 242-tone RU, the second 242-tone RU, the third 242-tone RU . . . . Alternatively, the 484-tone RUs may be numbered: the first 484-tone RU, the second 484-tone RU . . . .

For example, the bandwidth is 80 MHz, and the 80 MHz bandwidth includes two 484-tone RUs. According to an increasing frequency order, the first 40 MHz subblock of the 80 MHz bandwidth corresponds to the first 484-tone RU, and the second 40 MHz subblock of the 80 MHz bandwidth corresponds to the second 484-tone RU. If the 80 MHz bandwidth includes four 242-tone RUs, the first to the fourth 20 MHz subblocks of the 80 MHz bandwidth correspond to the first to the fourth 242-tone RUs respectively in an increasing frequency order.

To improve flexibility of RU allocation and improve frequency utilization efficiency, in a related technology, a solution that can support combination of a plurality of RUs into one RU and allocation of the RU to one or more stations is provided. The RU obtained by combining the plurality of RUs may be referred to as a multiple resource unit (multiple RU, MRU).

In a related technology, a solution to combining some RUs into an MRU is provided. Two or more RUs may be combined into one MRU, and allocated to one or more stations.

To avoid an excessively complex RU combination indication manner due to excessively flexible combination, RU combination specifically complies with the following rules: (1) A small RU and a large RU are not combined. (2) Cross 20 MHz combination is not supported for small RUs. (3) Small RUs for combination should be consecutive.

Combination of large RUs may include: A 484-tone RU and a 242-tone RU are combined into a 484+242-tone RU, a 996-tone RU and a 484-tone RU are combined into a 994+484-tone RU, two 996-tone RUs and a 484-tone RU are combined into a 2*994+484-tone RU, and three 996-tone RUs and a 484-tone RU are combined into a 3*994+484-tone RU. A frequency domain resource corresponding to the 484+242-tone RU is 60 MHz. A frequency domain resource corresponding to the 994+484-tone RU is 120 MHz. A frequency domain resource corresponding to the 2*994+484-tone RU is 200 MHz. A frequency domain resource corresponding to the 3*994+484-tone RU is 280 MHz. It may be understood that the 484+242-tone RU, the 994+484-tone RU, the 2*994+484-tone RU, and the 3*994+484-tone RU are all MRUs.

In this application, MRUs are classified depending on two RUs that form an MRU. For example, an MRU (for example, a 484+242-tone RU) obtained by combining a 484-tone RU and a 242-tone RU is an MRU or an MRU combination type. An MRU (for example, a 484+996-tone RU) obtained by combining a 484-tone RU and a 996-tone RU is another combination type. RUs forming a same type of MRU have different frequency locations, and each type of MRU may include a plurality of combination cases. For example, when the bandwidth is 80 MHz, for a 484+242-tone RU obtained by combining a 484-tone RU and a 242-tone RU, the 484-tone RU and the 242-tone RU may have different frequency locations. In this way, the 484+242-tone RU includes a plurality of combination cases.

Specifically, in OFDMA communication with a bandwidth of 80 MHz, supported MRU combination types are shown in Table 2. The supported MRU combination types may include combination of a 484-tone RU and a 242-tone RU into a 484+242-tone RU. A bandwidth of 80 MHz corresponds to four 242-tone RUs. Three of the four 242-tone RUs belong to the 484+242-tone RU, and the other 242-tone RU belongs to a non-MRU. In an increasing frequency order, a location of the non-MRU may be any one of the first 242-tone RU, the second 242-tone RU, the third 242-tone RU, or the fourth 242-tone RU. Therefore, there are 4 combination cases of the 484+242-tone RU.

TABLE 2

| RU size | Equivalent bandwidth | Number of possible combination cases |
|---|---|---|
| 484 + 242 | 60 MHz | 4 |

As shown in Table 3, in OFDMA communication with a bandwidth of 160 MHz, supported MRU combination types include combination of a 484-tone RU and a 242-tone RU into a 484+242-tone RU and combination of a 996-tone RU and a 484-tone RU into a 994+484-tone RU. An equivalent bandwidth of the 994+484-tone RU is 120 MHz.

TABLE 3

| RU size | Equivalent bandwidth | Number of possible combination cases |
|---|---|---|
| 484 + 996 | 120 MHz | 4 |

In OFDMA communication with a bandwidth of 240 MHz, if the 240 MHz bandwidth is consecutive 240 MHz in a spectrum, large RU combination is allowed only for a 160 MHz subblock formed by two consecutive 80 MHz sub-blocks. In the OFDMA communication with the bandwidth of 240 MHz, a supported RU combination case and an RU combination case are the same as those in the OFDMA communication with the bandwidth of 160 MHz.

In OFDMA communication with a bandwidth of 320 MHz, supported combination cases may include combination of three 996-tone RUs into a 3*996-tone RU, combination of three 996-tone RUs and one 484-tone RU into a 3*996+484-tone RU, and the supported RU combination cases in the OFDMA communication with the bandwidth of 160 MHz. An equivalent bandwidth of the 3*996-tone RU is 240 MHz, and an equivalent bandwidth of the 3*996+484-tone RU is 280 MHz. The RU combination case supported by 160 MHz may be performed in primary 160 MHz or secondary 160 MHz in a 320 MHz or 160+160 MHz bandwidth.

It should be understood that, in the OFDMA communication with the bandwidth of 80 MHz, 160 MHz, 240 MHz, or 320 MHz, an MRU combination type allowed when the bandwidth is 80 MHz is allowed in each 80 MHz subblock.

It is clear that, the foregoing currently supported MRU combination types are not all possible RU combination manners. It should be understood that, if all possible permutation and combination manners of RUs are provided, although RU combination is more flexible, complexity also increases accordingly.

Embodiments of this application show possible MRU combination types in 80 MHz to 320 MHz. For example, Table 2 shows some possible MRU combination types.

TABLE 4

| MRU combination type | Equivalent bandwidth | Communication bandwidth |
|---|---|---|
| 242 + 242 | 40 MHz | 80 MHz |
| 242 + 484 | 60 MHz | |
| 242 + 242 + 996 | 120 MHz | 160 MHz |
| 484 + 996 | 120 MHz | |
| 242 + 484 + 242 + 484 | 120 MHz | |
| 242 + 484 + 996 | 140 MHz | |
| 996 + 996 | 160 MHz | 240 MHz |
| 484 + 996 + 996 | 200 MHz | |
| 242 + 484 + 996 + 996 | 220 MHz | |
| 996 + 996 + 996 | 240 MHz | 320 MHz |
| 484 + 996 + 996 + 996 | 280 MHz | |
| . . . | . . . | . . . |

In Table 4, the first column indicates an MRU combination type, and a number in the table indicates a size of each RU included in an MRU. For example, 484+996 indicates that an MRU includes a 484-tone RU and a 996-tone RU. The middle column indicates an equivalent bandwidth of the MRU, and the third column indicates a communication bandwidth of the MRU. For example, in a communication bandwidth of 160 MHz, the MRU combination type may be "242+242+996", or may be "484+996".

Based on the foregoing MRU combination types, embodiments of this application provide some MRU indication solutions.

In an MRU indication solution in embodiments of this application, the resource unit allocation subfield in the signal field of the PPDU may indicate that 242-tone RUs corresponding to the resource unit allocation subfield belong to one MRU. The resource unit allocation subfield may indicate a resource unit allocation status by an index shown in Table 5. An index in Table 5 may be a reserved index in Table 1.

TABLE 5

| Resource unit allocation subfield | Indicated content | Entry quantity |
|---|---|---|
| Index 1 | belongs to one MRU; contributes zero user fields to a user specific field in a same EHT-SIG content channel as this resource unit allocation subfield | 1 |
| Index 2 | belongs to one MRU; contributes one user field to a user specific field in a same EHT-SIG content channel as this resource unit allocation subfield | 1 |
| Index 3 | belongs to one MRU; contributes two user fields to a user specific field in a same EHT-SIG content channel as this resource unit allocation subfield | 1 |
| Index 4 | belongs to one MRU; contributes three user fields to a user specific field in a same EHT-SIG content channel as this resource unit allocation subfield | 1 |
| Index 5 | belongs to one MRU; contributes four user fields to a user specific field in a same EHT-SIG content channel as this resource unit allocation subfield | 1 |
| Index 6 | belongs to one MRU; contributes five user fields to a user specific field in a same EHT-SIG content channel as this resource unit allocation subfield | 1 |

TABLE 5-continued

| Resource unit allocation subfield | Indicated content | Entry quantity |
|---|---|---|
| Index 7 | belongs to one MRU; contributes six user fields to a user specific field in a same EHT-SIG content channel as this resource unit allocation subfield | 1 |
| Index 8 | belongs to one MRU; contributes seven user fields to a user specific field in a same EHT-SIG content channel as this resource unit allocation subfield | 1 |
| Index 9 | belongs to one MRU; contributes eight user fields to a user specific field in a same EHT-SIG content channel as this resource unit allocation subfield | 1 |

The foregoing Table 5 may also be combined into one row and presented in a table, or entries in which numbers of contributed user fields are 1 to 8 may be combined into one row and presented in a table. A presentation form of the table is not limited in this application.

It should be understood that sequence numbers 1, 2, 3, . . . , and 9 of the index 1, the index 2, the index 3, . . . , and the index 9 do not indicate that the indices are 1, 2, 3, . . . , and 9. The sequence numbers 1, 2, 3, . . . , and 9 of the index 1, the index 2, the index 3, . . . , and the index 9 are only used to identify that the foregoing nine indices are different indices. A specific expression manner of the index is not limited in this application.

When the resource unit allocation subfield may indicate a resource unit allocation status by using any one of the nine entries, it indicates that 242-tone RUs corresponding to a frequency domain resource corresponding to the resource unit allocation subfield belong to one MRU, and a number of user fields contributed by the MRU to a user specific field of a same EHT-SIG content channel as the resource unit allocation subfield. The number of user fields contributed to the user specific field in the same EHT-SIG content channel as the resource unit allocation subfield is a number of user fields corresponding to the resource unit allocation subfield in the EHT-SIG content channel in which the resource unit allocation subfield is located. A user field corresponding to the resource unit allocation subfield is a user field of a user to which a resource unit indicated by the resource unit allocation subfield is allocated.

Optionally, each index in the index 2 to the index 9 includes an RU allocation indicating part and a user field indicating part. In embodiments, the RU allocation indicating parts in the index 2 to the index 9 are the same, and all indicate that the 242-tone RUs corresponding to the resource unit allocation subfield belong to one MRU. The user field indicating parts in the index 2 to the index 9 are different, and separately indicate that the one to eight user fields are contributed to the user specific field in the same EHT-SIG content channel as this resource unit allocation subfield. The user field indicating part may be, for example, 3 bits. An RU allocation indicating part of the index 1 that indicates the zero user fields is different from an RU allocation indicating part of the indices 2 to 9 that indicate the one to eight user fields.

Specifically, a structure of the index 2 to the index 9 may be $k_n k_{n-1} \ldots k_2 k_1 y_2 y_1 y_0$, where $k_n k_{n-1} \ldots k_2 k_1$ is the RU allocation indicating part, n is a number of bits of the user field indicating part, and $y_2 y_1 y_0$ is the user field indicating part, is 3 bits, and indicates the one to eight user fields separately.

The station receiving the PPDU can determine, based on the resource unit allocation subfield, that the 242-tone RU corresponding to the resource unit allocation subfield belongs to the MRU, and determine, based on a number of resource unit allocation subfields in a resource unit allocation subfield corresponding to each 80 MHz subblock and indicating that a corresponding 242-tone RU belongs to the MRU, an RU that forms the MRU.

Figures 6A, 6B:
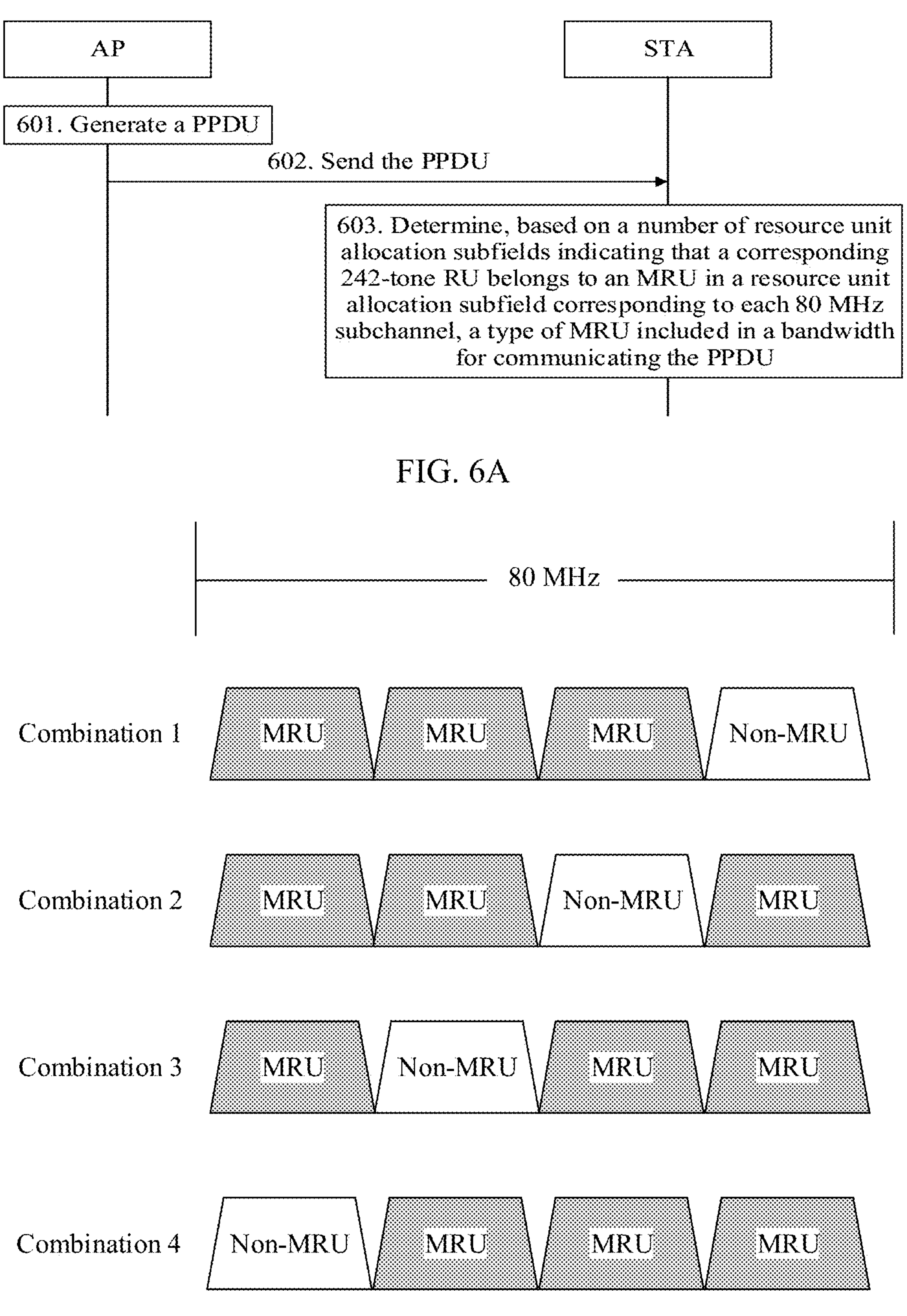
FIG. 6A is a schematic flowchart of a PPDU communication method according to an embodiment of this application.
FIG. 6B is a schematic scenario diagram of MRU combination cases included in 80 MHz.

Specifically, FIG. 6A is a schematic flowchart of a PPDU communication method. The foregoing solution may be implemented by using steps of the following PPDU communication method.

601. An AP generates a PPDU.

The PPDU includes a plurality of resource unit allocation subfields, the plurality of resource unit allocation subfields include a resource unit allocation subfield corresponding to an MRU, the resource unit allocation subfield corresponding to the MRU indicates that a 242-tone RU corresponding to the resource unit allocation subfield belongs to the MRU, and a number of resource unit allocation subfields corresponding to the MRU in a resource unit allocation subfield corresponding to each 80 MHz subblock in a plurality of 80 MHz subblocks in a bandwidth for transmitting the PPDU is for determining or indicating a type of the MRU.

602. The AP sends the PPDU.

Correspondingly, a STA receives the PPDU.

603. The STA determines, based on a number of resource unit allocation subfields indicating that a corresponding 242-tone RU belongs to the MRU in the resource unit allocation subfield corresponding to each 80 MHz subblock, a type of RU of the MRU for transmitting the PPDU.

It should be understood that the foregoing PPDU communication method is described by using an embodiment in which the AP sends the PPDU to the STA. The method is also applicable to a scenario in which an AP sends a PPDU to an AP and a scenario in which a STA sends a PPDU to a STA.

The STA determines the type of RU that is the MRU for transmitting the PPDU, to determine an RU forming the MRU.

The following provides a solution in which when the bandwidth is 80 MHz, 160 MHz, 240 MHz, or 320 MHz, the STA determines the RU forming the MRU based on the number of resource unit allocation subfields indicating that the corresponding 242-tone RU belongs to the MRU in the resource unit allocation subfield corresponding to each 80 MHz subblock.

When the bandwidth is 80 MHz, there is only one mode for an included MRU. The 80 MHz bandwidth may include a 242+484-tone RU obtained by combining a 242-tone RU and a 484-tone RU. In this case, four 242-tone RUs in the 80 MHz bandwidth include three 242-tone RUs that belong to the MRU, and the other 242-tone RU is a non-MRU. The 242-tone RU that is the non-MRU is any one of the first 242-tone RU, the second 242-tone RU, the third 242-tone RU, and the fourth 242-tone RU. There are four possible cases for the 242-tone RU and the 484-tone RU that form the 242+484-tone RU. FIG. 6B is a schematic scenario diagram of MRU combination cases included in 80 MHz. As shown in FIG. 6B, the 242+484-tone RU may be obtained by combining the first 484-tone RU and the third 242-tone RU (the first to the third 242-tone RUs) in the 80 MHz bandwidth, may be obtained by combining the first 484-tone RU and the fourth 242-tone RU (the first, the second, and the fourth 242-tone RUs) in the 80 MHz bandwidth, may be obtained by combining the second 484-tone RU and the first 242-tone RU (the first, the third, and the fourth 242-tone RUs) in the 80 MHz bandwidth, or may be obtained by combining the second 484-tone RU and the second 242-tone RU (the second, the third, and the fourth 242-tone RUs) in the 80 MHz bandwidth.

In this way, if the STA reads that in the 80 MHz bandwidth, three resource unit allocation subfields indicate that corresponding 242-tone RUs belong to the MRU, the STA may determine that the three 242-tone RUs corresponding to the three resource unit allocation subfields form the 242+484-tone RU. In this way, when the bandwidth is 80 MHz, an MRU including a plurality of RUs can be allocated to one or more stations.

It should be understood that the non-MRU in this embodiment of this application may be a single 242-tone RU, may be a plurality of small RUs, or may be empty.

Figure 6C:
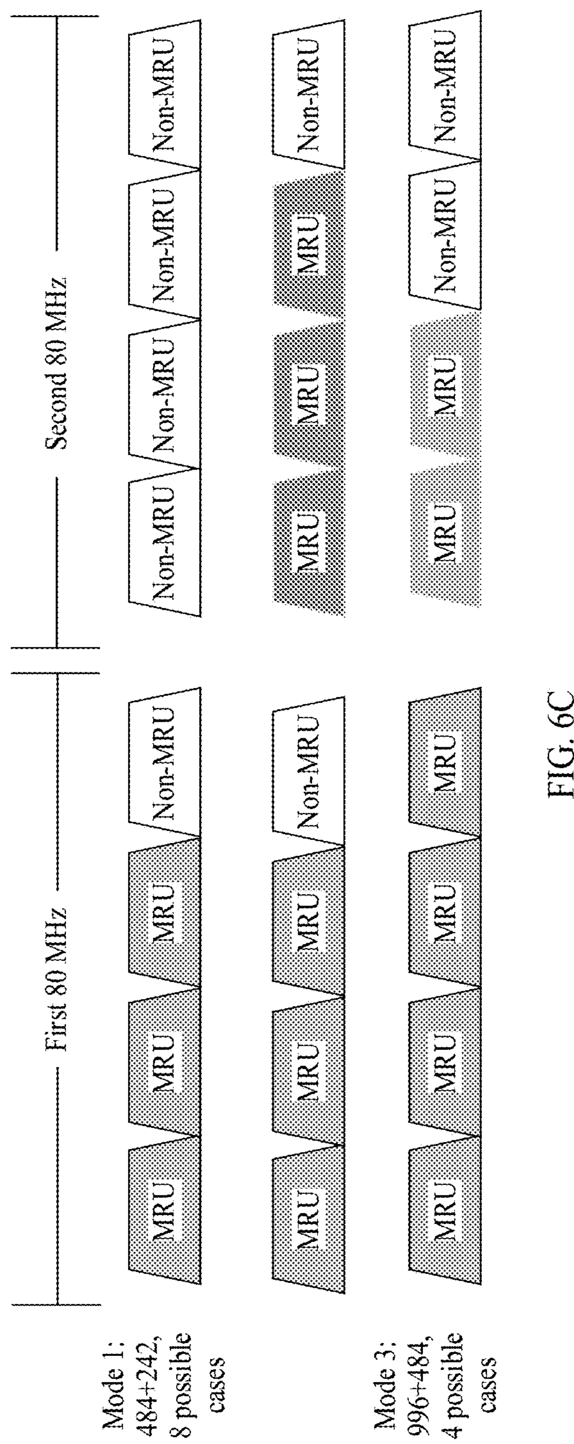
FIG. 6C is a schematic scenario diagram of MRU combination cases included in 160 MHz.

FIG. 6C is a schematic scenario diagram of MRU combination cases included in 160 MHz. As shown in FIG. 6C, when the bandwidth is 160 MHz, there are three modes for an included MRU. Mode 1: The 160 MHz bandwidth includes one 242+484-tone RU. The 160 MHz bandwidth includes two 80 MHz subblocks, and the 242+484-tone RU may be located in one of the 80 MHz subblocks. The 242+484-tone RU in each 80 MHz subblock includes the 4 possible combination cases shown in FIG. 6B. There are 4+4=8 possible combination cases (8 cases) of a 242-tone RU and a 484-tone RU that form the 242+484-tone RU.

Mode 2: The 160 MHz bandwidth includes two 242+484-tone RUs. The 160 MHz bandwidth includes two 80 MHz subblocks, each 80 MHz subblock includes one 242+484-tone RU, and the 242+484-tone RU in each 80 MHz subblock has the 4 possible combination cases shown in FIG. 6B. There are 4*4=16 possible combination cases (16 cases) of a 242-tone RU and a 484-tone RU that form each of the two 242+484-tone RUs.

Mode 3: The 160 MHz bandwidth includes one 996+484-tone RU. Because locations of a 996-tone RU and a 484-tone RU that form the 996+484-tone RU are different in the 160 MHz bandwidth, there are 4 possible combination cases (4 cases) of the 996-tone RU and the 484-tone RU that form the 996+484-tone RU.

In this way, the STA may identify an MRU combination type in the 160 MHz bandwidth according to an MRU combination identification method table shown in Table 6, to allocate an MRU including a plurality of RUs to one or more stations when the bandwidth is 160 MHz.

Specifically, the STA receiving the PPDU can determine the MRU combination type based on a number, indicated by the resource unit allocation subfield, of 242-tone RUs that belong to the MRU in each 80 MHz subblock in the 160 MHz bandwidth.

TABLE 6

| Bandwidth (BW) | Number of 242-tone RUs that belong to an MRU in the first 80 MHz subblock | Number of 242-tone RUs that belong to an MRU in the second 80 MHz subblock | MRU combination type |
|---|---|---|---|
| 160 MHz | 3 | 0 | 484 + 242 |
| | 3 | 3 | (484 + 242) + (484 + 242) |
| | 4 | 2 | 996 + 484 |
| | 2 | 4 | 484 + 996 |

If the STA identifies, based on the resource unit allocation subfields corresponding to the 160 MHz bandwidth, that three 242-tone RUs included in the first 80 MHz subblock belong to an MRU and none of 242-tone RUs included in the second 80 MHz subblock belongs to an MRU, the STA determines that the 160 MHz bandwidth includes one 484+242-tone RU and the 484+242-tone RU includes the three 242-tone RUs belonging to the MRU.

If the STA identifies, based on the resource unit allocation subfields corresponding to the 160 MHz bandwidth, that three 242-tone RUs included in the first 80 MHz subblock belong to an MRU and three 242-tone RUs included in the second 80 MHz subblock belong to an MRU, the STA determines that the 160 MHz bandwidth includes two 484+242-tone RUs and a 484+242-tone RU in each 80 MHz subblock includes three 242-tone RUs belonging to an MRU in the 80 MHz subblock.

If the STA identifies, based on the resource unit allocation subfields corresponding to the 160 MHz bandwidth, that four 242-tone RUs included in the first 80 MHz subblock belong to an MRU and two 242-tone RUs included in the second 80 MHz subblock belong to an MRU, the STA determines that the 160 MHz bandwidth includes one 996+484-tone RU. The 996+484-tone RU includes the four 242-tone RUs in the first 80 MHz subblock and the two 242-tone RUs that belong to the MRU in the second 80 MHz subblock. Alternatively, if the STA identifies, based on the resource unit allocation subfields corresponding to the 160 MHz bandwidth, that two 242-tone RUs included in the first 80 MHz subblock belong to an MRU and four 242-tone RUs included in the second 80 MHz subblock belong to an MRU, the STA determines that the 160 MHz bandwidth includes one 996+484-tone RU. The 996+484-tone RU includes the two 242-tone RUs belonging to the MRU in the first 80 MHz subblock and the four 242-tone RUs in the second 80 MHz subblock.

Figure 6D:
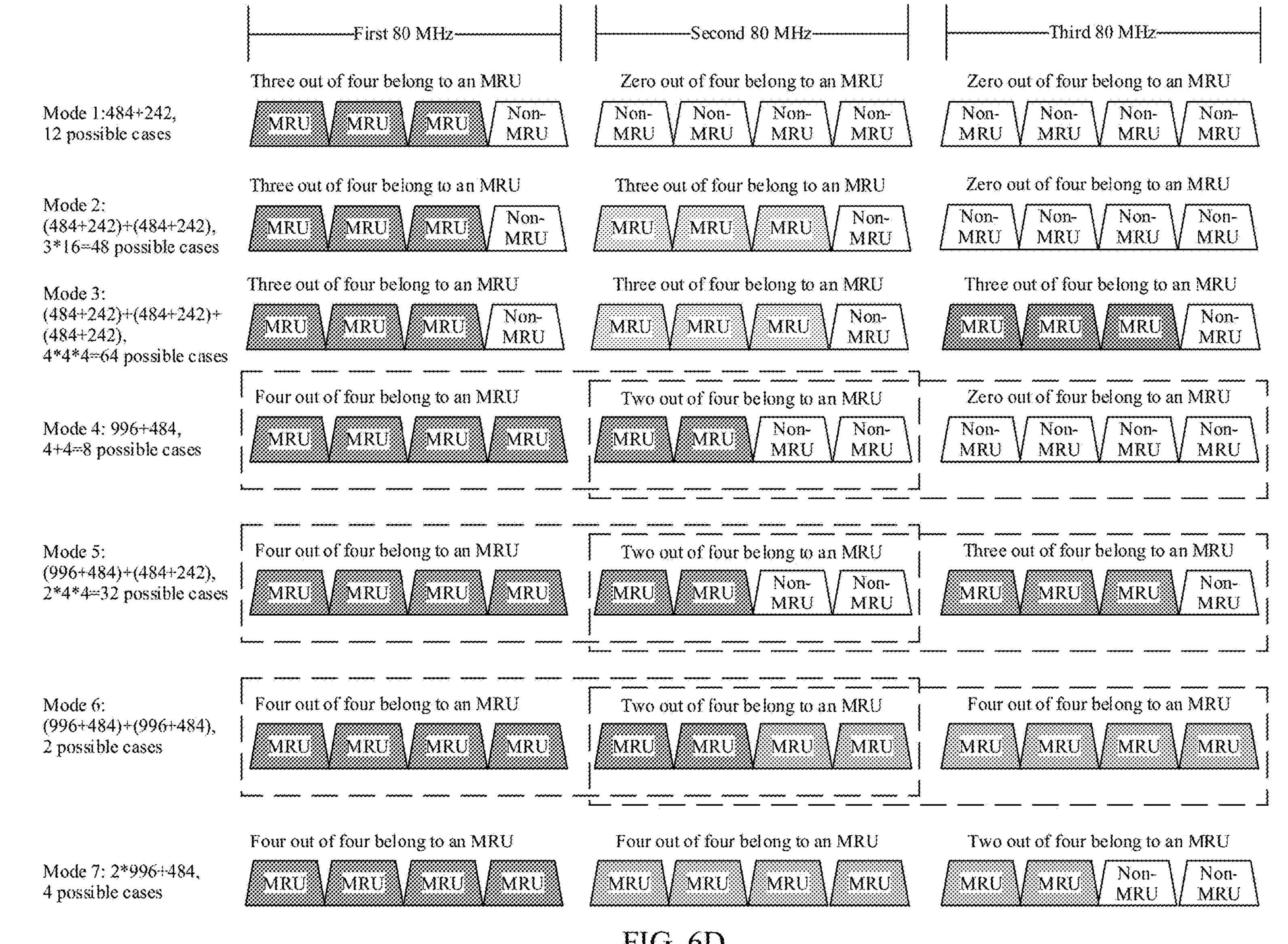
FIG. 6D is a schematic scenario diagram of MRU combination cases included in 240 MHz.

Similarly, FIG. 6D is a schematic scenario diagram of MRU combination cases included in 240 MHz. When the bandwidth is 240 MHz, there are seven modes for an included MRU. The mode 1 to the mode 4 may be understood according to FIG. 6D with reference to the foregoing related descriptions according to FIG. 6B and FIG. 6C.

In the mode 4, when the bandwidth is consecutive 240 MHz, the 240 MHz bandwidth may include a 996+484-tone RU obtained by combining a 996-tone RU and a 484-tone RU. The 996+484-tone RU may be in a 160 MHz bandwidth including the first 80 MHz subblock and the second 80 MHz subblock (4 possible combination cases), or may be in a 160 MHz bandwidth including the second 80 MHz subblock and the third 80 MHz subblock (4 possible combination cases). There are 8 possible combinations (8 cases) of the 484-tone RU and the 996-tone RU that form the 996+484-tone RU.

In the mode 5, when the bandwidth is consecutive 240 MHz, the 240 MHz bandwidth may include a 996+484-tone RU obtained by combining a 996-tone RU and a 484-tone RU, and a 484+242-tone RU obtained by combining a 484-tone RU and a 242-tone RU. The 996+484-tone RU may be in a 160 MHz bandwidth including the first 80 MHz subblock and the second 80 MHz subblock (4 possible combination cases), or may be in a 160 MHz bandwidth including the second 80 MHz subblock and the third 80 MHz subblock (4 possible combination cases). The 484+242-tone RU may be in 80 MHz (four possible combinations) that does not cover the 996+484-tone RU. In this case, when the 240 MHz bandwidth includes the 996+484-tone RU and the 484+242-tone RU, there are 2*4*4=32 cases (32 cases).

In the mode 6, when the bandwidth is consecutive 240 MHz, the 240 MHz bandwidth includes two 996+484-tone RUs. Each 996+484-tone RU includes a 484-tone RU and a 996-tone RU. There are 2 possible combination cases (2 cases) in the mode 6.

In the mode 7, when the bandwidth is 240 MHz, the 240 MHz bandwidth may include a 2*996+484-tone RU. A 2*996-tone RU forming the 2*996+484-tone RU is located in consecutive 160 MHz. A 484-tone RU forming the 2*996+484-tone RU may be located in four different 80 MHz subblocks, and the mode 7 includes 4 possible combination cases (4 cases).

The STA may identify, according to an MRU combination identification method table shown in Table 7, a combination type of an MRU in the 240 MHz bandwidth and combination cases of RUs forming the MRU, to allocate an MRU including a plurality of RUs to one or more stations when the bandwidth is 240 MHz. It should be understood that numbers of MRUs in 80 MHz subblocks in each row in Table 7 may be exchanged. When the numbers of MRUs in 80 MHz subblocks in a same row are exchanged, corresponding MRU combination types remain unchanged.

TABLE 7

| Bandwidth (BW) | Number of 242-tone RUs that belong to an MRU in the first 80 MHz subblock | Number of 242-tone RUs that belong to an MRU in the second 80 MHz subblock | Number of 242-tone RUs that belong to an MRU in the third 80 MHz subblock | MRU combination type (MRU combinations) |
|---|---|---|---|---|
| 240 MHz | 3 | 0 | 0 | 484 + 242 |
| | 3 | 3 | 0 | (484 + 242) + (484 + 242) |
| | 3 | 3 | 3 | (484 + 242) + (484 + 242) + (484 + 242) |
| | 4 | 2 | 0 | 996 + 484 |
| | 4 | 2 | 3 | (996 + 484) + (484 + 242) |
| | 4 | 4 | 2 | 2*996 + 484 |
| | 4 | 4 | 4 | (996 + 484) + (996 + 484) |

For example, when the STA identifies, based on the resource unit allocation subfields corresponding to the 240 MHz bandwidth, that the first 80 MHz subblock in the 240 MHz bandwidth includes three 242-tone RUs that belong to an MRU, the second 80 MHz subblock includes three 242-tone RUs that belong to an MRU, and the third 80 MHz subblock includes zero 242-tone RUs that belong to an MRU, the STA determines that the 240 MHz bandwidth includes two 484+242-tone RUs. One 484+242-tone RU is located in the lowest 60 MHz frequency of the first 80 MHz subblock in the 240 MHz bandwidth, and the other 484+242-tone RU is located in the highest 20 MHz frequency of the first 80 MHz subblock in the 240 MHz bandwidth and the lowest 40 MHz frequency of the second 80 MHz subblock in the 240 MHz bandwidth.

Alternatively, when the STA identifies, based on the resource unit allocation subfields corresponding to the 240 MHz bandwidth, that the first 80 MHz subblock in the 240 MHz bandwidth includes zero 242-tone RUs that belong to an MRU, the second 80 MHz subblock includes three 242-tone RUs that belong to an MRU, and the third 80 MHz subblock includes three 242-tone RUs that belong to an MRU, the STA determines that the 240 MHz bandwidth includes two 484+242-tone RUs. One 484+242-tone RU is located in the lowest 60 MHz frequency of the second 80 MHz subblock in the 240 MHz bandwidth, and the other 484+242-tone RU is located in the highest 20 MHz frequency of the second 80 MHz subblock in the 240 MHz bandwidth and the lowest 40 MHz frequency of the third 80 MHz subblock in the 240 MHz bandwidth.

For another example, when the STA identifies, based on the resource unit allocation subfields corresponding to the 240 MHz bandwidth, that the first 80 MHz subblock in the 240 MHz bandwidth includes four 242-tone RUs that belong to an MRU, the second 80 MHz subblock includes four 242-tone RUs that belong to an MRU, and the third 80 MHz subblock includes four 242-tone RUs that belong to an MRU, the STA determines that the 240 MHz bandwidth includes two 996+484-tone RUs. However, the STA cannot identify, according to Table 7, a 484-tone RU and a 996-tone RU that form each 996+484-tone RU. When all the twelve 242-tone RUs of the 240 MHz bandwidth belong to an MRU, a possible RU combination case is not single.

Figure 6E:
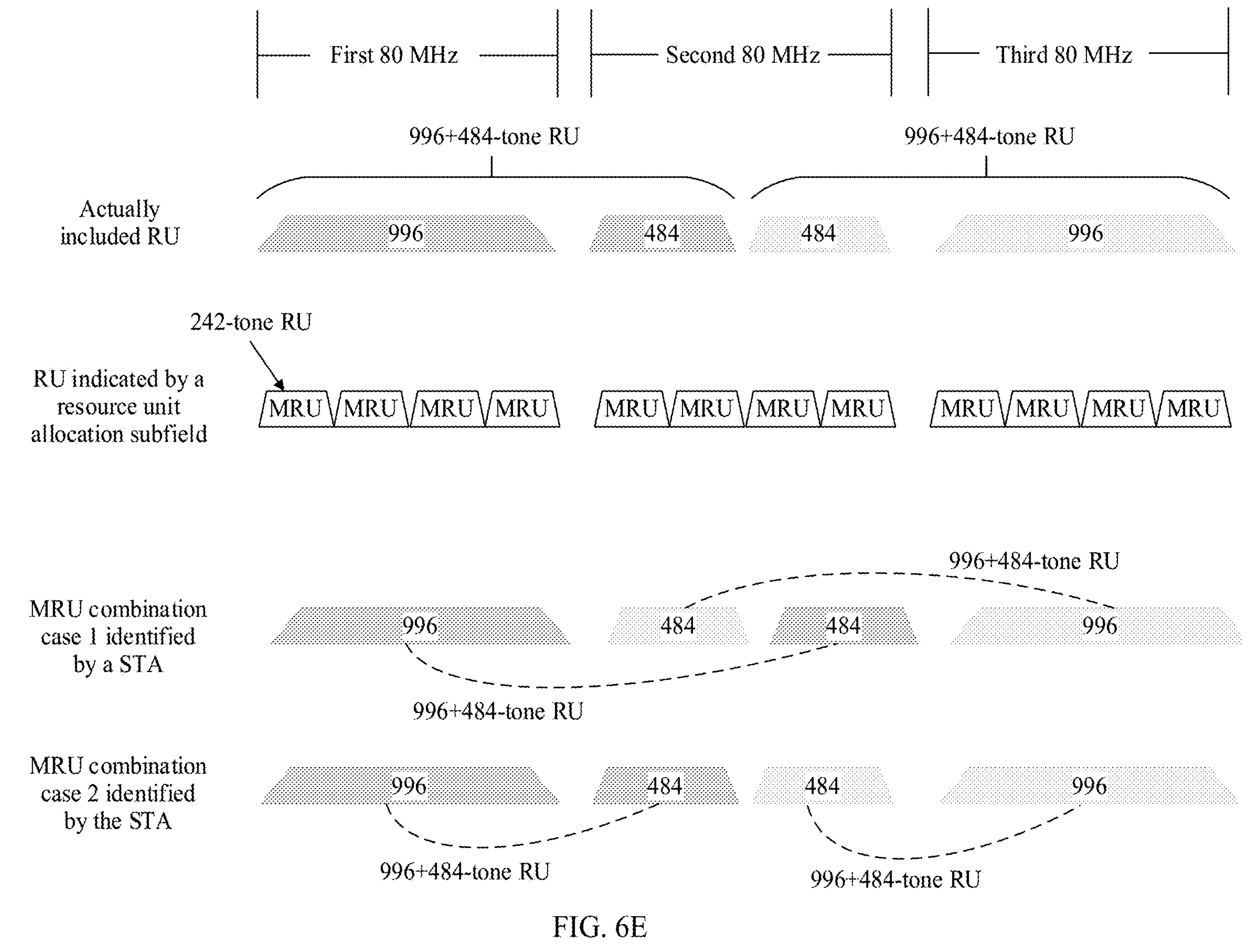
FIG. 6E is another schematic scenario diagram of MRU combination cases included in 160 MHz.

FIG. 6E is another schematic scenario diagram of MRU combination cases included in 160 MHz. As shown in FIG. 6E, the first to the fourth 242-tone RUs of the first 80 MHz subblock and the third and the fourth 242-tone RUs of the second 80 MHz subblock may form a 996+484-tone RU, and the first and the second 242-tone RUs of the second 80 MHz subblock and the first to the fourth 242-tone RUs of the third 80 MHz subblock may form a 996+484-tone RU. Alternatively, the first to the fourth 242-tone RUs of the first 80 MHz subblock and the first and the second 242-tone RUs of the second 80 MHz subblock may form a 996+484-tone RU, and the third and the fourth 242-tone RUs of the second 80 MHz subblock and the first to the fourth 242-tone RUs of the third 80 MHz subblock may form a 996+484-tone RU.

It can be learned that, according to the indices in Table 5, when 240 MHz in the bandwidth for transmitting the PPDU includes two 996+484-tone RUs, a specific 996-tone RU and a specific 484-tone RU that form a 996+484-tone RU cannot be indicated. In this case, the STA receiving the PPDU cannot determine, based on the resource unit allocation subfields, a specific 996-tone RU and a specific 484-tone RU that form a 996+484-tone RU allocated to the STA. In this case, the AP cannot allocate the 2*996+484-tone RU or the 996+484-tone RU to one or more stations.

Figures 1, 6F:
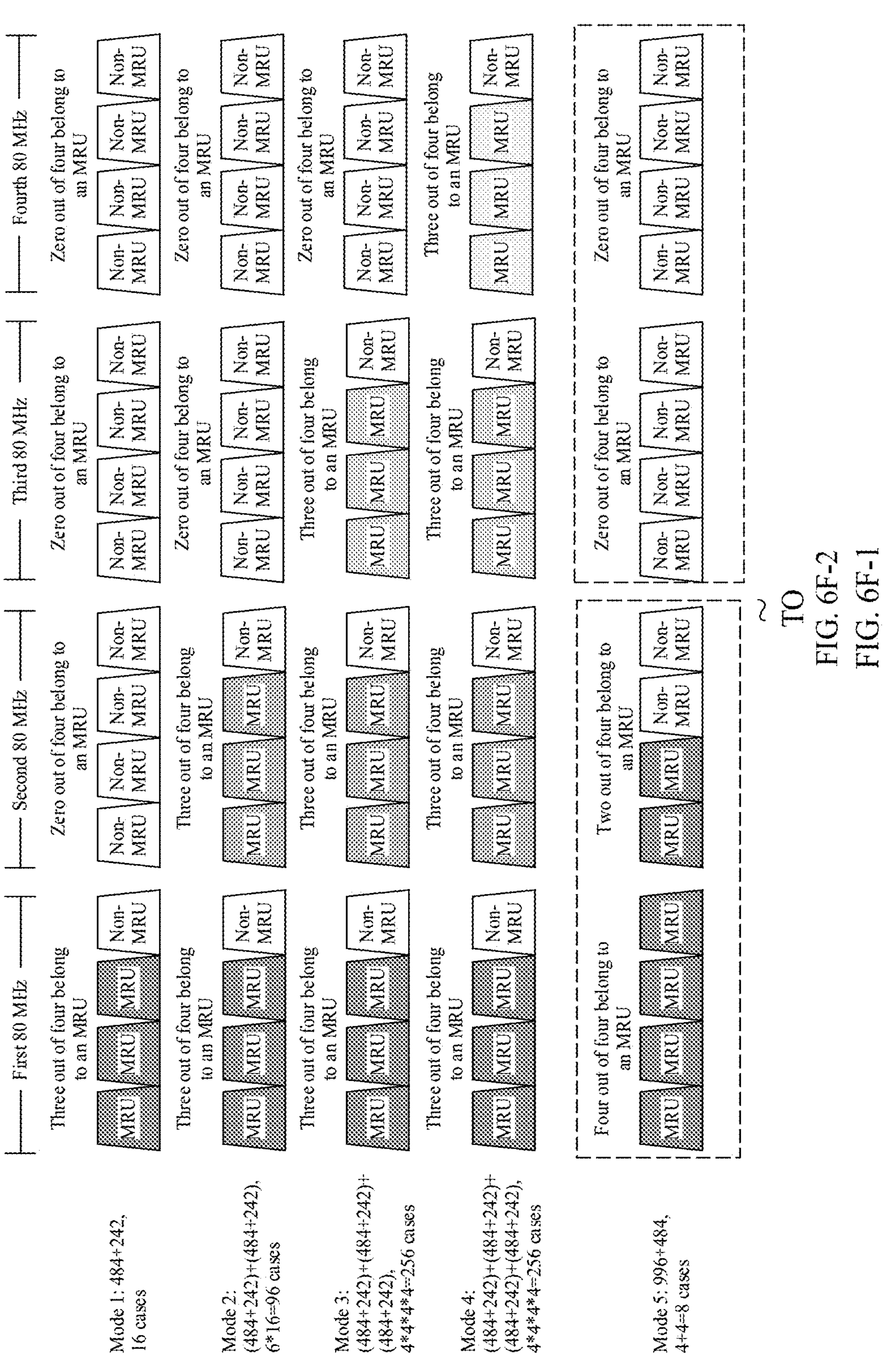
Figures 2, 6F:
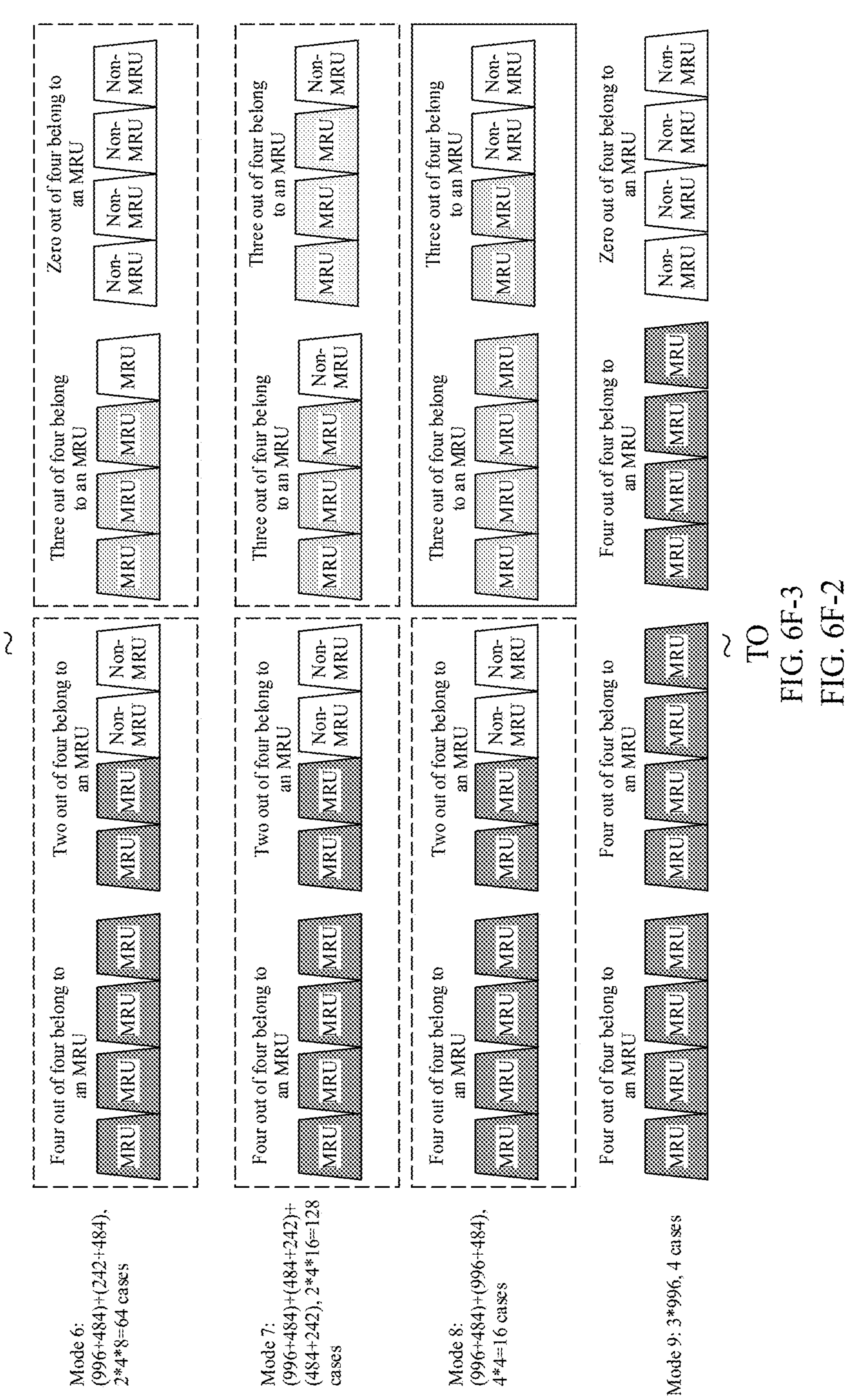
Figures 3, 6F:
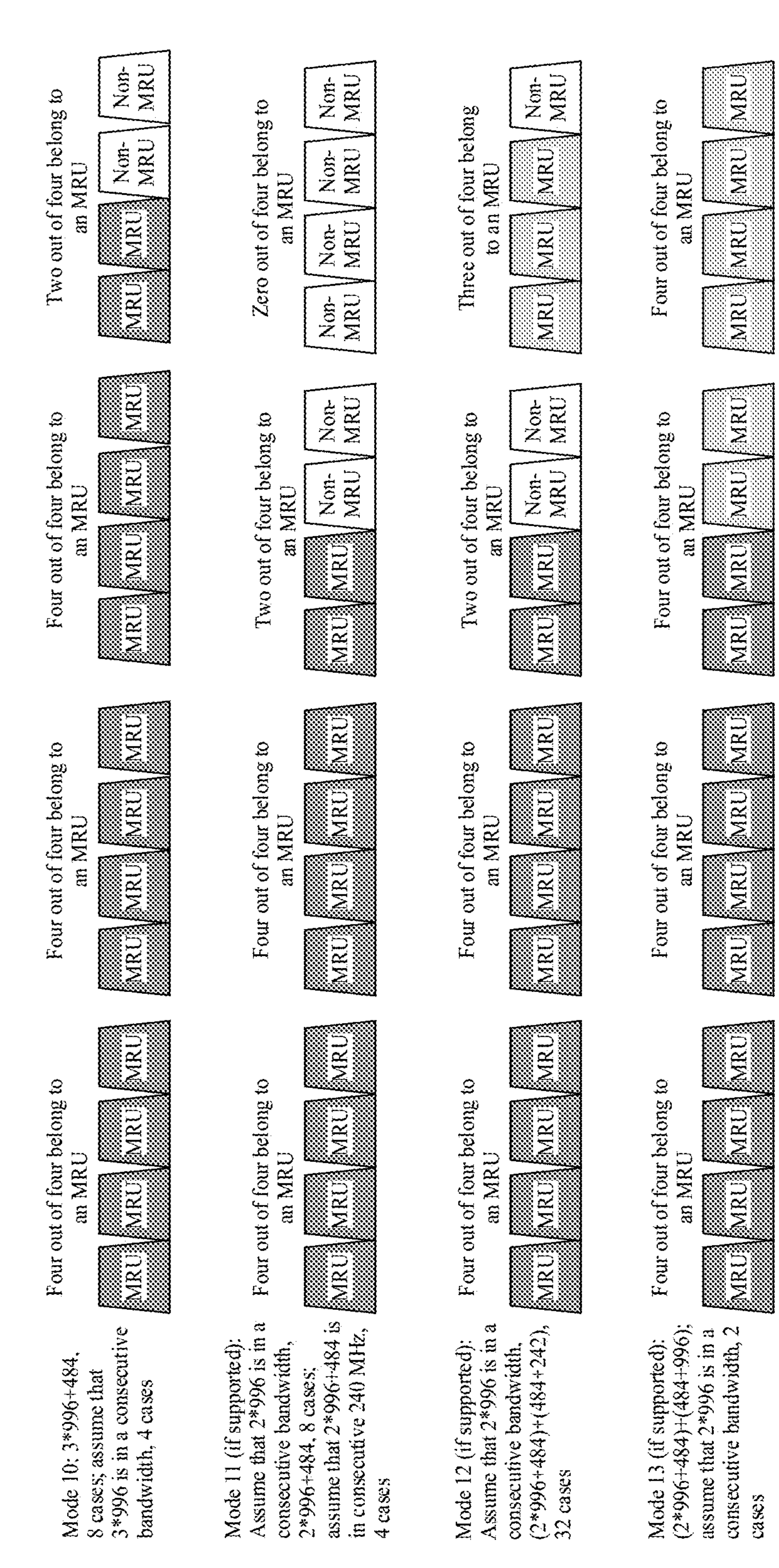

FIG. 6F-1 to FIG. 6F-3 are a schematic scenario diagram of MRU combination cases included in 320 MHz. As shown in FIG. 6F-1 to FIG. 6F-3, when the bandwidth is 320 MHz, there are thirteen modes for an included MRU. The mode 1 to the mode 10 may be understood according to FIG. 6F-1 to FIG. 6F-3 with reference to the foregoing related descriptions according to FIG. 6B to FIG. 6D.

In the mode 11, if a next-generation communication standard (for example, 802.11be) allows a bandwidth of 320 MHz to include a 2*996+484-tone RU: If a 2*996-tone RU forming the 2*996+484-tone RU needs to be located in consecutive 160 MHz, a 484-tone RU forming the 2*996+484-tone RU may be located in eight different 40 MHz subblocks, and there are 8 possible combination cases (8 cases) in the mode 11. If a 2*996-tone RU and 484-tone RUs forming the 2*996+484-tone RU need to be located in consecutive 240 MHz, the 484-tone RUs forming the 2*996+484-tone RU may be located in eight different 40 MHz subblocks, and there are 4 possible combination cases (4 cases) in the mode 11.

In the mode 12, if a next-generation communication standard (for example, 802.11be) allows a bandwidth of 320 MHz to include a 2*996+484-tone RU and a 484+242-tone RU: If a 2*996-tone RU forming the 2*996+484-tone RU needs to be located in consecutive 160 MHz, there are 8 possible combination cases for a 2*996-tone RU and a 484-tone RU forming the 2*996+484-tone RU. The 484+242-tone RU may be located in 80 MHz that does not cover the 2*996+484-tone RU, and there are 4 possible combination cases for the 484+242-tone RU in one 80 MHz subblock. In this way, there are a total of 8*4=32 combination cases (32 cases) in the mode 12.

In the mode 13, if a next-generation communication standard (for example, 802.11be) allows a bandwidth of 320 MHz to include a 2*996+484-tone RU and a 996+484-tone RU, and RUs in an MRU group need to be consecutive, there are 2 possible combination cases (2 cases) in the mode 13. In a possible combination case, the 2*996+484-tone RU is obtained by combining a 2*996-tone RU corresponding to the lowest 160 MHz frequency in the 320 MHz bandwidth and a 484-tone RU corresponding to the lowest 40 MHz frequency of the third 80 MHz subblock, and the 996+484-tone RU is obtained by combining a 484-tone RU corresponding to the highest 40 MH frequency of the third 80 MHz subblock in the 320 MHz bandwidth and a 996-tone RU corresponding to the fourth 80 MHz subblock. In another possible combination case, the 996+484-tone RU is obtained by combining a 996-tone RU corresponding to the first 80 MHz subblock in the 320 MHz bandwidth and a 484-tone RU corresponding to the lowest 40 MHz frequency of the second 80 MHz subblock, and the 2*996+484-tone RU is obtained by combining a 484-tone RU corresponding to the highest 40 MHz frequency of the second 80 MHz subblock and 996-tone RUs corresponding to the third 80 MHz subblock and the fourth 80 MHz subblock.

The STA may identify, according to a method table for identifying an MRU combination shown in Table 8, a combination type of an MRU in the 320 MHz bandwidth and combination cases of RUs forming the MRU, to allocate a plurality of RUs to one or more stations when the bandwidth is 320 MHz. It should be understood that numbers of MRUs in 80 MHz subblocks in each row in Table 8 may be exchanged. When the numbers of MRUs in 80 MHz subblocks in a same row are exchanged, corresponding MRU combination types remain unchanged.

TABLE 8

| Bandwidth (BW) | Number of 242-tone RUs that belong to an MRU in the first 80 MHz subblock | Number of 242-tone RUs that belong to an MRU in the second 80 MHz subblock | Number of 242-tone RUs that belong to an MRU in the third 80 MHz subblock | Number of 242-tone RUs that belong to an MRU in the fourth 80 MHz subblock | MRU combination type (MRU combinations) |
|---|---|---|---|---|---|
| 320 MHz | 3 | 0 | 0 | 0 | 484 + 242 |
| | 3 | 3 | 0 | 0 | (484 + 242) + (484 + 242) |
| | 3 | 3 | 3 | 0 | (484 + 242) + (484 + 242) + (484 + 242) |
| | 3 | 3 | 3 | 3 | (484 + 242) + (484 + 242) + (484 + 242) + (484 + 242) |
| | 4 | 2 | 0 | 0 | 996 + 484 |
| | 4 | 2 | 3 | 0 | (996 + 484) + (484 + 242) |
| | 4 | 2 | 3 | 3 | (996 + 484) + (484 + 242) + (484 + 242) |
| | 4 | 2 | 4 | 2 | (996 + 484) + (996 + 484) |
| | 4 | 4 | 4 | 0 | 3*996 |
| | 4 | 4 | 4 | 2 | 3*996 + 484 |
| | 4 | 4 | 2 | 0 | 2*996 + 484 |
| | 4 | 4 | 2 | 3 | (2*996 + 484) + (484 + 242) |
| | 4 | 4 | 4 | 4 | (2*996 + 484) + (996 + 484) |

For example, when the STA identifies, based on the resource unit allocation subfields corresponding to the 320 MHz bandwidth, that the first 80 MHz subblock in the 320 MHz bandwidth includes four 242-tone RUs that belong to an MRU, the second 80 MHz subblock includes two 242-tone RUs that belong to an MRU, the third 80 MHz subblock includes zero 242-tone RUs that belong to an MRU, and the fourth 80 MHz subblock includes zero 242-tone RUs that belong to an MRU, the STA determines that the 320 MHz bandwidth includes one 996+484-tone RU. The 996+484-tone RU is located in the lowest 40 MHz frequency of the first 80 MHz subblock and the lowest 40 MHz of the second 80 MHz subblock in the 320 MHz bandwidth.

Alternatively, when the STA identifies, based on the resource unit allocation subfields corresponding to the 320 MHz bandwidth, that the first 80 MHz subblock in the 240 MHz bandwidth includes zero 242-tone RUs that belong to an MRU, the second 80 MHz subblock includes zero 242-tone RUs that belong to an MRU, the third 80 MHz subblock includes four 242-tone RUs that belong to an MRU, and the fourth 80 MHz subblock includes two 242-tone RUs that belong to an MRU, the STA determines that the 240 MHz bandwidth includes one 996+484-tone RU. The 996+484-tone RU is located in the lowest 40 MHz frequency of the third 80 MHz subblock and the fourth 80 MHz subblock in the 320 MHz bandwidth.

As specified in a next-generation communication standard (for example, 802.11be), when a bandwidth of 320 MHz may include a 2*996+484-tone RU and a 996+484-tone RU, only one combination case is supported.

Figure 6G:
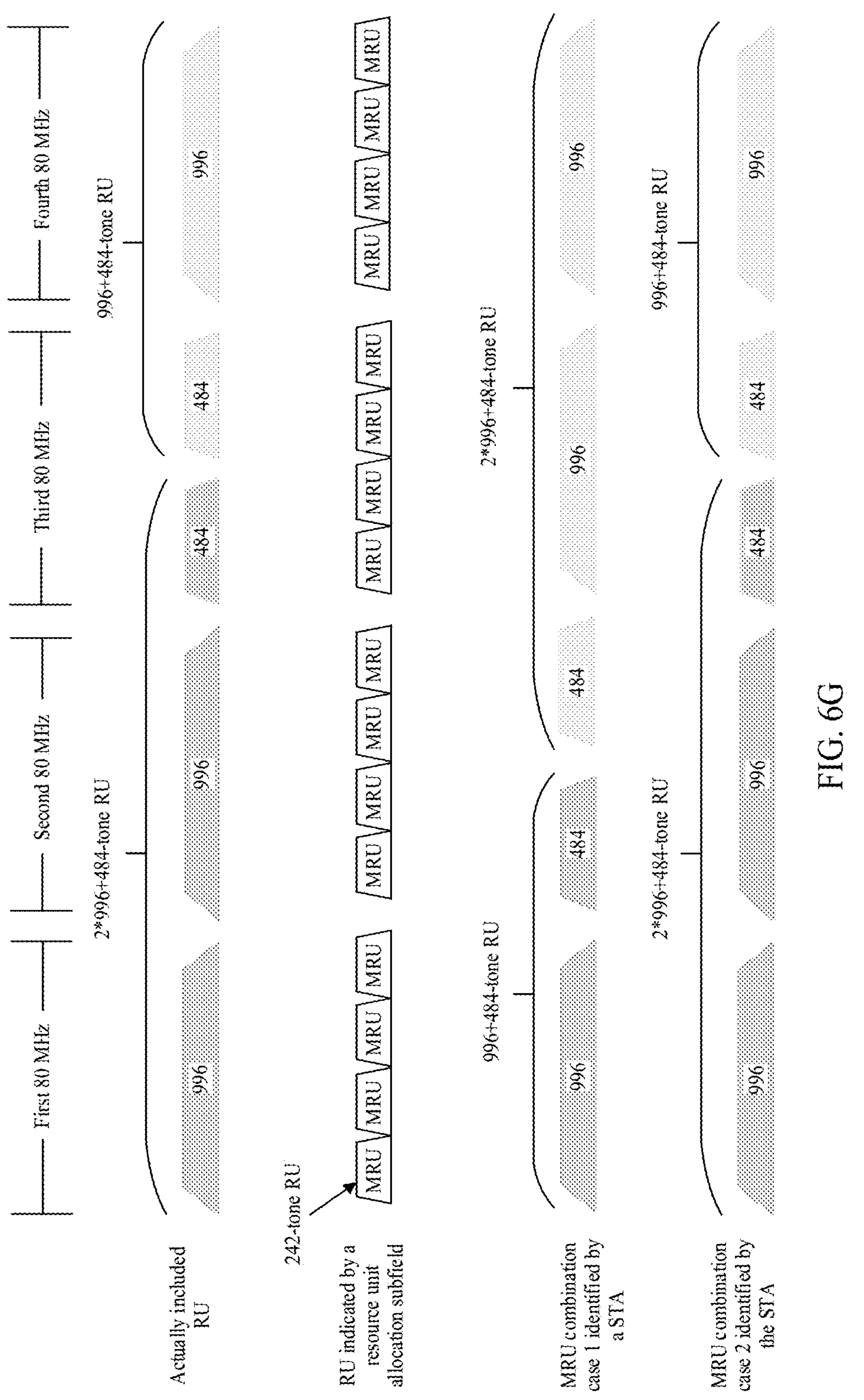
FIG. 6G is another schematic scenario diagram of MRU combination cases included in 320 MHz.

In a scenario of the mode 13, FIG. 6G is a schematic scenario diagram of MRU combination cases included in 320 MHz. When the bandwidth for transmitting the PPDU is 320 MHz, a 2*996+484-tone RU is located in the lowest 200 MHz frequency in the 320 MHz bandwidth, and a 996+484-tone RU is located in the highest 160 MHz frequency in the 320 MHz bandwidth. In a signal field of the PPDU, resource unit allocation subfields corresponding to the first to the sixteenth 242-tone RUs in the 320 MHz bandwidth may be indicated by one index in Table 5, to indicate that the corresponding 242-tone RUs belong to an MRU. In this way, the STA that receives the PPDU may determine, based on the resource unit allocation subfields 1 to 16 in the signal field and with reference to Table 8, that first to the sixteenth 20 MHz subblocks in the 320 MHz bandwidth all correspond to an MRU, and the 320 MHz bandwidth includes one 2*996+484-tone RU and one 996+484-tone RU. However, the STA cannot determine, based on the resource unit allocation subfields, specific 10 242-tone RUs that belong to the 2*996+484-tone RU and specific six 242-tone RUs that belong to the 996+484-tone RU in the 320 MHz bandwidth.

For example, when the resource unit allocation subfields 1 to 16 indicate that the first to the sixteenth 242-tone RUs in the 320 MHz bandwidth all correspond to an MRU, it is possible that the first to the tenth 242-tone RUs belong to the 2*996+484-tone RU, and the eleventh to the sixteenth 242-tone RUs belong to the 996+484-tone RU; or the first to the sixth 242-tone RUs belong to the 996+484-tone RU, and the seventh to sixteenth 242-tone RUs belong to the 2*996+484-tone RU. In this case, the STA receiving the PPDU cannot accurately determine an RU combination case.

It can be learned that, in the index manner in Table 5, when the bandwidth, of 320 MHz, for transmitting the PPDU includes the 2*996+484-tone RU and the 996+484-tone RU, a 2*996-tone RU and a 484-tone RU that form the 2*996+484-tone RU and a 996-tone RU and a 484-tone RU that form the 996+484-tone RU cannot be accurately indicated. In this case, among STAs that receive the PPDU, a STA to which the 2*996+484-tone RU is allocated cannot determine, based on the resource unit allocation subfield, a specific 2*996-tone RU and a specific 484-tone RU that form the 2*996+484-tone RU allocated to the STA. Therefore, the AP cannot allocate the 2*996+484-tone RU or the 996+484-tone RU to one or more stations.

In another MRU indication solution, the resource unit allocation subfield indicates a specific MRU to which the 242-tone RU corresponding to the resource unit allocation subfield belongs, and indicates a number of user fields contributed to the user specific field in the same EHT-SIG content channel as the resource unit allocation subfield. Specifically, the resource unit allocation subfield may be indicated by an index in Table 9.

TABLE 9

| Resource unit allocation subfield | Indicated content | Entry quantity |
|---|---|---|
| Index 1 | belongs to one 484 + 996 MRU; contributes zero user fields to a user specific field in a same EHT-SIG content channel as this resource unit allocation subfield | 1 |
| Indices 2 to 9 | belongs to one 484 + 996 MRU; contributes one to eight user fields to a user specific field in a same EHT-SIG content channel as this resource unit allocation subfield | 8 |
| Index 10 | belongs to one 242 + 484 MRU; contributes zero user fields to a user specific field in a same EHT-SIG content channel as this resource unit allocation subfield | 1 |

TABLE 9-continued

| Resource unit allocation subfield | Indicated content | Entry quantity |
|---|---|---|
| Indices 11 to 18 | belongs to one 242 + 484 MRU; contributes one to eight user fields to a user specific field in a same EHT-SIG content channel as this resource unit allocation subfield | 8 |
| Index 19 | belongs to one 2*996 + 484 MRU; contributes zero user fields to a user specific field in a same EHT-SIG content channel as this resource unit allocation subfield | 1 |
| Indices 20 to 27 | belongs to one 2*996 + 484 MRU; contributes one to eight user fields to a user specific field in a same EHT-SIG content channel as this resource unit allocation subfield | 8 |
| Index 28 | belongs to one 3*996 MRU; contributes eight user fields to a user specific field in a same EHT-SIG content channel as this resource unit allocation subfield | 1 |
| Indices 29 to 36 | belongs to one 3*996 MRU; contributes one to eight user fields to a user specific field in a same EHT-SIG content channel as this resource unit allocation subfield | 8 |
| Index 37 | belongs to one 3*996 + 484 MRU; contributes zero user fields to a user specific field in a same EHT-SIG content channel as this resource unit allocation subfield | 1 |
| Indices 38 to 45 | belongs to one 3*996 + 484 MRU; contributes one to eight user fields to a user specific field in a same EHT-SIG content channel as this resource unit allocation subfield | 8 |

Any index in Table 9 indicates an MRU to which the 242-tone RU corresponding to the resource unit allocation subfield belongs, and indicates that the number of user fields contributed to the user specific field in the same EHT-SIG content channel as the resource unit allocation subfield. The number of user fields contributed to the user specific field in the same EHT-SIG content channel as the resource unit allocation subfield is a number of user fields corresponding to the resource unit allocation subfield in the EHT-SIG content channel in which the resource unit allocation subfield is located. A user field corresponding to the resource unit allocation subfield is a user field of a user to which a resource unit indicated by the resource unit allocation subfield is allocated.

Optionally, any index indicating that a number of user fields is 1 to 8 in Table 9 may include an RU allocation indicating part and a user field indicating part. The RU allocation indicating part indicates an MRU to which the 242-tone RU corresponding to the resource unit allocation subfield belongs. The user field indicating part indicates the number of user fields contributed to the user specific field in the same EHT-SIG content channel as the resource unit allocation subfield.

The user field indicating part may be, for example, 3 bits, and indicates that the number of user fields contributed to the user specific field in the same EHT-SIG content channel as the resource unit allocation subfield is one of 1 to 8.

Specifically, a structure of any index indicating that the number of user fields is 1 to 8 in Table 9 may be $k_n k_{n-1} \ldots k_2 k_1 y_2 y_1 y_0$, where $k_n k_{n-1} \ldots k_2 k_1$ is the RU allocation indicating part, n is a number of bits of the RU allocation indicating part, $y_2y_1y_0$ is the user field indicating part, is 3 bits, and indicates the one to eight user fields separately.

In a specific example, when the bandwidth for transmitting the PPDU is 320 MHz, the first to the tenth 242-tone RUs belong to one 2*996+484-tone RU, and the eleventh to the sixteenth 242-tone RUs belong to one 996+484-tone RU. In the signal field of the PPDU, resource unit allocation subfields corresponding to the first to the tenth 242-tone RUs in the 320 MHz bandwidth may use an index in the indices 19 to 27 in Table 9 to indicate that the corresponding 242-tone RU belongs to a 2*996+484-tone RU. The resource unit allocation subfields corresponding to the eleventh to the sixteenth 242-tone RUs in the 320 MHz bandwidth may use the indices 1 to 9 in Table 9 to indicate that the corresponding 242-tone RU belongs to a 996+484-tone RU.

In this way, the STA receiving the PPDU may determine, based on the resource unit allocation subfields 1 to 16 in the signal field, that the first to the tenth 242-tone RUs in the 320 MHz bandwidth belong to one 2*996+484-tone RU and that the eleventh to the sixteenth 242-tone RUs belong to one 996+484-tone RU. It can be learned that such a solution can accurately indicate a case in which when the bandwidth for transmitting the PPDU is 320 MHz, the first to the tenth 242-tone RUs belong to one 2*996+484-tone RU, and the eleventh to the sixteenth 242-tone RUs belong to one 996+484-tone RU.

In other words, such a solution can accurately indicate that when the bandwidth, of 320 MHz, for transmitting the PPDU includes the 2*996-tone RU and the 996+484-tone RU, the resource unit allocation subfield can accurately indicate, by the indices in Table 9, the 2*996-tone RU and the 484-tone RU that form the 2*996+484-tone RU and the 996-tone RU and the 484-tone RU that form the 996+484-tone RU. In this case, among STAs that receive the PPDU, a STA to which the 2*996+484-tone RU is allocated can determine, based on the resource unit allocation subfield, a specific 2*996-tone RU and a specific 484-tone RU that form the 2*996+484-tone RU allocated to the STA.

For another example, when the bandwidth for transmitting the PPDU is 240 MHz, in an increasing frequency order, the first to the sixth 242-tone RUs belong to one 484+996-tone RU, and the seventh to twelfth 242-tone RUs belong to one 996+484-tone RU. The first to the fourth 242-tone RUs may be understood as the first to the fourth 242-tone RUs in the first 80 MHz subblock, and the fifth to the eighth 20 MHz subblocks may be understood as the first to the fourth 242-tone RUs in the second 80 MHz subblock, the ninth to the twelfth 20 MHz subblocks may be understood as the first to the fourth 242-tone RUs in the third 80 MHz subblock.

The signal field of the PPDU includes a resource unit allocation subfield 1 to a resource unit allocation subfield 12 that respectively correspond to the first to the twelfth 242-tone RUs in the 240 MHz bandwidth, and the resource unit allocation subfield 1 to the resource unit allocation subfield 12 may be indicated by an index in Table 8. In this way, the STA receiving the PPDU may determine, based on the resource unit allocation subfields 1 to 12 in the signal field, that the first to the twelfth 242-tone RUs in the 240 MHz bandwidth belong to the 996+484-tone RU. It can be learned from the foregoing description corresponding to FIG. 6E that, a case in which each 996+484-tone RU includes a 242-tone RU is not single. For example, the first to fourth 242-tone RUs and the seventh and the eighth 242-tone RUs may belong to one 996+484-tone RU, and the fifth and the sixth 242-tone RUs and the ninth to the twelfth 242-tone RUs may belong to one 996+484-tone RU. Alternatively, the first to the sixth 242-tone RUs belong to one 996+484-tone RU, and the seventh to the twelfth 242-tone RUs belong to one 996+484-tone RU.

It can be learned that in the solution in which the resource unit allocation subfield is indicated by an index in Table 9, when the 240 MHz bandwidth includes two (996+484)-tone RUs, the resource unit allocation subfield cannot indicate, by the index in Table 9, a 996-tone RU and a 484-tone RU that form each 996+484-tone RU. The STA receiving the PPDU cannot determine a specific 996-tone RU and a specific 484-tone RU that form a 996+484-tone RU in the 240 MHz bandwidth, and therefore, one 996+484-tone RU or two (996+484)-tone RUs cannot be allocated to one or more stations.

Embodiments of this application provide some solutions that can resolve a problem that a resource unit allocation subfield cannot accurately indicate a 2*996+484-tone RU and a 996+484-tone RU included in the 320 MHz bandwidth.

In this solution, the 2*996+484-tone RU is an MRU including a 2*996-tone RU of a lower frequency and a 484-tone RU of a higher frequency, and an MRU including a 484-tone RU of a lower frequency and a 2*996-tone RU of a higher frequency. In this solution, the 996+484-tone RU is an MRU including a 996-tone RU of a lower frequency and a 484-tone RU of a higher frequency, and an MRU including a 484-tone RU of a lower frequency and a 996-tone RU of a higher frequency.

In some embodiments, as specified in a communication standard (for example, a standard later than 802.11be and 802.11be), a 2*996+484-tone RU and a 996+484-tone RU are not allowed to be included in a consecutive 320 MHz bandwidth. In this way, the resource unit allocation subfield does not need to indicate the 2*996+484-tone RU and the 996+484-tone RU in the 320 MHz bandwidth. This can resolve a problem that accurate indication cannot be performed.

In some other embodiments, as specified in a communication standard (for example, a standard later than 802.11be and 802.11be), when a 320 MHz bandwidth includes a 2*996+484-tone RU and a 996+484-tone RU, there is only one combination case of a 2*996-tone RU and a 484-tone RU that form the 2*996+484-tone RU and a 996-tone RU and a 484-tone RU that form the 996+484-tone RU.

Figures 7A, 7B:
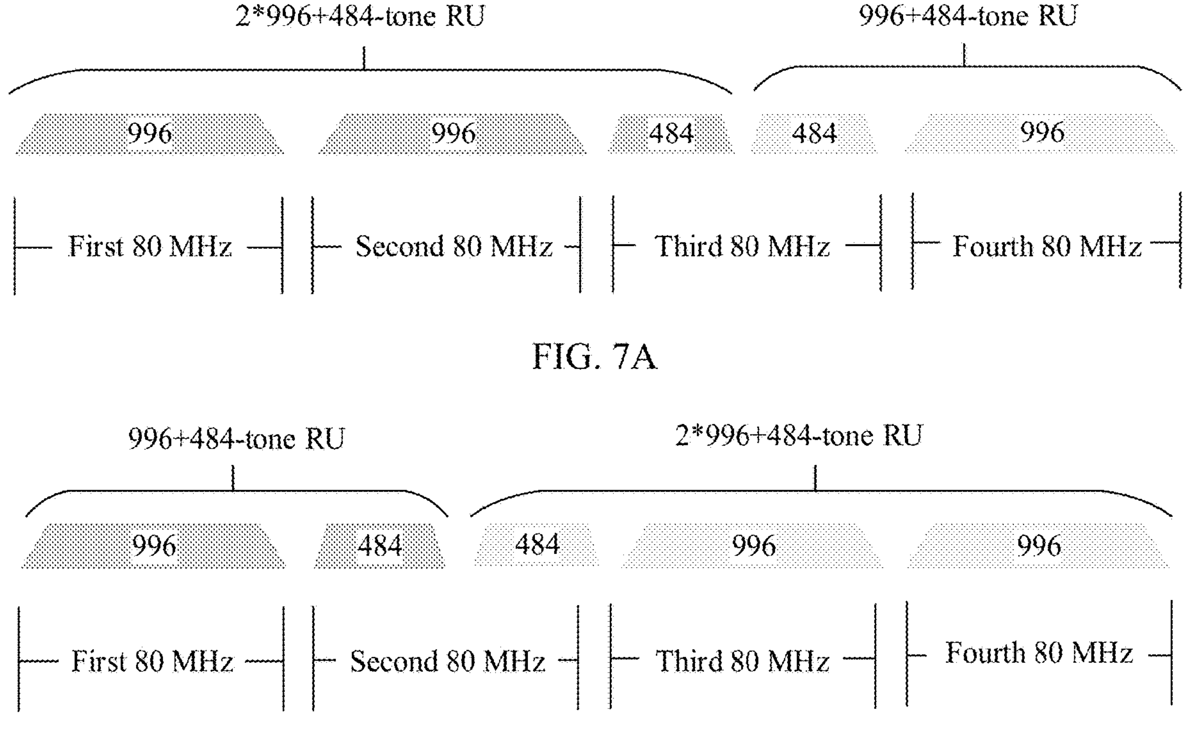
FIG. 7A is another schematic scenario diagram of MRU combination cases included in 240 MHz.
FIG. 7B is another schematic scenario diagram of MRU combination cases included in 240 MHz.

For example, FIG. 7A is a schematic scenario diagram of MRU combination cases included in 240 MHz. As specified in the communication standard, when the 320 MHz bandwidth includes a 2*996+484-tone RU and a 996+484-tone RU, the 320 MHz bandwidth includes a 2*996-tone RU, a 484-tone RU, a 484-tone RU, and a 996-tone RU in an increasing absolute-frequency order. That is, a 2*996-tone RU corresponding to the first 80 MHz subblock and the second 80 MHz subblock in the 320 MHz bandwidth and a 484-tone RU corresponding to the first 40 MHz subblock of the third 80 MHz subblock form the 2*996+484-tone RU, and a 484-tone RU corresponding to the second 40 MHz subblock of the third 80 MHz subblock and a 996-tone RU corresponding to the fourth 80 MHz subblock form the 996+484-tone RU.

For another example, FIG. 7B is a schematic scenario diagram of MRU combination cases included in 240 MHz. As specified in the communication standard, when the 320 MHz bandwidth includes a 2*996-tone+484 RU and a 996+484-tone RU, the 320 MHz bandwidth includes a 996-tone RU, a 484-tone RU, a 484-tone RU, and a 2*996-tone RU in an increasing absolute-frequency order. That is, a 996-tone RU corresponding to the first 80 MHz subblock in the 320 MHz bandwidth and a 484-tone RU corresponding to the first 40 MHz subblock of the second 80 MHz subblock form the 996+484-tone RU, and a 484-tone RU corresponding to the second 40 MHz subblock of the second 80 MHz subblock and a 2*996-tone RU corresponding to the third 80 MHz subblock and the fourth 80 MHz subblock form the 996+484-tone RU.

Certainly, when as specified in the communication standard, the 320 MHz bandwidth includes a 2*996+484-tone RU and a 996+484-tone RU, a 2*996-tone RU and a 484-tone RU that form the 2*996+484-tone RU and a 996-tone RU and a 484-tone RU that form the 996+484-tone RU may have another combination case. This application does not limit a specific allowed combination case specified in the communication standard.

In this way, the STA receiving the PPDU only needs to identify, based on the resource unit allocation subfield, that the 320 MHz bandwidth includes the 2*996+484-tone RU and the 996+484-tone RU, to determine the 2*996-tone RU and the 484-tone RU that form the 2*996-tone+484 RU and the 996-tone RU and the 484-tone RU that form the 996+484-tone RU.

For example, when the resource unit allocation subfield may use an index in Table 5 or an index in Table 9 to indicate that the 320 MHz bandwidth includes the 2*996+484-tone RU and the 996+484-tone RU, the STA can identify, based on the resource unit allocation subfield, that the 320 MHz bandwidth includes the 2*996+484-tone RU and the 996+484-tone RU, to determine the 2*996-tone RU and the 484-tone RU that form the 2*996-tone+484 RU and the 996-tone RU and the 484-tone RU that form the 996+484-tone RU.

In this application, the first 80 MHz subblock, the second 80 MHz subblock, the third 80 MHz subblock, and the fourth 80 MHz subblock are obtained by sorting in an increasing frequency order. Similarly, the Xth 20 MHz subblock, the Yth 40 MHz subblock, and the Zth 160 MHz subblock are also obtained by sorting in an increasing frequency order, where X, Y, and Z are sequence numbers.

This embodiment of this application further provides some indication solutions for indicating a frequency location of a single RU in an MRU. When the bandwidth, of 240 MHz, for transmitting the PPDU includes an MRU including a 484-tone RU and a 996-tone RU, the STA receiving the PPDU can accurately determine a specific 484-tone RU and a specific 996-tone RU that form the MRU.

Figure 8A:
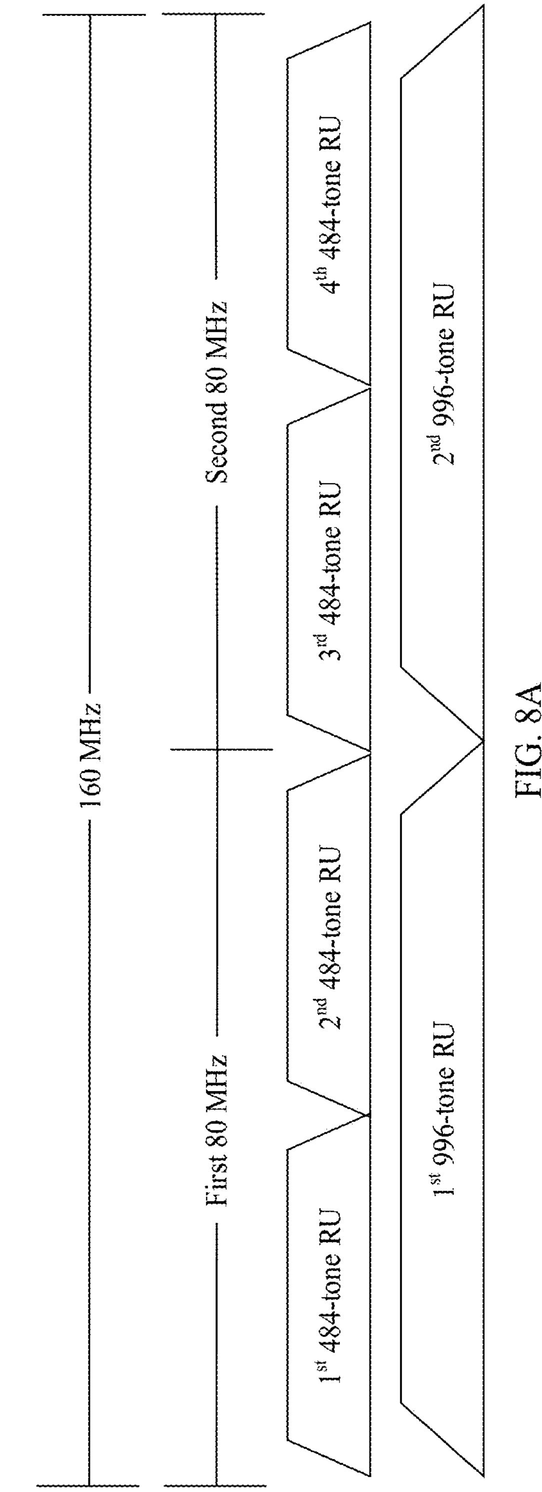
FIG. 8A is a schematic diagram of numbering a resource unit according to an embodiment of this application.

Specifically, in this embodiment of this application, the 484-tone RU and the 996-tone RU in a 160 MHz subblock are numbered. For example, FIG. 8A is a schematic diagram of sequence numbers of resource units according to an embodiment of this application. Four 484-tone RUs in the 160 MHz subblock are sequentially the first 484-tone RU ($1^{st}$ 484-tone RU), the second 484-tone RU ($2^{nd}$ 484-tone RU), the third 484-tone RU ($3^{rd}$ 484-tone RU), and the fourth 484-tone RU ($4^{h}$ 484-tone RU) in an increasing absolute-frequency order. RU numbers of the first to the fourth 484-tone RUs in the 160 MHz subblock are sequentially 1, 2, 3, and 4.

Two 996-tone RUs in the 160 MHz bandwidth are sequentially the first 996-tone RU ($1^{st}$ 484-tone RU) and the second 996-tone RU ($2^{nd}$ 484-tone RU) in an increasing absolute-frequency order. RU numbers of the first and the second 996-tone RUs in the 160 MHz subblock are sequentially 1 and 2.

Optionally, a 242-tone RU and a 484-tone RU in an 80 MHz subblock may also be numbered. For example, as shown in FIG. 8A, two 484-tone RUs in an 80 MHz subblock are sequentially the first 484-tone RU ($1^{st}$ 484-tone RU) and the second 484-tone RU ($2^{nd}$ 484-tone RU) in an increasing absolute-frequency order. RU numbers of the first 484-tone RU and the second 484-tone RU in the 80 MHz subblock are sequentially 1 and 2. Four 242-tone RUs in an 80 MHz subblock are sequentially the first 242-tone RU ($1^{st}$ 242-tone RU), the second 242-tone RU ($2^{nd}$ 242-tone RU), the third 242-tone RU ($3^{rd}$ 242-tone RU), and the fourth 242-tone RU ($4^{th}$ 242-tone RU) in an increasing absolute-frequency order. RU numbers of the first to the fourth 242-tone RUs in the 80 MHz subblock are sequentially 1, 2, 3, and 4.

In the first indication solution of indicating a frequency location of a single RU in an MRU provided in this embodiment of this application, in the signal field of the PPDU, a resource unit allocation subfield indicating the MRU including the 484-tone RU and the 996-tone RU indicates the RU numbers of the 484-tone RU and the 996-tone RU that form the MRU in the 160 MHz bandwidth in which the MRU is located, to indicate frequency locations of the 484-tone RU and the 996-tone RU that form the MRU in the 160 MHz subblock to which the 996+484-tone RU belongs.

Based on the foregoing first indication solution of indicating a frequency location of a single RU in an MRU, an embodiment of this application further provides a solution for determining, based on the signal field, frequency locations of a 484-tone RU and a 996-tone RU forming an MRU. In this solution, when the consecutive bandwidth, of 240 MHz, for transmitting the PPDU includes the MRU including the 484-tone RU and the 996-tone RU, when obtaining, based on the resource unit allocation subfield in the signal field, the frequency locations of the 484-tone RU and the 996-tone RU that form the MRU, the STA receiving the PPDU skips a resource unit allocation indication subfield corresponding to the second 80 MHz subblock in the 240 MHz bandwidth. The STA determines the frequency locations of the 484-tone RU and the 996-tone RU that form the MRU in the 160 MHz subblock to which the MRU belongs, based on the RU numbers, of the 484-tone RU and the 996-tone RU that form the MRU in the 160 MHz subblock to which the MRU belongs, indicated by the resource unit allocation indication subfield corresponding to the first 80 MHz subblock and/or the third 80 MHz subblock in the 240 MHz bandwidth. The STA determines, depending on whether the resource unit allocation subfield indicating the MRU is a resource unit allocation subfield corresponding to the first 80 MHz subblock or a resource unit allocation subfield corresponding to the third 80 MHz subblock, whether the 160 MHz subblock to which the MRU belongs is the lowest 160 MHz frequency or the highest 160 MHz frequency in the 240 MHz bandwidth, to determine a specific 484-tone RU and a specific 996-tone RU that form the MRU.

Certainly, in another embodiment, another numbering solution may also be used. In this embodiment of this application, the numbering solution in FIG. 8A is used as an example for description.

The following describes in detail the technical solutions provided in embodiments of this application with reference to the PPDU communication method provided in embodiments of this application.

In this embodiment of this application, an embodiment in which an AP sends a PPDU to a STA is used for description. The method in this application is also applicable to a scenario in which an AP sends a PPDU to an AP and a scenario in which a STA sends a PPDU to a STA.

A 996+484-tone RU in this embodiment is an MRU including a 996-tone RU with a low frequency and a 484-tone RU with a high frequency. A 484+996-tone RU in the embodiment of the PPDU communication method in this application is an MRU including a 484-tone RU with a low frequency and a 996-tone RU with a high frequency.

Figure 8B:
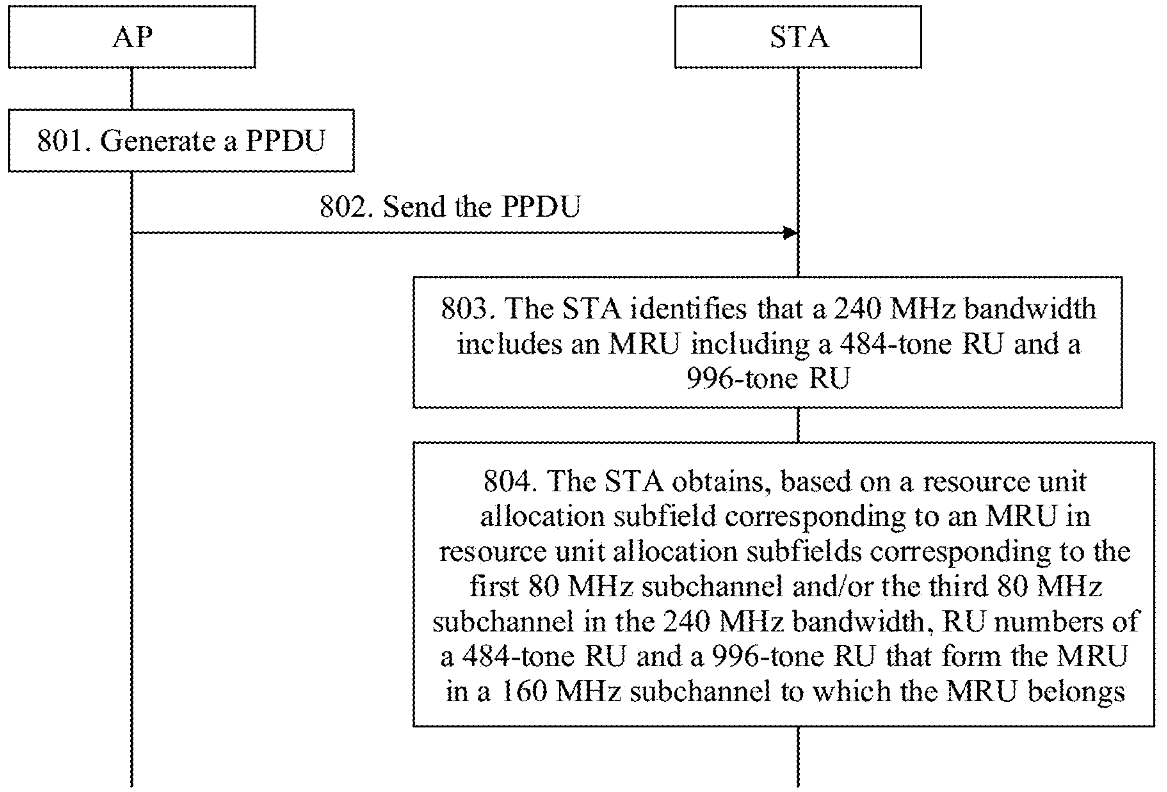
FIG. 8B is a schematic flowchart of a communication method according to an embodiment of this application.

FIG. 8B is a schematic flowchart of a PPDU communication method. The PPDU communication method includes the following steps.

801. An AP generates a PPDU.

A bandwidth for transmitting the PPDU includes consecutive 240 MHz. The 240 MHz bandwidth includes an MRU including a 996-tone RU and a 484-tone RU, and the MRU is a 996+484-tone RU or a 484+996-tone RU. For ease of description, each MRU in this embodiment may be understood as a 996+484-tone RU or a 484+996-tone RU. Optionally, the bandwidth for transmitting the PPDU is consecutive 240 MHz.

The PPDU includes a plurality of resource unit allocation subfields corresponding to the 240 MHz bandwidth, and includes at least one resource unit allocation subfield corresponding to the MRU. The resource unit allocation subfield corresponding to the MRU indicates RU numbers of the 484-tone RU and the 996-tone RU forming the MRU in a 160 MHz subblock to which the MRU belongs.

The resource unit allocation subfield corresponding to the MRU in a resource unit allocation subfield corresponding to the first 80 MHz subblock and/or a resource unit allocation subfield corresponding to the third 80 MHz subblock in the 240 MHz bandwidth is for determining or indicating frequency locations of the 484-tone RU and the 996-tone RU that form the MRU in the 240 MHz bandwidth.

Optionally, the PPDU includes a signal field, and the signal field includes a common field and a user specific field. The common field includes the plurality of resource unit allocation subfields corresponding to the 240 MHz bandwidth. The user specific field includes a user field.

Optionally, the resource unit allocation subfield corresponding to the MRU further indicates a user field corresponding to the MRU, or the resource unit allocation subfield corresponding to the MRU further indicates a number of user fields contributed to a user specific field in a same EHT-SIG content channel as the resource unit allocation subfield.

A structure of the PPDU may be but is not limited to the structure shown in FIG. 5C. The signal field may be, for example, but is not limited to, the EHT-SIG in the PPDU shown in FIG. 5C.

802. The AP sends the PPDU.

Correspondingly, a STA receives the PPDU.

803. The STA identifies, based on the resource unit allocation subfield, that the 240 MHz bandwidth includes the MRU including the 484-tone RU and the 996-tone RU.

Specifically, the STA may identify, based on the plurality of resource unit allocation subfields corresponding to the 240 MHz bandwidth in the signal field, that the 240 MHz bandwidth includes the MRU including the 484-tone RU and the 996-tone RU.

The solution in this embodiment of this application is applicable to a scenario in which the lowest 160 MHz frequency in the 240 MHz bandwidth includes one MRU including a 996-tone RU and a 484-tone RU, applicable to a scenario in which the highest 160 MHz frequency in the 240 MHz bandwidth includes one MRU including a 996-tone RU and a 484-tone RU, and applicable to a scenario in which the 240 MHz bandwidth includes two MRUs and each MRU includes a 996-tone RU and a 484-tone RU. In the scenario in which the 240 MHz bandwidth includes two MRUs and each MRU includes a 996-tone RU and a 484-tone RU, the 484-tone RU and the 996-tone RU that form one of the MRUs are at the lowest 160 MHz frequency in the 240 MHz bandwidth, and the 484-tone RU and the 996-tone RU that form the other MRU are at the highest 160 MHz frequency in the 240 MHz bandwidth.

For ease of description, in this embodiment of this application, the MRU including the 484-tone RU and the 996-tone RU in the lowest 160 MHz frequency in the 240 MHz bandwidth is referred to as a low-frequency MRU, the MRU including the 484-tone RU and the 996-tone RU in the highest 160 MHz frequency in the 240 MHz bandwidth is referred to as a high-frequency MRU.

In a possible implementation, the 240 MHz bandwidth includes a low-frequency MRU. The STA may identify, based on a resource unit allocation subfield corresponding to the first 80 MHz subblock and/or a resource unit allocation subfield corresponding to the second 80 MHz subblock, that the 240 MHz bandwidth includes an MRU including a 484-tone RU and a 996-tone RU.

In another possible implementation, the 240 MHz bandwidth includes a high-frequency MRU. The STA may identify, based on a resource unit allocation subfield corresponding to the second 80 MHz subblock and/or a resource unit allocation subfield corresponding to the third 80 MHz subblock, that the 240 MHz bandwidth includes an MRU including a 484-tone RU and a 996-tone RU.

In still another possible implementation, the 240 MHz bandwidth includes a low-frequency MRU and a high-frequency MRU. The STA may identify, based on a resource unit allocation subfield corresponding to any one or more 80 MHz subblocks in the 240 MHz bandwidth, that the 240 MHz bandwidth includes an MRU including a 484-tone RU and a 996-tone RU.

804. The STA obtains, based on a resource unit allocation subfield corresponding to the MRU in the resource unit allocation subfields corresponding to the first 80 MHz subblock and/or the third 80 MHz subblock in the 240 MHz bandwidth, RU numbers of the 484-tone RU and the 996-tone RU that form the MRU in the 160 MHz subblock to which the MRU belongs.

It should be understood that, the resource unit allocation subfield corresponding to the MRU in the resource unit allocation subfield corresponding to the first 80 MHz subblock indicates that the 160 MHz subblock to which the MRU belongs is the lowest 160 MHz frequency in the 240 MHz bandwidth, and the resource unit allocation subfield corresponding to the MRU in the resource unit allocation subfield corresponding to the third 80 MHz subblock indicates that the 160 MHz subblock to which the MRU belongs is the highest 160 MHz frequency in the 240 MHz bandwidth.

In this application, the STA obtains, based on the resource unit allocation subfield corresponding to the MRU in the resource unit allocation subfield corresponding to the first 80 MHz subblock and/or the resource unit allocation subfield corresponding to the third 80 MHz subblock, RU numbers of the 484-tone RU and the 996-tone RU that form the MRU in the 160 MHz subblock to which the MRU belongs, to determine frequency locations of the 484-tone RU and the 996-tone RU forming the MRU in the 160 MHz subblock to which the MRU belongs. Further, the STA can determine, depending on whether the resource unit allocation subfield corresponding to the MRU is the resource unit allocation subfield corresponding to the first 80 MHz subblock or the resource unit allocation subfield corresponding to the third 80 MHz subblock, a location of the 160 MHz subblock to which the MRU belongs in the 240 MHz bandwidth, to obtain a frequency location of the MRU in the 240 MHz bandwidth based on the frequency locations of the 484-tone RU and the 996-tone RU that form the MRU in the 160 MHz subblock to which the MRU belongs.

In this way, when determining the frequency locations of the 996-tone RU and the 484-tone RU that form the 484+996-tone RU or the 996+484-tone RU in the 240 MHz bandwidth, the STA skips the resource unit allocation subfield corresponding to the second 80 MHz subblock. The STA can accurately determine, based on the resource unit allocation subfield corresponding to the first 80 MHz subblock and/or the resource unit allocation subfield corresponding to the third 80 MHz subblock, which 484-tone RU and which 996-tone RU form a 484+996-tone RU or a 996+484-tone RU in the 240 MHz bandwidth. The AP can allocate, to one or more stations, the 484+996-tone RU and/or the 996+484-tone RU including the 996-tone RU and 484-tone RU in the 240 MHz bandwidth.

It should be understood that when determining a frequency location of another RU different from the MRU in the 240 MHz bandwidth, the STA does not necessarily skip the resource unit allocation subfield of the second 80 MHz subblock. The STA may determine the frequency location of the another RU different from the MRU in the 240 MHz bandwidth based on the resource unit allocation subfield corresponding to the second 80 MHz subblock.

For a solution in which the STA determines the frequency locations of the 484-tone RU and the 996-tone RU that form the MRU in the 240 MHz bandwidth, the following several possible embodiments are listed in this application. It should be understood that the solution in which the STA determines the frequency locations of the 484-tone RU and the 996-tone RU that form the MRU in the 240 MHz bandwidth is not limited to the following several embodiments.

In some embodiments, the 240 MHz bandwidth includes two MRUs, each MRU includes a 484-tone RU and a 996-tone RU, a 996-tone RU corresponding to the first 80 MHz subblock and one 484-tone RU in the second 80 MHz subblock are combined into an MRU, and a 996-tone RU corresponding to the third 80 MHz subblock and the other 484-tone RU in the second 80 MHz subblock are combined into an MRU.

When determining, based on the resource unit allocation subfield, the 484-tone RU and the 996-tone RU that form each MRU in the 240 MHz bandwidth, the STA skips the resource unit allocation subfield corresponding to the second 80 MHz subblock, and determines, based on the resource unit allocation subfields corresponding to the first 80 MHz subblock and the second 80 MHz subblock, the 484-tone RU and the 996-tone RU that form each MRU.

Specifically, the two MRUs include a low-frequency MRU and a high-frequency MRU. An MRU indicated by the resource unit allocation subfield corresponding to the first 80 MHz subblock is the low-frequency MRU, and an MRU indicated by the resource unit allocation subfield corresponding to the second 80 MHz subblock is the high-frequency MRU.

The STA may determine, based on the resource unit allocation subfield corresponding to the first 80 MHz subblock, frequency locations of the 484-tone RU and the 996-tone RU that form the low-frequency MRU in the 160 MHz subblock to which the low-frequency MRU belongs, and determine that the 160 MHz subblock to which the low-frequency MRU belongs is the lowest 160 MHz frequency in the 240 MHz bandwidth. In this way, the STA can determine, based on the resource unit allocation subfield corresponding to the first 80 MHz subblock, the frequency locations of the 484-tone RU and the 996-tone RU that form the low-frequency MRU in the lowest 160 MHz frequency in the 240 MHz bandwidth, and therefore can determine the frequency locations of the 484-tone RU and the 996-tone RU that form the low-frequency MRU in the 240 MHz bandwidth.

The STA may determine, based on the resource unit allocation subfield corresponding to the third 80 MHz subblock, frequency locations of the 484-tone RU and the 996-tone RU that form the high-frequency MRU in the 160 MHz subblock to which the high-frequency MRU belongs, and determine that the 160 MHz subblock to which the high-frequency MRU belongs is the highest 160 MHz frequency in the 240 MHz bandwidth. In this way, the STA can determine, based on the resource unit allocation subfield corresponding to the third 80 MHz subblock, the frequency locations of the 484-tone RU and the 996-tone RU that form the high-frequency MRU in the highest 160 MHz frequency in the 240 MHz bandwidth, and therefore can determine the frequency locations of the 484-tone RU and the 996-tone RU that form the high-frequency MRU in the 240 MHz bandwidth.

It can be seen that, in the technical solution of this embodiment, when the 240 MHz bandwidth includes two MRUs, and each MRU includes a 484-tone RU and a 996-tone RU, the STA can accurately determine, based on the resource unit allocation subfield corresponding to the first 80 MHz subblock and the resource unit allocation subfield corresponding to the third 80 MHz subblock, the frequency locations of the 484-tone RU and the 996-tone RU that form each MRU in the 240 MHz bandwidth.

Figure 8C:
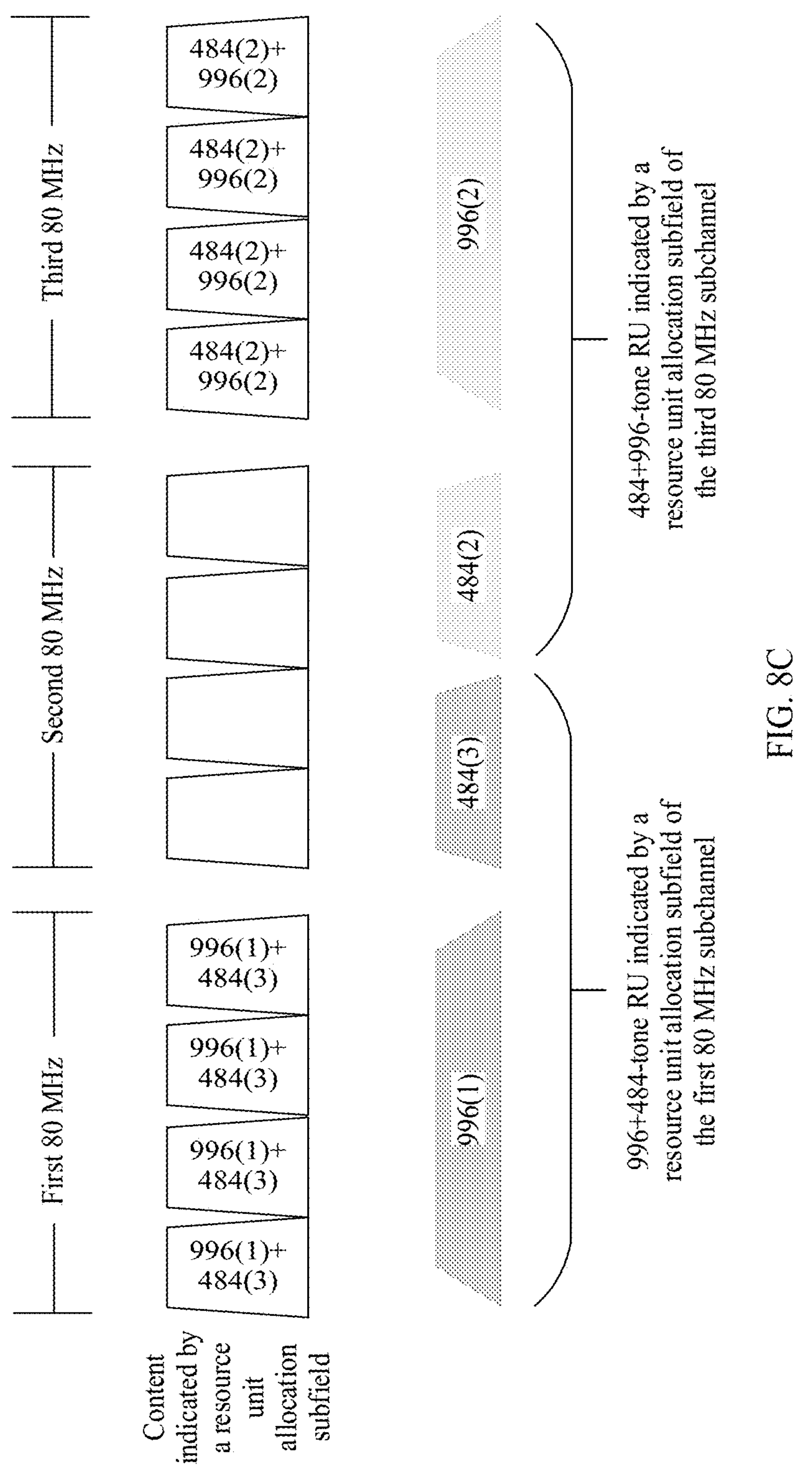
FIG. 8C is another schematic scenario diagram of MRU combination cases included in 240 MHz.

For example, FIG. 8C is a schematic scenario diagram of MRU combination cases included in 240 MHz. In four resource unit allocation subfields corresponding to the first 80 MHz subblock, a resource unit allocation subfield corresponding to an MRU indicates that an RU number of a 484-tone RU forming the MRU in a 160 MHz subblock to which the MRU belongs is 3, and indicates that an RU number of a 996-tone RU forming the MRU in the 160 MHz subblock to which the MRU belongs is 1. In resource unit allocation subfields corresponding to the third 80 MHz subblock, a resource unit allocation subfield corresponding to an MRU indicates that an RU number of a 484-tone RU forming the MRU in a 160 MHz subblock to which the MRU belongs is 2, and indicates that an RU number of a 996-tone RU forming the MRU in the 160 MHz subblock to which the MRU belongs is 2.

The MRU indicated by the resource unit allocation subfield corresponding to the first 80 MHz subblock is a low-frequency MRU, and the 160 MHz subblock to which the MRU belongs is the lowest 160 MHz frequency in the 240 MHz bandwidth. The MRU indicated by the resource unit allocation subfield corresponding to the third 80 MHz subblock is a high-frequency MRU, and the 160 MHz subblock to which the MRU belongs is the highest 160 MHz frequency in the 240 MHz bandwidth.

In this way, the STA can determine, based on the resource unit allocation subfield corresponding to the MRU in the resource unit allocation subfields corresponding to the first 80 MHz subblock, that the 996-tone RU forming the MRU is the first 996-tone RU in the lowest 160 MHz frequency in the 240 MHz bandwidth and that the 484-tone RU forming the MRU is the third 484-tone RU in the lowest 160 MHz frequency in the 240 MHz bandwidth, to determine locations of the 484-tone RU and the 996-tone RU forming the MRU in the 240 MHz bandwidth. The STA can determine, based on the resource unit allocation subfield corresponding to the MRU in the resource unit allocation subfield corresponding to the third 80 MHz subblock, that the 996-tone RU forming the MRU is the second 996-tone RU in the highest 160 MHz frequency in the 240 MHz bandwidth and that the 484-tone RU forming the MRU is the second 484-tone RU in the highest 160 MHz frequency in the 240 MHz bandwidth, to determine locations of the 484-tone RU and the 996-tone RU forming the MRU in the 240 MHz bandwidth.

In some other embodiments, the 240 MHz bandwidth includes an MRU including a 484-tone RU and a 996-tone RU, the STA can also identify, based on the resource unit allocation subfield corresponding to the first 80 MHz subblock or the resource unit allocation subfield corresponding to the third 80 MHz subblock, a location of a 160 MHz subblock to which the MRU belongs in the 160 MHz subblock, and determine, based on the resource unit allocation subfield corresponding to the MRU, that the 484-tone RU and the 996-tone RU forming the MRU in the 160 MHz subblock to which the MRU belongs, to determine locations of the 484-tone RU and the 996-tone RU that form the MRU in the 240 MHz bandwidth.

For specific implementation logic of determining, by the STA based on the resource unit allocation subfield corresponding to the first 80 MHz subblock or the resource unit allocation subfield corresponding to the third 80 MHz subblock, the locations of the 484-tone RU and the 996-tone RU that form the MRU in the 240 MHz bandwidth, refer to the foregoing solution in which the STA determines the 484-tone RU and the 996-tone RU that form any one of the MRUs in the embodiment in which the 240 MHz bandwidth includes two MRUs and each MRU includes a 484-tone RU and a 996-tone RU. Details are not described herein again.

Optionally, in the first indication solution of indicating a frequency location of a single RU in an MRU provided in embodiments of this application, in the signal field of the PPDU, a resource unit allocation subfield indicating a 484+242-tone RU or a 242+484-tone RU may indicate RU numbers of a 484-tone RU and a 242-tone RU that form the 484+242-tone RU or the 242+484-tone RU in an 80 MHz subblock to which the 484+242-tone RU belongs. In the signal field of the PPDU, a resource unit allocation subfield indicating a 2*996+484-tone RU or a 484+2*996-tone RU may indicate RU numbers of a 2*996-tone RU and a 484-tone RU that form the 2*996+484-tone RU or the 484+2*996-tone RU in the 240 MHz bandwidth in which the 484+242-tone RU is located.

It should be understood that, in this embodiment of this application, when determining a number of user fields corresponding to the MRU including the 484-tone RU and the 996-tone RU, the STA may or may not use the resource unit allocation subfield corresponding to the MRU in the one or more resource unit allocation subfields corresponding to the second 80 MHz subblock as a basis for determining the number of user fields corresponding to the MRU. In other words, the resource unit allocation subfield corresponding to the MRU in the resource unit allocation subfields corresponding to the second 80 MHz subblock may or may not be for determining the number of user fields corresponding to the MRU. When the resource unit allocation subfield corresponding to the MRU in the resource unit allocation subfields corresponding to the second 80 MHz subblock is for determining the number of user fields corresponding to the MRU, the indicated number of user fields corresponding to the MRU may be 0. Alternatively, the number of user fields may not be indicated.

The following describes, with reference to specific examples, solutions in which the STA determines the 996-tone RU and the 484-tone RU that form the MRU and determines the number of user fields corresponding to the MRU.

Specifically, the resource unit allocation subfield may be indicated by an index in Table 10. The resource unit allocation subfield indicating the MRU indicates a specific MRU to which a 242-tone RU corresponding to the resource unit allocation subfield belongs, indicates RU numbers of RUs corresponding to the MRU in a segment of consecutive frequencies domain, and indicates the number of user fields contributed to the user specific field in the same EHT-SIG content channel as the resource unit allocation subfield. For an RU numbering rule, refer to related descriptions corresponding to FIG. 8A.

TABLE 10

| Resource unit allocation subfield | Indicated content | Entry quantity |
|---|---|---|
| Index 1 | 242(1) + 484(2) in 80 MHz contributes zero user fields to a user specific field in a same EHT-SIG content channel as this resource unit allocation subfield | 1 |
| Indices 2 to 9 | 242(1) + 484(2) in 80 MHz contributes one to eight user fields to a user specific field in a same EHT-SIG channel as this resource unit allocation subfield | 8 |
| Index 10 | 242(2) + 484(2) in 80 MHz contributes zero user fields to a user specific field in a same EHT-SIG content channel as this resource unit allocation subfield | 1 |
| Indices 11 to 18 | 242(2) + 484(2) in 80 MHz contributes one to eight user fields to a user specific field in a same EHT-SIG channel as this resource unit allocation subfield | 8 |
| Index 19 | 484(1) + 242(4) in 80 MHz contributes zero user fields to a user specific field in a same EHT-SIG content channel as this resource unit allocation subfield | 1 |
| Indices 20 to 27 | 484(1) + 242(4) in 80 MHz contributes one to eight user fields to a user specific field in a same EHT-SIG channel as this resource unit allocation subfield | 8 |
| Index 28 | 484(1) + 242(3) in 80 MHz contributes zero user fields to a user specific field in a same EHT-SIG content channel as this resource unit allocation subfield | 1 |
| Indices 29 to 36 | 484(1) + 242(3) in 80 MHz contributes one to eight user fields to a user specific field in a same EHT-SIG channel as this resource unit allocation subfield | 8 |
| Index 37 | 484(1) + 996(2) in 160 MHz contributes zero user fields to a user specific field in a same EHT-SIG content channel as this resource unit allocation subfield | 1 |
| Indices 38 to 45 | 484(1) + 996(2) in 160 MHz contributes one to eight user fields to a user specific field in a same EHT-SIG channel as this resource unit allocation subfield | 8 |

TABLE 10-continued

| Resource unit allocation subfield | Indicated content | Entry quantity |
|---|---|---|
| Index 46 | 484(2) + 996(2) in 160 MHz contributes zero user fields to a user specific field in a same EHT-SIG content channel as this resource unit allocation subfield | 1 |
| Indices 47 to 54 | 484(2) + 996(2) in 160 MHz contributes one to eight user fields to a user specific field in a same EHT-SIG channel as this resource unit allocation subfield | 8 |
| Index 55 | 996(1) + 484(4) in 160 MHz contributes zero user fields to a user specific field in a same EHT-SIG content channel as this resource unit allocation subfield | 1 |
| Indices 56 to 63 | 996(1) + 484(4) in 160 MHz contributes one to eight user fields to a user specific field in a same EHT-SIG channel as this resource unit allocation subfield | 8 |
| Index 64 | 996(1) + 484(3) in 160 MHz contributes zero user fields to a user specific field in a same EHT-SIG content channel as this resource unit allocation subfield | 1 |
| Index 65 to 72 | 996(1) + 484(3) in 160 MHz contributes one to eight user fields to a user specific field in a same EHT-SIG channel as this resource unit allocation subfield | 8 |

Any index in Table 10 indicates a type of MRU to which a 242-tone RU corresponding to a resource unit allocation subfield belongs, indicates RU numbers of RUs forming the MRU in a segment of consecutive frequencies to which the MRU belongs, and indicates a number of user fields contributed to a user specific field of a same EHT-SIG content channel as the resource unit allocation subfield. The number of user fields contributed to the user specific field in the same EHT-SIG content channel as the resource unit allocation subfield is a number of user fields corresponding to the resource unit allocation subfield in the EHT-SIG content channel in which the resource unit allocation subfield is located. A user field corresponding to the resource unit allocation subfield is a user field of a user to which a resource unit indicated by the resource unit allocation subfield is allocated.

Optionally, any index indicating that a number of user fields is 1 to 8 in Table 10 may include an RU allocation indicating part and a user field indicating part. The RU allocation indicating part indicates a type of MRU to which a 242-tone RU corresponding to a resource unit allocation subfield belongs, and indicates RU numbers of RUs forming the MRU in a segment of consecutive frequencies to which the MRU belongs. The user field indicating part indicates a number of user fields contributed to a user specific field of a same EHT-SIG content channel as the resource unit allocation subfield.

Specifically, a structure of any index indicating that the number of user fields is 1 to 8 in Table 10 may be $k_n k_{n-1} \ldots k_2 k_1 y_2 y_1 y_0$, where $k_n k_{n-1} \ldots k_2 k_1$ is the RU allocation indicating part, n is a number of bits of the RU allocation indicating part, $y_2 y_1 y_0$ is the user field indicating part, is 3 bits, and indicates the one to eight user fields separately.

For the number of user fields indicated by each index in Table 10, refer to an indicated content part corresponding to each index in Table 10. The following specifically explains meanings of MRU combination cases indicated by indices in Table 10.

Values in brackets in Table 10 may be understood as RU numbers corresponding to RUs indicated by values before the brackets.

The indices 1 to 9 in Table 10 indicate that the 242-tone RU corresponding to the resource unit allocation subfield belongs to the 242+484-tone RU, an RU number of the 242-tone RU forming the 242+484-tone RU in the 242+484-tone RU is 1, and an RU number of the 484-tone RU forming the 242+484-tone RU in the 242+484-tone RU is 2. The STA can determine, based on the indices 1 to 9 in Table 10, that the 242+484-tone RU is obtained by combining the first 242-tone RU in an 80 MHz subblock and the second 484-tone RU in the 80 MHz subblock.

The indices 10 to 18 in Table 10 indicate that the 242-tone RU corresponding to the resource unit allocation subfield belongs to the 242+484-tone RU, an RU number of the 242-tone RU forming the 242+484-tone RU in the 242+484-tone RU is 2, and an RU number of the 484-tone RU forming the 242+484-tone RU in the 242+484-tone RU is 2. The STA can determine, based on the indices 10 to 18 in Table 10, that the 242+484-tone RU is obtained by combining the second 242-tone RU in an 80 MHz subblock to which the 242+484-tone RU belongs and the second 484-tone RU in the 80 MHz subblock.

The indices 19 to 27 in Table 10 indicate that the 242-tone RU corresponding to the resource unit allocation subfield belongs to the 484+242-tone RU, an RU number of the 484-tone RU forming the 484+242-tone RU in the 484+242-tone RU is 1, and an RU number of the 242-tone RU forming the 484+242-tone RU in the 484+242-tone RU is 4. The STA can determine, based on the indices 19 to 27 in Table 10, that the 484+242-tone RU is obtained by combining the first 484-tone RU in an 80 MHz subblock to which the 484+242-tone RU belongs and the fourth 242-tone RU in the 80 MHz subblock.

The indices 28 to 36 in Table 10 indicate that the 242-tone RU corresponding to the resource unit allocation subfield belongs to the 484+242-tone RU, an RU number of the 484-tone RU forming the 484+242-tone RU in the 484+242-tone RU is 1, and an RU number of the 242-tone RU forming the 484+242-tone RU in the 484+242-tone RU is 3. The STA can determine, based on the indices 28 to 36 in Table 10, that the 484+242-tone RU is obtained by combining the first 484-tone RU in an 80 MHz subblock to which the 484+242-tone RU belongs and the third 242-tone RU in the 80 MHz subblock.

The indices 37 to 45 in Table 10 indicate that the 242-tone RU corresponding to the resource unit allocation subfield belongs to the 484+996-tone RU, an RU number of the 484-tone RU forming the 484+996-tone RU in the 484+996-tone RU is 1, and an RU number of the 996-tone RU forming the 484+996-tone RU in the 484+996-tone RU is 2. The STA can determine, based on the indices 37 to 45 in Table 10, that the 484+996-tone RU is obtained by combining the first 484-tone RU in a 160 MHz subblock to which the 484+996-tone RU belongs and the second 996-tone RU in the 160 MHz subblock.

The indices 46 to 54 in Table 10 indicate that the 242-tone RU corresponding to the resource unit allocation subfield belongs to the 484+996-tone RU, an RU number of the 484-tone RU forming the 484+996-tone RU in the 484+996-tone RU is 2, and an RU number of the 996-tone RU forming the 484+996-tone RU in the 484+996-tone RU is 2. The STA can determine, based on the indices 46 to 54 in Table 10, that the 484+996-tone RU is obtained by combining the second 484-tone RU in a 160 MHz subblock to which the 484+996-tone RU belongs and the second 996-tone RU in the 160 MHz subblock.

The indices 55 to 63 in Table 10 indicate that the 242-tone RU corresponding to the resource unit allocation subfield belongs to the 996+484-tone RU, an RU number of the 996-tone RU forming the 996+484-tone RU in the 996+484-tone RU is 1, and an RU number of the 484-tone RU forming the 996+484-tone RU in the 996+484-tone RU is 4. The STA can determine, based on the indices 55 to 63 in Table 10, that the 996+484-tone RU is obtained by combining the first 996-tone RU in a 160 MHz subblock to which the 996+484-tone RU belongs and the fourth 484-tone RU in the 160 MHz subblock.

The indices 64 to 72 in Table 10 indicate that the 242-tone RU corresponding to the resource unit allocation subfield belongs to the 996+484-tone RU, an RU number of the 996-tone RU forming the 996+484-tone RU in the 996+484-tone RU is 1, and an RU number of the 484-tone RU forming the 996+484-tone RU in the 996+484-tone RU is 3. The STA can determine, based on the indices 64 to 72 in Table 10, that the 996+484-tone RU is obtained by combining the first 996-tone RU in a 160 MHz subblock to which the 996+484-tone RU belongs and the third 484-tone RU in the 160 MHz subblock.

It can be learned that when the resource unit allocation subfield indicating the 484+242-tone RU or the 242+484-tone RU is indicated by the index in Table 10, RU identifiers of the 484-tone RU and the 242-tone RU that form the 484+242-tone RU or the 242+484-tone RU in the 80 MHz subblock to which the 484+242-tone RU or the 242+484-tone RU belongs can be accurately indicated, so that absolute locations of the 484-tone RU and the 242-tone RU that form the 484+242-tone RU or the 242+484-tone RU in the 80 MHz subblock to which the 484+242-tone RU or the 242+484-tone RU belongs can be indicated. When the resource unit allocation subfield indicating the 996+484-tone RU or the 484+996-tone RU is indicated by the index in Table 10, RU identifiers of the 996-tone RU and the 484-tone RU forming the 996+484-tone RU or the 484+996-tone RU in the 160 MHz subblock to which the 996+484-tone RU or the 484+996-tone RU belongs can be accurately indicated, so that absolute locations of the 996-tone RU and the 484-tone RU forming the 996+484-tone RU or the 484+996-tone RU in the 160 MHz subblock to which the 996+484-tone RU or the 484+996-tone RU belongs can be indicated.

In some embodiments, the resource unit allocation subfield corresponding to the 240 MHz bandwidth in the signal field of the PPDU includes resource unit allocation subfields corresponding to the first 80 MHz subblock, the second 80 MHz subblock, and the third 80 MHz subblock in the 240 MHz bandwidth.

In such embodiments, the STA receiving the PPDU determines, based on the resource unit allocation subfield corresponding to the first 80 MHz subblock and/or the resource unit allocation subfield corresponding to the third 80 MHz subblock in the 240 MHz bandwidth, that the 240 MHz bandwidth includes an MRU formed by combining a 996-tone RU and a 484-tone RU, and frequency locations of the 996-tone RU and the 484-tone RU that form the MRU in the 240 MHz bandwidth.

There are at least the following two possible implementations in which the STA determines the number of user fields corresponding to the MRU:

In one possible implementation, the STA may determine, based on the resource unit allocation subfields of the first 80 MHz subblock, the second 80 MHz subblock, and the third 80 MHz subblock in the 240 MHz bandwidth, the number of user fields corresponding to the MRU. It may be understood that, in such an implementation, the resource unit allocation subfield corresponding to the second 80 MHz subblock corresponding to the 240 MHz bandwidth participates in indicating the number of user fields corresponding to the MRU.

Figure 9A:
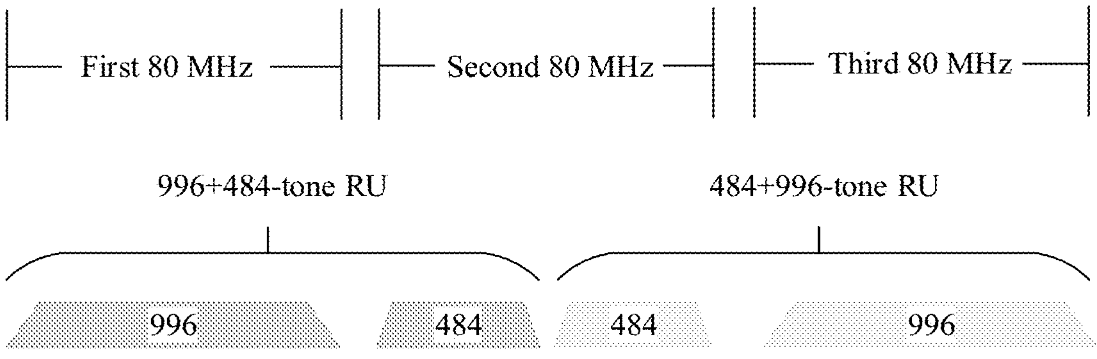
FIG. 9A is a schematic diagram of a resource unit allocation scenario.

For example, FIG. 9A is a schematic diagram of a resource unit allocation scenario. When the bandwidth for transmitting the PPDU is 240 MHz, in an increasing frequency order, a 996-tone RU corresponding to the first 80 MHz subblock in the 240 MHz bandwidth and a 484-tone RU corresponding to the first 40 MHz subblock of the second 80 MHz subblock form a 996+484-tone RU. The 996+484-tone RU is allocated to four users.

A 484-tone RU corresponding to the second 40 MHz subblock of the second 80 MHz subblock in the 240 MHz bandwidth and a 996-tone RU corresponding to the third 80 MHz subblock form another 996+484-tone RU. The 484+996 RU is allocated to three users.

The first 80 MHz subblock may be understood as the first to the fourth 20 MHz subblocks, the second 80 MHz subblock may be understood as the fifth to the eighth 20 MHz subblocks, and the third 80 MHz subblock may be understood as the ninth to the twelfth 20 MHz subblocks.

Figure 9B:
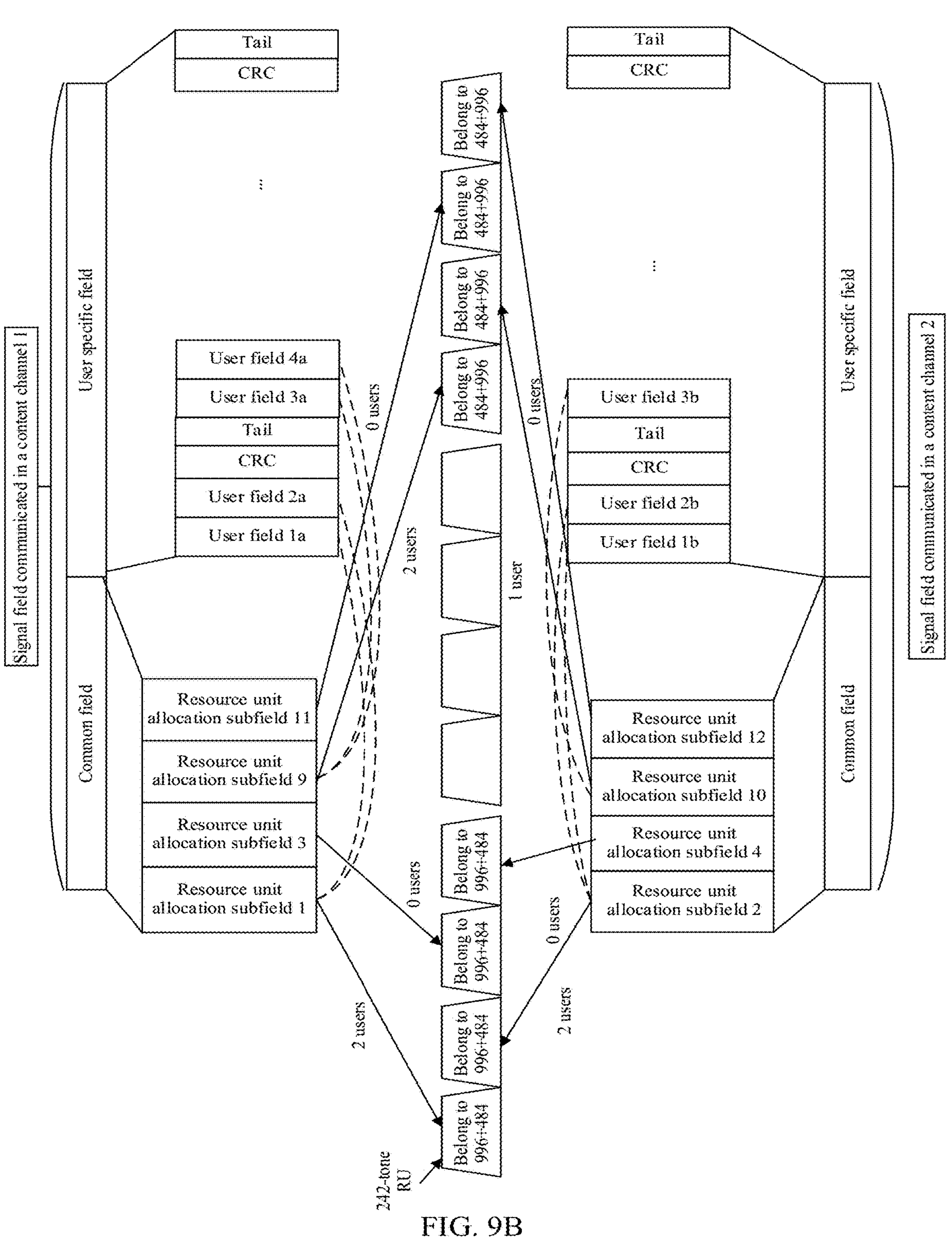
FIG. 9B is a schematic diagram of a structure of a signal field according to an embodiment of this application.

FIG. 9B is a schematic diagram of a structure of a signal field. The signal field indicates a schematic scenario diagram of a resource unit allocation status of a 240 MHz bandwidth. The signal field of the PPDU includes a resource unit allocation subfield 1 to a resource unit allocation subfield 6 corresponding to the first 80 MHz subblock in the 240 MHz bandwidth, and a resource unit allocation subfield 7 to a resource unit allocation subfield 12 corresponding to the third 80 MHz subblock in the 240 MHz bandwidth.

The PPDU is transmitted in two content channels. The two content channels may be a content channel 1 and a content channel 2. The resource unit allocation subfields 1, 3, 5, 7, 9, and 11 may be transmitted in the content channel 1, and the resource unit allocation subfields 2, 4, 6, 8, 10, and 12 may be transmitted in the content channel 2.

The resource unit allocation subfield 1 may be indicated by the index 66 in Table 10, to indicate that the first 242-tone RU in the 240 MHz bandwidth belongs to a 996+484-tone RU including a 996-tone RU and a 484-tone RU, the 996+484-tone RU is obtained by combining the first 996-tone RU in a 160 MHz subblock to which the 996+484-tone RU belongs and the third 484-tone RU in the 160 MHz subblock, and two user fields are contributed to a user specific field of a same EHT-SIG content channel (content channel 1) as the resource unit allocation subfield.

The resource unit allocation subfield 2 may be indicated by the index 66 in Table 10, to indicate that the second 242-tone RU in the 240 MHz bandwidth corresponds to a 996+484-tone RU, the 996+484-tone RU is obtained by combining the first 996-tone RU in a 160 MHz subblock to which the 996+484-tone RU belongs and the third 484-tone RU in the 160 MHz subblock, and two user fields are contributed to a user specific field of a same EHT-SIG content channel (content channel 2) as the resource unit allocation subfield.

The resource unit allocation subfields 3 to 6 may be indicated by the index 64 in Table 10, to indicate that the corresponding 242-tone RU belongs to a 996+484-tone RU, the 996+484-tone RU is obtained by combining the first 996-tone RU in a 160 MHz subblock to which the 996+484-tone RU belongs and the third 484-tone RU in the 160 MHz subblock, and zero user fields are contributed to a user specific field of a same EHT-SIG content channel as the resource unit allocation subfield.

The resource unit allocation subfield 7 may be indicated by the index 48 in Table 10, to indicate that the third 242-tone RU of the second 80 MHz subblock in the 240 MHz bandwidth belongs to a 996+484-tone RU, the 484+996-tone RU includes the second 484-tone RU and the second 996-tone RU in a 160 MHz subblock to which the 484+996-tone RU belongs, and two user fields are contributed to a user specific field of a same EHT-SIG content channel (content channel 1) as the resource unit allocation subfield.

The resource unit allocation subfield 8 may be indicated by the index 47 in Table 10, to indicate that the fourth 242-tone RU of the second 80 MHz subblock in the 240 MHz bandwidth belongs to a 996+484-tone RU, the 484+996-tone RU includes the second 484-tone RU and the second 996-tone RU in a 160 MHz subblock to which the 484+996-tone RU belongs, and one user field is contributed to a user specific field of a same EHT-SIG signal content channel (content channel 2) as the resource unit allocation subfield.

The resource unit allocation subfields 9 to 12 may be indicated by the index 46 in Table 10, to indicate that the four 242-tone RUs of the third 80 MHz subblock in the 240 MHz bandwidth belong to a 996+484-tone RU, the 484+996-tone RU includes the second 484-tone RU and the second 996-tone RU in a 160 MHz subblock to which the 484+996-tone RU belongs, and zero user fields are contributed to a user specific field of a same EHT-SIG signal content channel as the resource unit allocation subfields.

In FIG. 9B, arrows indicated by the resource unit allocation subfield 5 and the resource unit allocation subfield 6 are dashed arrows, indicating that the resource unit allocation subfield 5 and the resource unit allocation subfield 6 cannot accurately indicate that the fifth 242-tone RU and the sixth 242-tone RU that are in the 240 MHz bandwidth and that correspond to the resource unit allocation subfield 5 and the resource unit allocation subfield 6 belong to a same MRU as the four 242-tone RUs of the first 80 MHz subblock on the left side in the 240 MHz bandwidth, but still belong to a same MRU as the four 242-tone RUs of the third 80 MHz subblock on the right side in the 240 MHz bandwidth. Arrows indicated by the resource unit allocation subfield 7 and the resource unit allocation subfield 8 are dashed arrows, indicating that the resource unit allocation subfield 7 and the resource unit allocation subfield 8 cannot accurately indicate that the seventh 242-tone RU and the eighth 242-tone RU that correspond to the resource unit allocation subfield 7 and the resource unit allocation subfield 8 belong to a same MRU as the four 242-tone RUs of the first 80 MHz subblock on the left side in the 240 MHz bandwidth, but still belong to a same MRU as the four 242-tone RUs of the third 80 MHz subblock on the right side in the 240 MHz bandwidth.

Specifically, the STA determines, based on the resource unit allocation subfields 1 to 4 corresponding to the first 80 MHz subblock in the 240 MHz bandwidth, that four 242-tone RUs of the first 80 MHz subblock in the 240 MHz bandwidth belong to a 996+484-tone RU, and the 996+484-tone RU includes the first 996-tone RU and the third 484-tone RU in a 160 MHz subblock to which the 996+484-tone RU belongs. The 160 MHz subblock to which the 996+484-tone RU belongs is the lowest 160 MHz frequency in the 240 MHz bandwidth. In this case, the STA may determine that the 996+484-tone RU includes the 996-tone RU corresponding to the first 80 MHz subblock in the 240 MHz bandwidth and the 484-tone RU corresponding to the lowest 40 MHz frequency of the second 80 MHz subblock.

The STA determines, based on a sum of the numbers of user fields indicated by the resource unit allocation subfields 1 to 6, that a number of user fields corresponding to the 996+484-tone RU is 4.

The STA further determines, based on the resource unit allocation subfields 9 to 12 corresponding to the third 80 MHz subblock in the 240 MHz bandwidth, that four 242-tone RUs of the third 80 MHz subblock in the 240 MHz bandwidth belong to a 484+996-tone RU, and the 484+996-tone RU includes the second 484-tone RU and the second 996-tone RU in the 160 MHz subblock to which the 484+996-tone RU belongs. The 160 MHz subblock to which the 484+996-tone RU belongs is the high-frequency 160 MHz subblock in the 240 MHz bandwidth. In this case, the STA may determine that the 484+996-tone RU includes a 484-tone RU corresponding to the highest 40 MHz frequency of the second 80 MHz subblock in the 240 MHz bandwidth and a 996-tone RU corresponding to the third 80 MHz subblock.

The STA determines, based on a sum of the numbers of user fields indicated by the resource unit allocation subfields 7 to 12, that a number of user fields corresponding to the 484+996-tone RU is 3.

In another possible implementation, the STA may determine, based on resource unit allocation subfields corresponding to the first 80 MHz subblock and the third 80 MHz subblock in the 240 MHz bandwidth, the number of user fields corresponding to the MRU formed by combining the 996-tone RU and the 484-tone RU. It may be understood that, in such an implementation, the resource unit allocation subfield corresponding to the second 80 MHz subblock corresponding to the 240 MHz bandwidth participates in indicating the number of user fields.

Figure 9C:
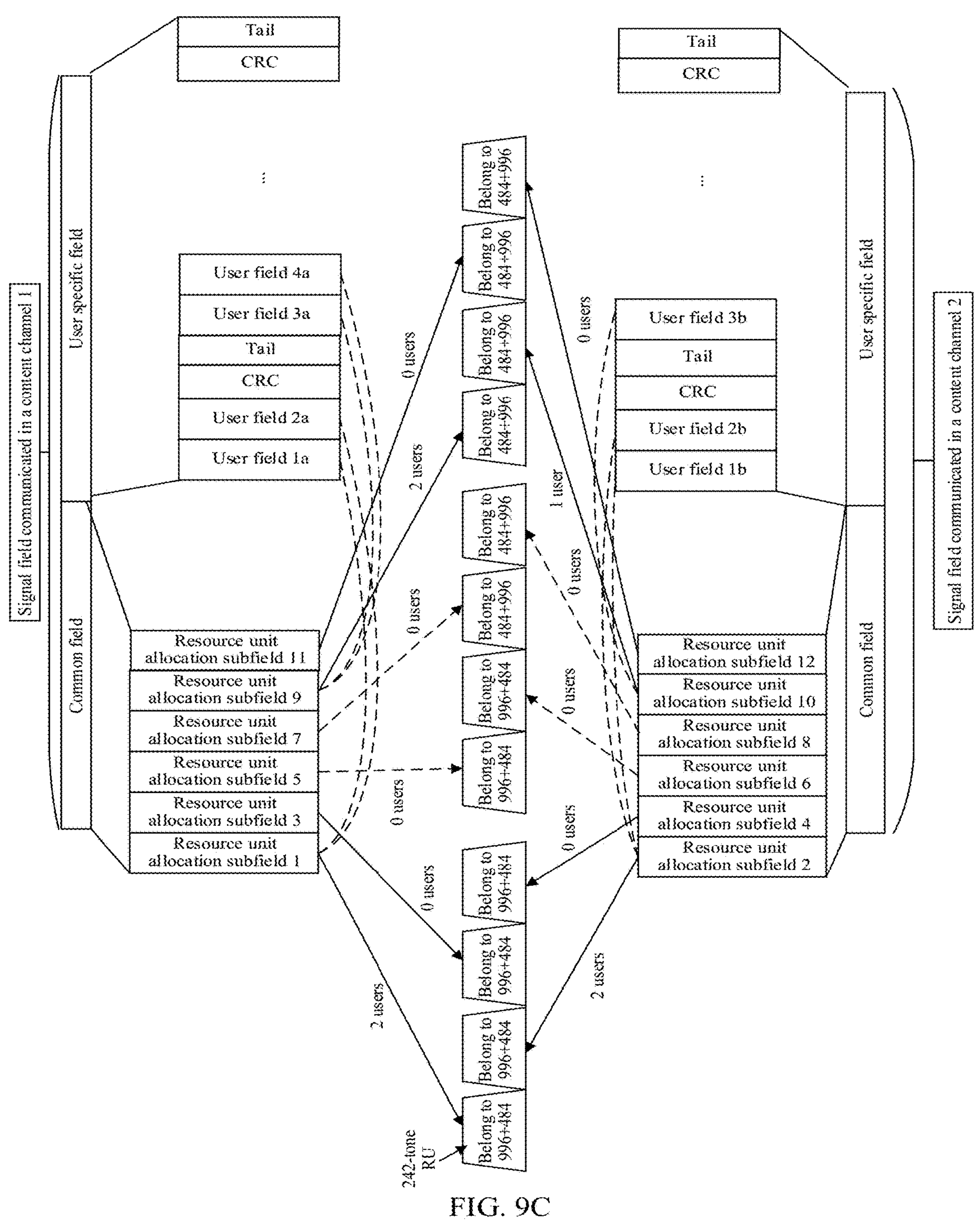
FIG. 9C is a schematic diagram of a structure of another signal field according to an embodiment of this application.

For example, FIG. 9C is a schematic diagram of a structure of a signal field. Based on an example of resource unit allocation in FIG. 9A, the signal field of the PPDU includes a resource unit allocation subfield 1 to a resource unit allocation subfield 4 that correspond to the four 242-tone RUs of the first 80 MHz subblock in the 240 MHz bandwidth, a resource unit allocation subfield 5 to a resource unit allocation subfield 8 that correspond to the four 242-tone RUs of the second 80 MHz subblock in the 240 MHz bandwidth, and a resource unit allocation subfield 9 to a resource unit allocation subfield 12 that correspond to the four 242-tone RUs of the third 80 MHz subblock in the 240 MHz bandwidth.

The PPDU is transmitted in two content channels. The two content channels may be a content channel 1 and a content channel 2. The resource unit allocation subfields 1, 3, 5, 7, 9, and 11 may be transmitted in the content channel 1, and the resource unit allocation subfields 2, 4, 6, 8, 10, and 12 may be transmitted in the content channel 2.

For manners of indicating the resource unit allocation subfields 1 to 6 and manners of indicating the resource unit allocation subfields 9 to 12, refer to the manners of indicating the resource unit allocation subfields 1 to 6 and the manners of indicating the resource unit allocation subfields 9 to 12 in the examples corresponding to FIG. 9B.

The resource unit allocation subfields 7 and 8 may be indicated by the index 46 in Table 10, to indicate that the seventh 242-tone RU and the eighth 242-tone RU in the 240 MHz bandwidth belong to a 484+996-tone RU, the 484+996-tone RU includes the second 484-tone RU and the second 996-tone RU in a 160 MHz subblock to which the 484+996-tone RU belongs, and zero user fields are contributed to a user specific field of a same EHT-SIG signal content channel as the resource unit allocation subfields.

Arrows indicated by the resource unit allocation subfield 5 to 8 are dashed arrows. For meanings of the dashed arrows, refer to the foregoing related descriptions of FIG. 9B. Details are not described herein again.

In this way, when determining the 996-tone RU and the 484-tone RU that form the MRU, the STA skips the resource unit allocation subfields 5 to 8 corresponding to the second 80 MHz subblock in the 240 MHz bandwidth, and determines, based on resource unit allocation subfields (the resource unit allocation subfields 1 to 4 and 9 to 12) corresponding to the first 80 MHz subblock and the third 80 MHz subblock in the 240 MHz bandwidth, the frequency locations of the 996-tone RU and the 484-tone RU that form the MRU in the 240 MHz bandwidth and the number of user fields corresponding to each MRU.

Specifically, the STA determines, based on the resource unit allocation subfields 1 to 4 corresponding to the first 80 MHz subblock in the 240 MHz bandwidth, that four 242-tone RUs of the first 80 MHz subblock in the 240 MHz bandwidth belong to a 996+484-tone RU, the 996+484-tone RU includes a 996-tone RU corresponding to the first 80 MHz subblock in the 240 MHz bandwidth and a 484-tone RU corresponding to the lowest 40 MHz frequency of the second 80 MHz subblock, and a number of user fields corresponding to the 996+484-tone RU is 4.

The STA further determines, based on the resource unit allocation subfields 9 to 12 corresponding to the third 80 MHz subblock in the 240 MHz bandwidth, that four 242-tone RUs of the third 80 MHz subblock in the 240 MHz bandwidth belong to the 484+996-tone RU, the 484+996-tone RU includes a 484-tone RU corresponding to the highest 40 MHz frequency of the second 80 MHz subblock in the 240 MHz bandwidth and a 996-tone RU corresponding to the third 80 MHz subblock, and a number of user fields corresponding to the 484+996-tone RU is 3.

For a manner in which the STA determines the 996-tone RU and the 484-tone RU that form the 996+484-tone RU and a manner in which the STA determines the 996-tone RU and the 484-tone RU that form the 484+996-tone RU, refer to related descriptions in the foregoing example of FIG. 9B. Details are not described herein again.

In some possible embodiments, a resource unit allocation subfield corresponding to the 240 MHz bandwidth in the signal field of the PPDU includes the resource unit allocation subfields corresponding to the first 80 MHz subblock and the third 80 MHz subblock in the 240 MHz bandwidth, and does not include the resource unit allocation subfields corresponding to the second 80 MHz subblock in the 240 MHz bandwidth.

In such an embodiment, the STA that receives the PPDU determines, based on the resource unit allocation subfields of the first 80 MHz subblock and the third 80 MHz subblock in the 240 MHz bandwidth, that the 240 MHz bandwidth includes two MRUs, the frequency locations of the 996-tone RU and the 484-tone RU that form each MRU in the 240 MHz bandwidth, and the number of user fields corresponding to each MRU.

For example, FIG. 9A is a schematic diagram of a resource unit allocation scenario. When the bandwidth for transmitting the PPDU is 240 MHz, in an increasing frequency order, the first to the sixth 242-tone RUs belong to one 996+484-tone RU, the 996+484-tone RU is allocated to four users. The seventh to the twelfth 20 MHz subblocks corresponds to one 484+996-tone RU, and the 484+996 RU is allocated to three users. The first to the fourth 20 MHz subblocks may be understood as the first 80 MHz subblock, the fifth to the eighth 20 MHz subblocks may be understood as the second 80 MHz subblock, and the ninth to the twelfth 20 MHz subblocks may be understood as the third 80 MHz subblock.

Figure 9D:
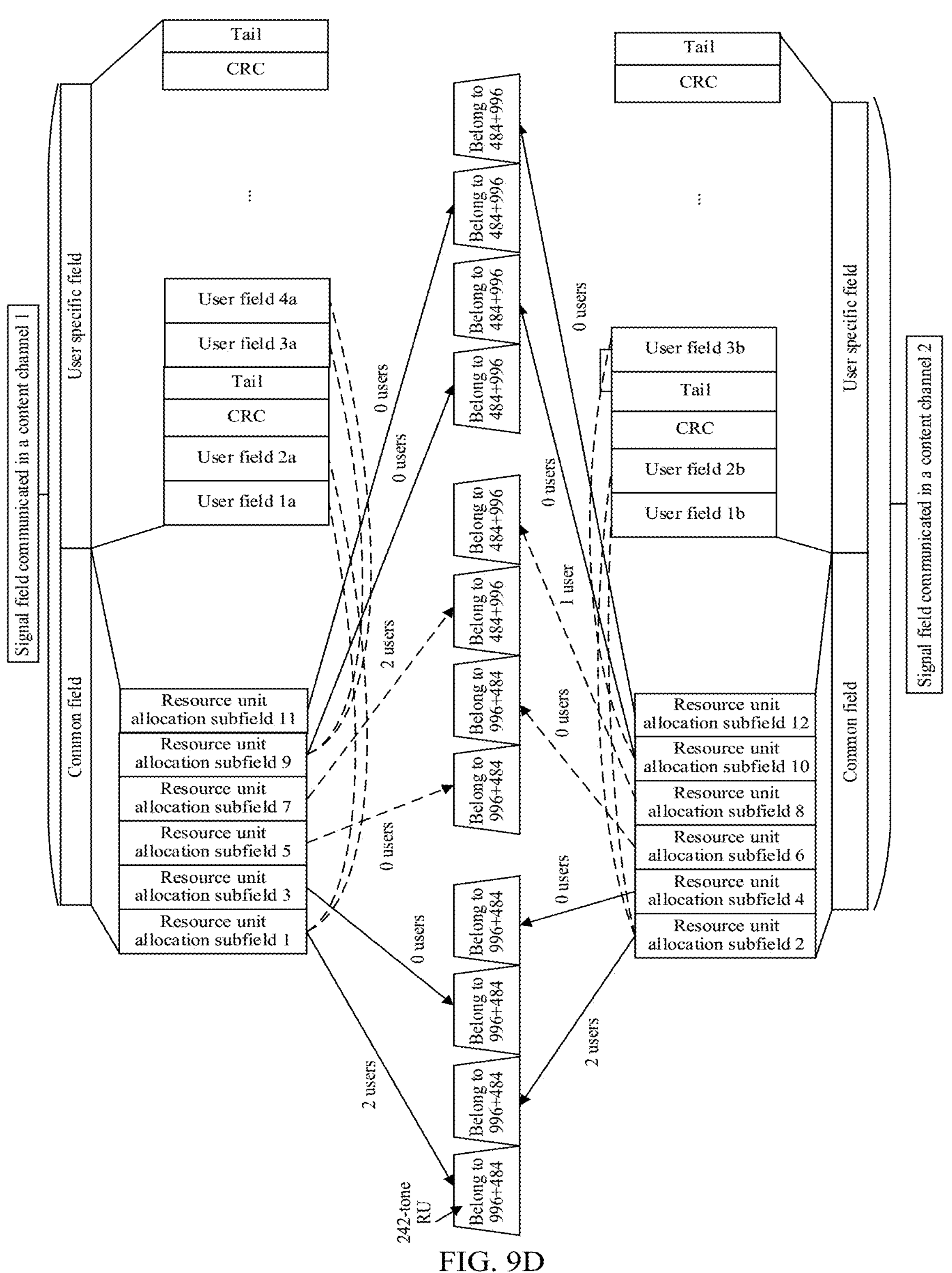
FIG. 9D is a schematic diagram of a structure of still another signal field according to an embodiment of this application.

FIG. 9D is a schematic diagram of a structure of the signal field. The signal field of the PPDU includes a resource unit allocation subfield 1 to a resource unit allocation subfield 4 corresponding to the first 80 MHz subblock in the 240 MHz bandwidth, and a resource unit allocation subfield 9 to a resource unit allocation subfield 12 corresponding to the third 80 MHz subblock in the 240 MHz bandwidth.

The PPDU is transmitted in two content channels. The two content channels may be a content channel 1 and a content channel 2. The resource unit allocation subfields 1, 3, 9, and 11 may be transmitted in the content channel 1, and the resource unit allocation subfields 2, 4, 10, and 12 may be transmitted in the content channel 2.

The resource unit allocation subfields 1 to 4 and the resource unit allocation subfields 9 to 12 may be indicated by the indices 46 to 54 in Table 10. For specific solutions of indicating the resource unit allocation subfields 1 to 4 and the resource unit allocation subfields 9 to 12, refer to related descriptions in the example corresponding to FIG. 9C. Details are not described herein again.

In this way, the STA may determine, based on any one of the resource unit allocation subfield 1 to the resource unit allocation subfield 4, that a 996-tone RU corresponding to the first 80 MHz subblock of the lowest 160 MHz frequency in the 240 MHz bandwidth belongs to one 996+484-tone RU, and the first 996-tone RU and the third 484-tone RU of the lowest 160 MHz frequency in the 240 MHz bandwidth form the 996+484-tone RU. The STA may further determine, based on a sum of a number of user fields indicated by the source unit allocation subfield 1 and a number of user fields indicated by the resource unit allocation subfield 3, that a number of user fields that are transmitted in the content channel 1 and that correspond to the 996+484-tone RU is 2. The STA may further determine, based on a sum of a number of user fields indicated by the source unit allocation subfield 2 and a number of user fields indicated by the resource unit allocation subfield 4, that a number of user fields that are transmitted in the content channel 2 and that correspond to the 996+484-tone RU is 2. That is, a number of user fields corresponding to the 996+484-tone RU is 4.

Similarly, the STA may determine, based on the resource unit allocation subfield 9 to the resource unit allocation subfield 12, that a 996-tone RU corresponding to the third 80 MHz subblock in the 240 MHz bandwidth belongs to one 484+996-tone RU, and the 484+996-tone RU is formed by combining the second 484-tone RU of the lowest 160 MHz frequency in the 240 MHz bandwidth and the second 996-tone RU of the lowest 160 MHz frequency in the 240 MHz bandwidth. The STA may further determine, based on the resource unit allocation subfield 9 to the resource unit allocation subfield 12, that a number of user fields corresponding to the 484+996-tone RU is 3.

Optionally, the signal field may include a resource unit allocation subfield indication field, indicating that the signal field does not include a resource unit allocation subfield corresponding to the second 80 MHz subblock in the 240 MHz bandwidth.

Before performing step 804, the station first determines, based on the resource unit allocation subfield indication field, that the signal field does not include the resource unit allocation subfield corresponding to the second 80 MHz subblock in the 240 MHz bandwidth.

In this way, the STA can determine, based on the resource unit allocation subfield indication field, that the resource unit allocation subfield corresponding to the 240 MHz bandwidth includes a resource unit allocation subfield corresponding to the first 80 MHz subblock in the 240 MHz bandwidth and a resource unit allocation subfield corresponding to the third 80 MHz subblock corresponding to the 240 MHz bandwidth, and a resource unit allocation subfield that does not correspond to the 240 MHz bandwidth includes a resource unit allocation subfield corresponding to the second 80 MHz subblock in the 240 MHz bandwidth. The STA determines, based on the resource unit allocation subfield corresponding to the first 80 MHz subblock in the 240 MHz bandwidth and/or the resource unit allocation subfield corresponding to the third 80 MHz subblock corresponding to the 240 MHz bandwidth, the frequency locations of the 996-tone RU and the 484-tone RU that form the MRU in the 240 MHz bandwidth, and determines the user field corresponding to the MRU.

In such a solution, step 803 may be omitted.

The resource unit allocation subfield indication field may be a bitmap. Each bit in the bitmap indicates whether each 242-tone-RU in the channel bandwidth for transmitting the PPDU corresponds to a resource unit allocation subfield in the common field. The bitmap indicates that the signal field does not include a resource unit allocation subfield corresponding to four 242-tone-RUs of the second 80 MHz subblock in the 240 MHz bandwidth.

For example, based on the example shown in FIG. 9A, the bitmap may be 12 bits. Each bit corresponds to one 242-tone-RU. Each bit indicates whether the signal field includes a resource unit allocation subfield corresponding to a 242-tone-RU corresponding to the bit. If "1" indicates that a frequency domain resource of one granularity corresponds to a resource unit allocation subfield, and "0" indicates that a frequency domain resource of one granularity corresponds no resource unit allocation subfield, the bitmap may be specifically 111100001111. Certainly, in another embodiment, alternatively, "0" may indicate that a frequency domain resource of one granularity corresponds to a resource unit allocation subfield, and "1" indicates that a frequency domain resource of one granularity corresponds no resource unit allocation subfield.

In a second indication solution of indicating a frequency location of a single RU in an MRU provided in this embodiment of this application, the 484-tone RU and the 996-tone RU in the 160 MHz subblock to which the 996+484-tone RU belongs are numbered by using the solution shown in FIG. 8A. In this solution, a resource unit allocation subfield of the second 80 MHz subblock in the 240 MHz bandwidth indicates RU numbers of the 484-tone RU and the 996-tone RU that form the 996+484-tone RU in the 160 MHz subblock, and indicate a frequency location of the 160 MHz subblock in the 240 MHz bandwidth, to indicate the frequency locations of the 484-tone RU and the 996-tone RU that form the 996+484-tone RU in the 240 MHz bandwidth.

Based on the foregoing second indication solution of indicating a frequency location of a single RU in an MRU, an embodiment of this application further provides another solution for determining, based on the signal field, frequency locations of the 484-tone RU and the 996-tone RU forming the MRU. In this solution, when consecutive 240 MHz in the bandwidth for transmitting the PPDU includes the MRU including the 484-tone RU and the 996-tone RU, the STA that receives the PPDU obtains, based on the resource unit allocation subfield corresponding to the second 80 MHz subblock in the 240 MHz bandwidth in the signal field, the frequency locations of the 484-tone RU and the 996-tone RU that form the MRU.

The following describes the foregoing solution in detail with reference to the PPDU communication method provided in another embodiment of this application.

A 996+484-tone RU in this embodiment is an MRU including a 996-tone RU with a low frequency and a 484-tone RU with a high frequency. A 484+996-tone RU in the embodiment of the PPDU communication method in this application is an MRU including a 484-tone RU with a low frequency and a 996-tone RU with a high frequency.

Figure 10:
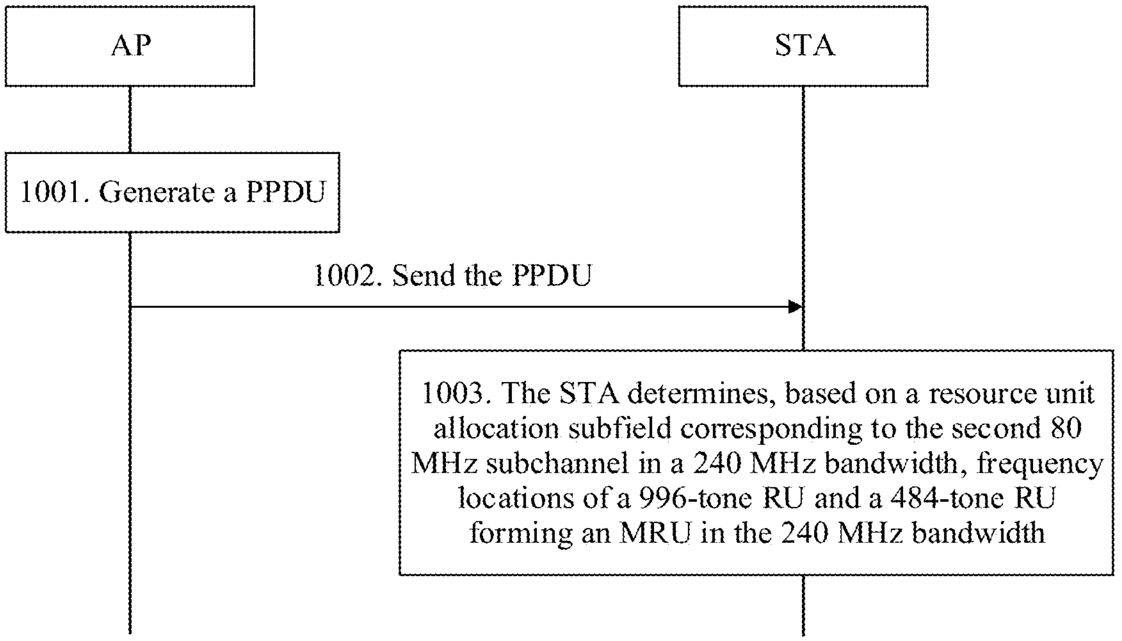
FIG. 10 is another schematic flowchart of a communication method according to an embodiment of this application.

As shown in the schematic flowchart of FIG. 10, the PPDU communication method provided in the another embodiment of this application may include the following steps.

1001. An AP generates a PPDU.

A bandwidth for transmitting the PPDU is 240 MHz, the 240 MHz bandwidth includes an MRU including a 996-tone RU and a 484-tone RU, and the MRU is a 996+484-tone RU or a 484+996-tone RU. For ease of description, each MRU in this embodiment may be understood as a 996+484-tone RU or a 484+996-tone RU.

The PPDU includes a plurality of resource unit allocation subfields corresponding to the 240 MHz bandwidth. A plurality of resource unit allocation subfields corresponding to the second 80 MHz subblock in the 240 MHz bandwidth include at least one resource unit allocation subfield corresponding to the MRU to indicate the MRU (996+484-tone RU or 484+996-tone RU) and indicate frequency locations of the 996-tone RU and the 484-tone RU that form the MRU in the 240 MHz bandwidth.

For example, in one or more resource unit allocation subfields corresponding to the second 80 MHz subblock in the 240 MHz bandwidth, the resource unit allocation subfield corresponding to the MRU indicates the 996+484-tone RU, indicates RU identifiers of the 996-tone RU and the 484-tone RU that form the 996+484-tone RU in the 160 MHz subblock to which the 996+484-tone RU belongs, and indicates whether the 160 MHz subblock is low-frequency 160 MHz or high-frequency 160 MHz in the 240 MHz bandwidth. The low-frequency 160 MHz may be understood as 160 MHz on the left side in the 240 MHz bandwidth, and the high-frequency 160 MHz may be understood as 160 MHz on the right side in the 240 MHz bandwidth. In this way, the resource unit allocation subfield corresponding to the MRU can indirectly indicate the frequency locations of the 996-tone RU and the 484-tone RU that form the MRU in the 240 MHz bandwidth.

It may be understood that the 240 MHz bandwidth may include one MRU including a 996-tone RU and a 484-tone RU.

The 240 MHz bandwidth may alternatively include two MRUs. Each MRU includes a 996-tone RU and a 484-tone RU. In this case, a 484-tone RU corresponding to the lowest 40 MHz frequency of the second 80 MHz subblock in the 240 MHz bandwidth and a 484-tone RU corresponding to the highest 40 MHz frequency of the second 80 MHz subblock in the 240 MHz bandwidth belong to different MRUs. One 484-tone RU belongs to the 996+484-tone RU, and the other 484-tone RU belongs to the 484+996-tone RU.

Optionally, the PPDU includes a signal field, and the signal field includes a common field and a user specific field. The common field includes the plurality of resource unit allocation subfields corresponding to the 240 MHz bandwidth. The user specific field includes a user field.

Optionally, the resource unit allocation subfield corresponding to the MRU further indicates a user field corresponding to the MRU, or the resource unit allocation subfield corresponding to the MRU further indicates a number of user fields contributed to a user specific field in a same EHT-SIG content channel as the resource unit allocation subfield.

1002. The AP sends the PPDU.

Correspondingly, a STA receives the PPDU.

1003. The STA determines, based on the resource unit allocation subfields corresponding to the second 80 MHz subblock in the 240 MHz bandwidth, the frequency locations of the 996-tone RU and the 484-tone RU that form the MRU in the 240 MHz bandwidth.

In this way, when the bandwidth, of 240 MHz, for transmitting the PPDU includes the MRU including the 996-tone RU and the 484-tone RU, in the plurality of resource unit allocation subfields corresponding to the second 80 MHz subblock in the 240 MHz bandwidth include the at least one resource unit allocation subfield corresponding to the MRU, to indicate the frequency locations of the 996-tone RU and the 484-tone RU that form the MRU in the 240 MHz bandwidth. In this way, the STA receiving the PPDU can determine, based on the plurality of resource unit allocation subfields corresponding to the second 80 MHz subblock, the frequency locations, in the 240 MHz bandwidth, of the 996-tone RU and the 484-tone RU that form each MRU included in the 240 MHz bandwidth, to determine, in the 240 MHz bandwidth, a specific 484-tone-RU and a specific 996-tone-RU that form an MRU. The AP can allocate, to one or more stations, the 484+996-tone RU and/or the 996+484-tone RU including the 996-tone RU and 484-tone RU in the 240 MHz bandwidth.

In this embodiment, the signal field may include a resource unit allocation subfield corresponding to the first 80 MHz subblock in the 240 MHz bandwidth and a resource unit allocation subfield corresponding to the third 80 MHz subblock in the 240 MHz bandwidth, or may not include the resource unit allocation subfield corresponding to the first 80 MHz subblock in the 240 MHz bandwidth and/or the resource unit allocation subfield corresponding to the third 80 MHz subblock in the 240 MHz bandwidth.

In an optional embodiment, the signal field includes a resource unit allocation subfield corresponding to at least one of the first 80 MHz subblock and the third 80 MHz subblock, and the STA may first determine, based on the resource unit allocation subfield in the signal field, that the 240 MHz bandwidth includes an MRU including a 996-tone RU and a 484-tone RU, and then perform step 1003.

In another optional embodiment, the signal field does not include a resource unit allocation subfield corresponding to the first 80 MHz subblock in the 240 MHz bandwidth and a resource unit allocation subfield corresponding to the third 80 MHz subblock in the 240 MHz bandwidth, and the STA does not need to determine that the 240 MHz bandwidth includes an MRU including a 996-tone RU and a 484-tone RU. The STA may directly determine, based on the resource unit allocation subfields corresponding to the second 80 MHz subblock in the 240 MHz bandwidth, the frequency locations, in the 240 MHz bandwidth, of the 996-tone RU and the 484-tone RU that form each 996-484-tone RU included in the 240 MHz bandwidth.

Specifically, when the consecutive bandwidth, of 240 MHz, for transmitting the PPDU includes an MRU including a 996-tone RU and a 484-tone RU, in one or more resource unit allocation subfields corresponding to the second 80 MHz subblock in the 240 MHz bandwidth, a resource unit allocation subfield corresponding to the MRU may be indicated by an index in Table 11. Resource unit allocation subfields corresponding to the first 80 MHz subblock and the third 80 MHz subblock in the 240 MHz bandwidth may be indicated by indices in Table 11, or may be indicated by other indices, for example, may be indicated by indices in Table 9 or Table 10. A manner of indication the resource unit allocation subfields corresponding to the first 80 MHz subblock and the third 80 MHz subblock in the 240 MHz bandwidth is not limited in this embodiment.

TABLE 11

| Resource unit allocation subfield | Indicated content | Entry quantity |
|---|---|---|
| Index 1 | 484(1) + 996(2) in low-frequency 160 MHz contributes zero user fields to a user specific field in a same EHT-SIG content channel as this resource unit allocation subfield | 1 |
| Indices 2 to 9 | 484(1) + 996(2) in low-frequency 160 MHz contributes one to eight user fields to a user specific field in a same EHT-SIG channel as this resource unit allocation subfield | 8 |
| Index 10 | 484(2) + 996(2) in low-frequency 160 MHz contributes zero user fields to a user specific field in a same EHT-SIG content channel as this resource unit allocation subfield | 1 |
| Indices 11 to 18 | 484(2) + 996(2) in low-frequency 160 MHz contributes one to eight user fields to a user specific field in a same EHT-SIG channel as this resource unit allocation subfield | 8 |
| Index 19 | 996(1) + 484(4) in low-frequency 160 MHz contributes zero user fields to a user specific field in a same EHT-SIG content channel as this resource unit allocation subfield | 1 |
| Indices 20 to 27 | 996(1) + 484(4) in low-frequency 160 MHz contributes one to eight user fields to a user specific field in a same EHT-SIG channel as this resource unit allocation subfield | 8 |
| Index 28 | 996(1) + 484(3) in low-frequency 160 MHz contributes zero user fields to a user specific field in a same EHT-SIG content channel as this resource unit allocation subfield | 1 |
| Indices 29 to 36 | 996(1) + 484(3) in low-frequency 160 MHz contributes one to eight user fields to a user specific field in a same EHT-SIG channel as this resource unit allocation subfield | 8 |
| Index 37 | 484(1) + 996(2) in high-frequency 160 MHz contributes zero user fields to a user specific field in a same EHT-SIG content channel as this resource unit allocation subfield | 1 |
| Indices 38 to 45 | 484(1) + 996(2) in high-frequency 160 MHz contributes one to eight user fields to a user specific field in a same EHT-SIG channel as this resource unit allocation subfield | 8 |
| Index 46 | 484(2) + 996(2) in high-frequency 160 MHz contributes zero user fields to a user specific field in a same EHT-SIG content channel as this resource unit allocation subfield | 1 |

TABLE 11-continued

| Resource unit allocation subfield | Indicated content | Entry quantity |
|---|---|---|
| Indices 47 to 54 | 484(2) + 996(2) in high-frequency 160 MHz contributes one to eight user fields to a user specific field in a same EHT-SIG channel as this resource unit allocation subfield | 8 |
| Index 55 | 996(1) + 484(4) in high-frequency 160 MHz contributes zero user fields to a user specific field in a same EHT-SIG content channel as this resource unit allocation subfield | 1 |
| Indices 56 to 63 | 996(1) + 484(4) in high-frequency 160 MHz contributes one to eight user fields to a user specific field in a same EHT-SIG channel as this resource unit allocation subfield | 8 |
| Index 64 | 996(1) + 484(3) in high-frequency 160 MHz contributes zero user fields to a user specific field in a same EHT-SIG content channel as this resource unit allocation subfield | 1 |
| Index 65 to 72 | 996(1) + 484(3) in high-frequency 160 MHz contributes one to eight user fields to a user specific field in a same EHT-SIG channel as this resource unit allocation subfield | 8 |

Any index in Table 11 indicates a type of MRU to which a 242-tone RU corresponding to a resource unit allocation subfield belongs, indicates RU numbers of RUs forming the MRU in a segment of consecutive frequencies to which the MRU belongs and a frequency location of the segment of consecutive frequencies in the 240 MHz bandwidth, and indicates a number of user fields contributed to a user specific field of a same EHT-SIG content channel as the resource unit allocation subfield. The number of user fields contributed to the user specific field in the same EHT-SIG content channel as the resource unit allocation subfield is a number of user fields corresponding to the resource unit allocation subfield in the EHT-SIG content channel in which the resource unit allocation subfield is located. A user field corresponding to the resource unit allocation subfield is a user field of a user to which a resource unit indicated by the resource unit allocation subfield is allocated.

Optionally, any index indicating that a number of user fields is 1 to 8 in Table 11 may include an RU allocation indicating part and a user field indicating part. The RU allocation indicating part indicates a type of MRU to which a 242-tone RU corresponding to a resource unit allocation subfield belongs, RU numbers of RUs forming the MRU in a segment of consecutive frequencies to which the MRU belongs, and a frequency location of the segment of consecutive frequencies in the 240 MHz bandwidth. The user field indicating part indicates the number of user fields contributed to the user specific field in the same EHT-SIG content channel as the resource unit allocation subfield.

Specifically, a structure of any index indicating that the number of user fields is 1 to 8 in Table 11 may be $k_n k_{n-1} \ldots k_2 k_1 y_2 y_1 y_0$, where $k_n k_{n-1} \ldots k_2 k_1$ is the RU allocation indicating part, n is a number of bits of the RU allocation indicating part, $y_2 y_1 y_0$ is the user field indicating part, is 3 bits, and indicates the one to eight user fields separately.

For the number of user fields indicated by each index in Table 11, refer to an indicated content part corresponding to each index in Table 11. The following specifically explains meanings of RUs indicated by the indices in Table 11.

In Table 11, the indices 1 to 9 indicate that 242-tone RUs corresponding to the resource unit allocation subfields belong to a 484+996-tone RU, an RU number of a 484-tone RU forming the 484+996-tone RU in the 484+996-tone RU is 1, an RU number of a 996-tone RU forming the 484+996-tone RU in the 484+996-tone RU is 2, and the 160 MHz subblock is low-frequency 160 MHz in the 240 MHz bandwidth, that is, 160 MHz on the left side. The STA can determine, based on the indices 1 to 9 in Table 11, that the 484+996-tone RU is obtained by combining the first 484-tone RU in the low-frequency 160 MHz subblock in the 240 MHz bandwidth and the second 996-tone RU in the 160 MHz subblock.

In Table 11, the indices 10 to 18 indicate that 242-tone RUs corresponding to the resource unit allocation subfields belong to a 484+996-tone RU, an RU number of a 484-tone RU forming the 484+996-tone RU in the 484+996-tone RU is 2, an RU number of a 996-tone RU forming the 484+996-tone RU in the 484+996-tone RU is 2, and the 160 MHz subblock is low-frequency 160 MHz in the 240 MHz bandwidth, that is, 160 MHz on the left side. The STA can determine, based on the indices 10 to 18 in Table 11, that the 484+996-tone RU is obtained by combining the second 484-tone RU in the low-frequency 160 MHz subblock in the 240 MHz bandwidth and the second 996-tone RU in the 160 MHz subblock.

In Table 11, the indices 19 to 27 indicate that 242-tone RUs corresponding to the resource unit allocation subfields belong to a 996+484-tone RU, an RU number of a 996-tone RU forming the 996+484-tone RU in the 996+484-tone RU is 1, an RU number of a 484-tone RU forming the 996+484-tone RU in the 996+484-tone RU is 4, and the 160 MHz subblock is low-frequency 160 MHz in the 240 MHz bandwidth, that is, 160 MHz on the left side. The STA can determine, based on the indices 19 to 27 in Table 11, that the 996+484-tone RU is obtained by combining the first 996-tone RU in the low-frequency 160 MHz subblock in the 240 MHz bandwidth and the fourth 484-tone RU in the 160 MHz subblock.

In Table 11, the indices 28 to 36 indicate that 242-tone RUs corresponding to the resource unit allocation subfields belong to a 996+484-tone RU, an RU number of a 996-tone RU forming the 996+484-tone RU in the 996+484-tone RU is 1, an RU number of a 484-tone RU forming the 996+484-tone RU in the 996+484-tone RU is 3, and the 160 MHz subblock is low-frequency 160 MHz in the 240 MHz bandwidth, that is, 160 MHz on the left side. The STA can determine, based on the indices 28 to 36 in Table 11, that the 996+484-tone RU is obtained by combining the first 996-tone RU in the low-frequency 160 MHz subblock in the 240 MHz bandwidth and the third 484-tone RU in the 160 MHz subblock.

In Table 11, the indices 37 to 45 indicate that 242-tone RUs corresponding to the resource unit allocation subfields belong to a 484+996-tone RU, an RU number of a 484-tone RU forming the 484+996-tone RU in the 484+996-tone RU is 1, an RU number of a 996-tone RU forming the 484+996-tone RU in the 484+996-tone RU is 2, and the 160 MHz subblock is high-frequency 160 MHz in the 240 MHz bandwidth, that is, 160 MHz on the right side. The STA can determine, based on the indices 37 to 45 in Table 11, that the 484+996-tone RU is obtained by combining the first 484-tone RU in the high-frequency 160 MHz subblock in the 240 MHz bandwidth and the second 996-tone RU in the 160 MHz subblock.

In Table 11, the indices 46 to 54 indicate that 242-tone RUs corresponding to the resource unit allocation subfields belong to a 484+996-tone RU, an RU number of a 484-tone RU forming the 484+996-tone RU in the 484+996-tone RU is 2, an RU number of a 996-tone RU forming the 484+996-tone RU in the 484+996-tone RU is 2, and the 160 MHz subblock is high-frequency 160 MHz in the 240 MHz bandwidth, that is, 160 MHz on the right side. The STA can determine, based on the indices 46 to 54, that the 484+996-tone RU is obtained by combining the second 484-tone RU in the high-frequency 160 MHz subblock in the 240 MHz bandwidth and the second 996-tone RU in the 160 MHz subblock.

In Table 11, the indices 55 to 63 indicate that 242-tone RUs corresponding to the resource unit allocation subfields belong to a 996+484-tone RU, an RU number of a 996-tone RU forming the 996+484-tone RU in the 996+484-tone RU is 1, an RU number of a 484-tone RU forming the 996+484-tone RU in the 996+484-tone RU is 4, and the 160 MHz subblock is high-frequency 160 MHz in the 240 MHz bandwidth, that is, 160 MHz on the right side. The STA can determine, based on the indices 55 to 63 in Table 11, that the 996+484-tone RU is obtained by combining the first 996-tone RU in the high-frequency 160 MHz subblock in the 240 MHz bandwidth and the fourth 484-tone RU in the 160 MHz subblock.

In Table 11, the indices 64 to 72 indicate that 242-tone RUs corresponding to the resource unit allocation subfields belong to a 996+484-tone RU, an RU number of a 996-tone RU forming the 996+484-tone RU in the 996+484-tone RU is 1, an RU number of a 484-tone RU forming the 996+484-tone RU in the 996+484-tone RU is 3, and the 160 MHz subblock is high-frequency 160 MHz in the 240 MHz bandwidth, that is, 160 MHz on the right side. The STA can determine, based on the indices 64 to 72 in Table 11, that the 996+484-tone RU is obtained by combining the first 996-tone RU in the high-frequency 160 MHz subblock in the 240 MHz bandwidth and the third 484-tone RU in the 160 MHz subblock.

Any index in Table 11 indicates a type of MRU to which a 242-tone RU corresponding to a resource unit allocation subfield belongs, indicates RU numbers of RUs forming the MRU in a segment of consecutive frequencies to which the MRU belongs and a frequency of the segment of consecutive frequencies in the bandwidth, and indicates a number of user fields contributed to a user specific field of a same EHT-SIG content channel as the resource unit allocation subfield.

Optionally, any index indicating that a number of user fields is 1 to 8 in Table 11 may include an RU allocation indicating part and a user field indicating part. The RU allocation indicating part indicates a type of MRU to which a 242-tone RU corresponding to a resource unit allocation subfield belongs, indicates RU numbers of RUs forming the MRU in a segment of consecutive frequencies to which the MRU belongs, and indicates a frequency of the segment of consecutive frequencies in the bandwidth. The user field indicating part indicates a number of user fields contributed to a user specific field of a same EHT-SIG content channel as the resource unit allocation subfield.

The following provides a specific example in which in the signal field of the PPDU, a resource unit allocation subfield is indicated by an index in Table 11.

Based on the resource unit allocation example shown in FIG. 9A, when the technical solution in the embodiment corresponding to FIG. 10 of this application is used, the signal field of the PPDU may include the resource unit allocation subfield 1 to the resource unit allocation subfield 4 corresponding to the first 80 MHz subblock in the 240 MHz bandwidth, the resource unit allocation subfield 5 to the resource unit allocation subfield 8 corresponding to the second 80 MHz subblock in the 240 MHz bandwidth, and the resource unit allocation subfield 9 to the resource unit allocation subfield 12 corresponding to the third 80 MHz subblock in the 240 MHz bandwidth.

The PPDU is transmitted in two content channels. The two content channels may be a content channel 1 and a content channel 2. The resource unit allocation subfields 1, 3, 5, 7, 9, and 11 may be transmitted in the content channel 1, and the resource unit allocation subfields 2, 4, 6, 8, 10, and 12 may be transmitted in the content channel 2.

The resource unit allocation subfields 5 and 6 may be indicated by indices in the indices 28 to 36 in Table 11. The resource unit allocation subfields 7 and 8 may be indicated by the indices 46 to 54 in Table 6.

The STA determines, based on the resource unit allocation subfields 5 and 6, that the fifth 242-tone RU and the sixth 242-tone RU in the 240 MHz bandwidth belong to a 996+484-tone RU, and the 996+484-tone RU includes the first 996-tone RU and the third 484-tone RU in a 160 MHz subblock to which the 996+484-tone RU belongs. The STA may further determine, based on the resource unit allocation subfields 5 and 6, that the 160 MHz subblock to which the 996+484-tone RU belongs is the lowest 160 MHz frequency in the 240 MHz bandwidth. In this case, the STA may determine that the 996+484-tone RU includes the 996-tone RU corresponding to the first 80 MHz subblock in the 240 MHz bandwidth and the 484-tone RU corresponding to the lowest 40 MHz frequency of the second 80 MHz subblock.

The STA determines, based on the resource unit allocation subfields 7 and 8, that the seventh 242-tone RU and the eighth 242-tone RU in the 240 MHz bandwidth belong to a 484+996-tone RU, and the 484+996-tone RU includes the second 484-tone RU and the second 996-tone RU in a 160 MHz subblock to which the 484+996-tone RU belongs. The STA may further determine, based on the resource unit allocation subfields 7 and 8, that the 160 MHz subblock to which the 484+996-tone RU belongs is high-frequency 160 MHz in the 240 MHz bandwidth. In this case, the STA may determine that the 484+996-tone RU includes a 484-tone RU corresponding to the highest 40 MHz frequency of the second 80 MHz subblock in the 240 MHz bandwidth and a 996-tone RU corresponding to the third 80 MHz subblock.

The resource unit allocation subfields 1 to 12 are all resource unit allocation subfields corresponding to the MRU. The resource unit allocation subfields 1 to 4 and 9 to 12 may be indicated by the indices in Table 11, or may be indicated by other indices, for example, may be indicated by the indices in Table 9 or Table 10.

The resource unit allocation subfields 1 to 4 and 9 to 12 indicate numbers of user fields that are in the user specific field and that correspond to the MRU, or may not be for determining numbers of user fields that are in the user specific field and that correspond to the MRU.

When the resource unit allocation subfields 1 to 4 indicate the numbers of user fields that are in the user specific field and that correspond to the MRU, the STA determines, based on a sum of numbers of user fields indicated by the resource unit allocation subfields 1 to 6, a number of user fields corresponding to a 996+484-tone RU that include a 996-tone RU corresponding to the first 80 MHz subblock in the 240 MHz bandwidth and a 484-tone RU corresponding to the lowest 40 MHz frequency of the second 80 MHz subblock.

When the resource unit allocation subfields 1 to 4 do not indicate the numbers of user fields that are in the user specific field and that correspond to the MRU, the STA determines, based on a sum of numbers of user fields indicated by the resource unit allocation subfields 5 and 6, a number of user fields corresponding to a 996+484-tone RU that include a 996-tone RU corresponding to the first 80 MHz subblock in the 240 MHz bandwidth and a 484-tone RU corresponding to the lowest 40 MHz frequency of the second 80 MHz subblock.

When the resource unit allocation subfields 9 to 12 indicate the numbers of user fields that are in the user specific field and that correspond to the MRU, the STA determines, based on a sum of numbers of user fields indicated by the resource unit allocation subfields 7 to 12, a number of user fields corresponding to a 484+996-tone RU that include a 484-tone RU corresponding to the highest 40 MHz frequency of the second 80 MHz subblock in the 240 MHz bandwidth and a 996-tone RU corresponding to the third 80 MHz subblock.

When the resource unit allocation subfields 9 to 12 do not indicate the numbers of user fields that are in the user specific field and that correspond to the MRU, the STA determines, based on a sum of numbers of user fields indicated by the resource unit allocation subfields 7 and 8, a number of user fields corresponding to a 484+996-tone RU that include a 484-tone RU corresponding to the highest 40 MHz frequency of the second 80 MHz subblock in the 240 MHz bandwidth and a 996-tone RU corresponding to the third 80 MHz subblock.

Figure 11A:
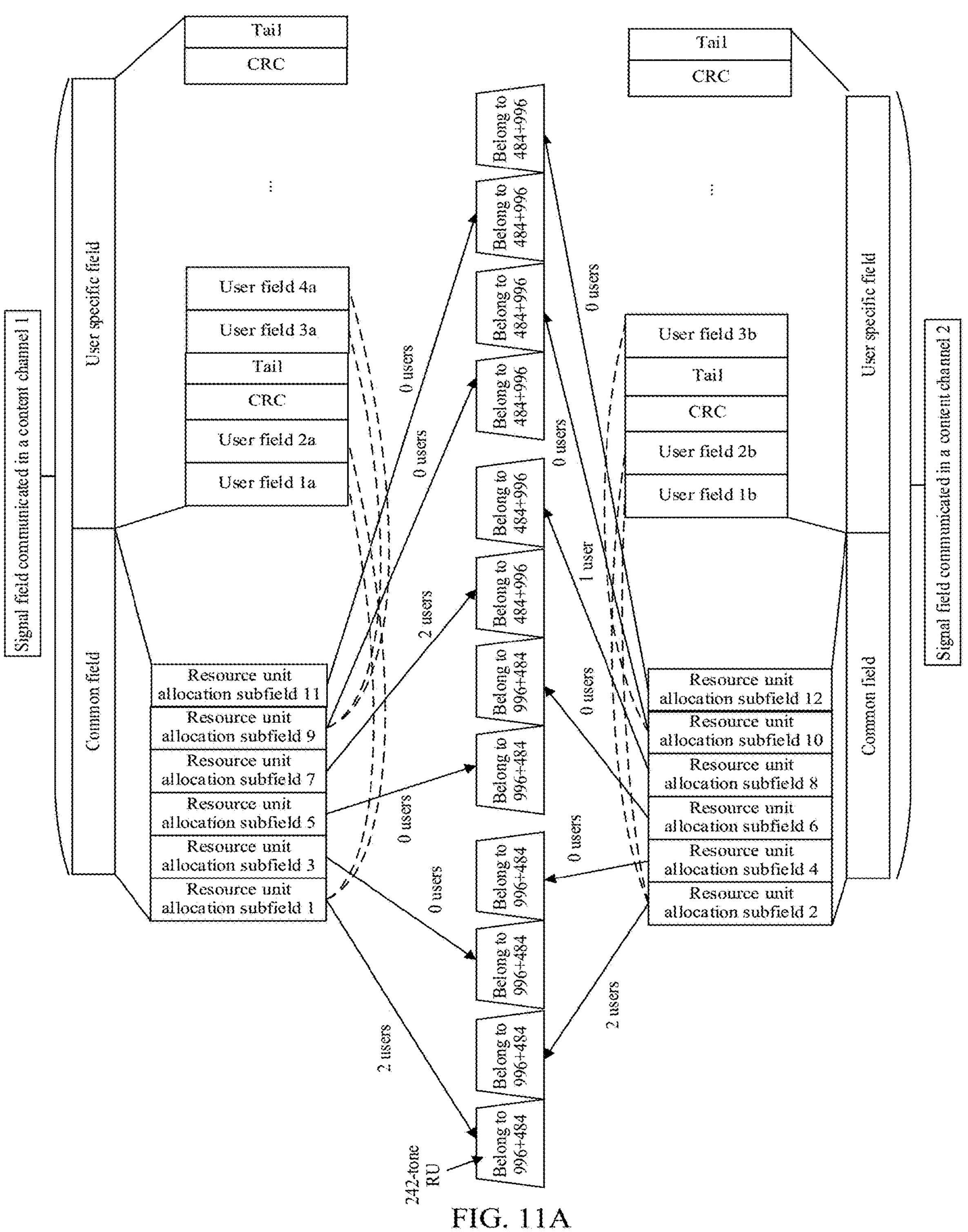
FIG. 11A is a schematic diagram of a structure of yet another signal field according to an embodiment of this application.

FIG. 11A is a schematic diagram of a structure of the signal field. The resource unit allocation subfields 1 to 4 and 9 to 12 may be indicated by the indices in Table 11. The resource unit allocation subfields 1 to 4 indicate the numbers of user fields that are in the user specific fields and that correspond to the MRU.

Specifically, the resource unit allocation subfield 1 may be indicated by the index 30 in Table 11, to indicate that the first 242-tone RU belongs to a 996+484-tone RU, the 996+484-tone RU is obtained by combining the first 996-tone RU in a 160 MHz subblock to which the 996+484-tone RU belongs and the third 484-tone RU in the 160 MHz subblock, and the 160 MHz subblock is a 160 MHz subblock on the left side in the 240 MHz bandwidth, and to indicate that two user fields are contributed to a user specific field of a same EHT-SIG content channel (content channel 1) as the resource unit allocation subfield. The resource unit allocation subfield 2 may be indicated by the index 30 in Table 11, to indicate that the second 242-tone RU in the 240 MHz bandwidth corresponds to a 996+484-tone RU, the 996+484-tone RU is obtained by combining the first 996-tone RU in a 160 MHz subblock to which the 996+484-tone RU belongs and the third 484-tone RU in the 160 MHz subblock, and the 160 MHz subblock is a 160 MHz subblock on the left side in the 240 MHz bandwidth, and to indicate that two user fields are contributed to a user specific field of a same EHT-SIG content channel (content channel 2) as the resource unit allocation subfield.

The resource unit allocation subfield 3 to the resource unit allocation subfield 6 may be indicated by the index 28 in Table 11, to indicate that a corresponding 20 MHz subblock belongs to a 996+484-tone RU, the 996+484-tone RU is obtained by combining the first 996-tone RU in a 160 MHz subblock to which the 996+484-tone RU belongs and the third 484-tone RU in the 160 MHz subblock, and the 160 MHz subblock is a 160 MHz subblock on the left side in the 240 MHz bandwidth, and to indicate that zero user fields are contributed to a user specific field of a same EHT-SIG content channel as the resource unit allocation subfield.

The resource unit allocation subfield 7 may be indicated by the index 48 in Table 11, to indicate that the seventh 242-tone RU in the 240 MHz bandwidth belongs to a 484+996 tone RU, the 484+996 tone RU is obtained by combining the second 484-tone RU and the second 996-tone RU in a 160 MHz subblock to which the 484+996 tone RU belongs, and the 160 MHz subblock is a 160 MHz subblock on the left side in the 240 MHz bandwidth, and to indicate that two user fields are contributed to a user specific field of a same EHT-SIG content channel (content channel 1) as the resource unit allocation subfield.

The resource unit allocation subfield 8 may be indicated by the index 47 in Table 11, to indicate that the seventh 242-tone RU in the 240 MHz bandwidth belongs to a 484+996 tone RU, the 484+996 tone RU includes the second 484-tone RU and the second 996-tone RU in a 160 MHz subblock to which the 484+996 tone RU belongs, and the 160 MHz subblock is a 160 MHz subblock on the left side in the 240 MHz bandwidth, and to indicate that one user field is contributed to a user specific field of a same EHT-SIG content channel (content channel 2) as the resource unit allocation subfield.

It can be learned that any one of the resource unit allocation subfields 1 to 12 may indicate that a corresponding 242-tone RU belongs to an MRU formed by combining a 484-tone RU and a 996-tone RU, and indicate frequency locations of the 484-tone RU and the 996-tone RU that form the 484+996-tone RU in a 160 MHz subblock to which the MRU belongs and a frequency location of the 160 MHz subblock in the 240 MHz bandwidth, to indicate the frequency locations of the 484-tone RU and the 996-tone RU that form the MRU in the 240 MHz bandwidth in which the MRU is located. In this way, any one of the resource unit allocation subfields 1 to 12 can accurately indicate a specific 484-tone RU and a specific 996-tone RU of a specific 80 MHz subblock included in an MRU indicated by the resource unit allocation subfield.

Figure 11B:
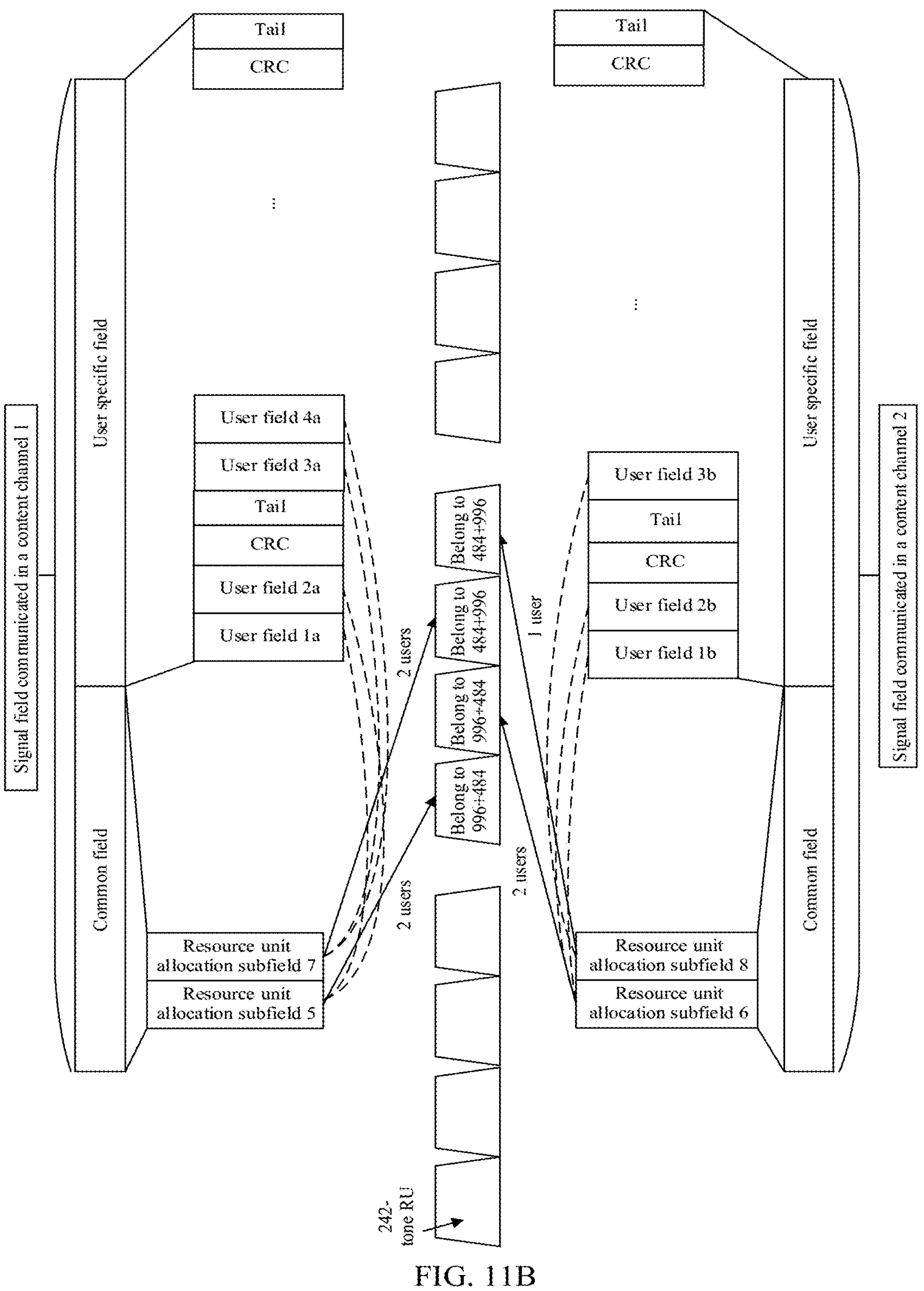
FIG. 11B is a schematic diagram of a structure of yet another signal field according to an embodiment of this application.

Refer to a schematic diagram of a structure of the signal field shown in FIG. 11B. If the signal field does not include resource unit allocation subfields corresponding to the first 80 MHz subblock and the third 80 MHz subblock in the 240 MHz bandwidth, a resource unit allocation subfield 5 corresponding to the fifth 20 MHz subblock in the 240 MHz bandwidth may be indicated by the index 30 in Table 11, to indicate that the first 996-tone RU and the third 484-tone RU of the lowest 160 MHz frequency in the 240 MHz bandwidth form a 996+484-tone RU, and the 996+484-tone RU contributes two user fields to a user specific field in a same EHT-SIG content channel as this resource unit allocation subfield. A resource unit allocation subfield 6 corresponding to the sixth 20 MHz subblock in the 240 MHz bandwidth may be indicated by the index 30 in Table 11, to indicate that the first 996-tone RU and the third 484-tone RU of the lowest 160 MHz frequency in the 240 MHz bandwidth form a 996+484-tone RU, and the 996+484-tone RU contributes two user fields to a user specific field in a same EHT-SIG content channel as this resource unit allocation subfield.

A resource unit allocation subfield 7 corresponding to the seventh 20 MHz subblock in the 240 MHz bandwidth may be indicated by the index 48 in Table 11, to indicate that the second 484-tone RU and the second 996-tone RU of the highest 160 MHz frequency in the 240 MHz bandwidth form a 484+996-tone RU, and the 484+996-tone RU contributes two user fields to a user specific field in a same EHT-SIG content channel as this resource unit allocation subfield. A resource unit allocation subfield 8 corresponding to the eighth 20 MHz subblock in the 240 MHz bandwidth may be indicated by the index 47 in Table 11, to indicate that the second 484-tone RU and the second 996-tone RU of the highest 160 MHz frequency in the 240 MHz bandwidth form a 484+996-tone RU, and the 484+996-tone RU contributes one user field to a user specific field in a same EHT-SIG content channel as this resource unit allocation subfield.

The STA can determine, based on the resource unit allocation subfield 5 and the resource unit allocation subfield 6 corresponding to the second 80 MHz subblock, that the first 996-tone RU and the third 484-tone RU of the lowest 160 MHz frequency in the 240 MHz bandwidth form a 996+484-tone RU. The STA determines, based on a sum of a number of users indicated by the resource unit allocation subfield 5 and a number of users indicated by the resource unit allocation subfield 6, that a number of user fields corresponding to the 996+484-tone RU is 4.

The STA can further determine, based on the resource unit allocation subfield 7 and the resource unit allocation subfield 8 corresponding to the second 80 MHz subblock, that the second 484-tone RU and the second 996-tone RU of the highest 160 MHz frequency in the 240 MHz bandwidth form a 484+996-tone RU. The STA determines, based on a sum of a number of users indicated by the resource unit allocation subfield 7 and a number of users indicated by the resource unit allocation subfield 8, that a number of user fields corresponding to the 484+996-tone RU is 3.

In some other embodiments of this application, when the 240 MHz bandwidth includes two MRUs, and each MRU includes a 996-tone RU and a 484-tone RU, a communication standard (for example, 802.11be and a standard later than 802.11be) may specify frequency locations of the 996-tone RU and the 484-tone RU that form each MRU in the 240 MHz bandwidth. In other words, when the consecutive 240 MHz bandwidth includes two MRUs, and each RU includes a 996-tone RU and a 484-tone RU, the frequency locations of the 996-tone RU and the 484-tone RU that form each MRU are fixed in the 240 MHz bandwidth. The MRU is a 996+484-tone RU or a 484+996-tone RU. A 996+484-tone RU in this embodiment is an MRU including a 996-tone RU with a low frequency and a 484-tone RU with a high frequency. A 484+996-tone RU in the embodiment of the PPDU communication method in this application is an MRU including a 484-tone RU with a low frequency and a 996-tone RU with a high frequency.

For example, the 240 MHz bandwidth may include a 996-tone RU, a 484-tone RU, a 484-tone RU, and a 996-tone RU in an increasing absolute-frequency order. The lower-frequency 996-tone RU and 484-tone RU are combined into a 996+484-tone RU, and the higher-frequency 484-tone RU and 996-tone RU are combined into a 484+996-tone RU.

In such an embodiment, any resource unit allocation subfield corresponding to the MRU in the signal field may indicate a frequency location of the MRU in the 240 MHz bandwidth.

The solution in this embodiment may be performed by using the following steps:

1201. An AP generates a PPDU.

A bandwidth for transmitting the PPDU is greater than or equal to 240 MHz, and the consecutive 240 MHz bandwidth includes a 996+484-tone RU and a 484+996-tone RU.

The PPDU includes a resource unit allocation subfield corresponding to the 996+484-tone RU and a resource unit allocation subfield corresponding to the 484+996-tone RU.

The resource unit allocation subfield corresponding to the 996+484-tone RU indicates frequency locations of a 996-tone RU and a 484-tone RU that form the 996+484-tone RU in the 240 MHz bandwidth. The resource unit allocation subfield corresponding to the 484+996-tone RU indicates frequency locations of a 996-tone RU and a 484-tone RU that form the 484+996-tone RU in the 240 MHz bandwidth. A user specific field includes a user field corresponding to the 996+484-tone RU and a user field corresponding to the 484+996-tone RU. The resource unit allocation subfield may be a subfield in a signal field (for example, EHT-SIG) of the PPDU.

1202. The AP sends the PPDU.

Correspondingly, a STA receives the PPDU.

1203. The STA determines, based on the PPDU, the resource unit allocation subfield corresponding to the 996+484-tone RU, and the resource unit allocation subfield corresponding to the 484+996-tone RU, the frequency locations of the 996-tone RU and the 484-tone RU that form the 996+484-tone RU in the 240 MHz bandwidth and the frequency locations of the 996-tone RU and the 484-tone RU that form the 484+996-tone RU in the 240 MHz bandwidth.

In this way, the STA can accurately determine, based on the resource unit allocation subfield in the signal field, frequency locations of a 996-tone RU and a 484-tone RU that form an MRU in the 240 MHz bandwidth.

Specifically, a resource unit allocation subfield corresponding to the MRU may be indicated by an index shown in Table 12.

TABLE 12

| Resource unit allocation subfield | Indicated content | Entry quantity |
|---|---|---|
| Index 1 | (996 + 484) and (484 + 996) in the 240 MHz bandwidth contributes zero user fields to a user specific field in a same EHT-SIG content channel as this resource unit allocation subfield | 1 |
| Indices 2 to 9 | (996 + 484) and (484 + 996) in the 240 MHz bandwidth contributes one to eight user fields to a user specific field in a same EHT-SIG channel as this resource unit allocation subfield | 8 |

For a number of user fields indicated by each index in Table 12, refer to an indicated content part corresponding to each index in Table 12.

The indices 1 to 9 in Table 12 indicate 996+484-tone RUs. A 996-tone RU corresponding to the first 80 MHz subblock in the 240 MHz bandwidth and a 484-tone RU corresponding to the first 40 MHz subblock of the second 80 MHz subblock form one of the 996+484-tone RUs, and a 484-tone RU corresponding to the second 40 MHz subblock of the second 80 MHz subblock in the 240 MHz bandwidth and a 996-tone RU corresponding to the third 80 MHz subblock in the 240 MHz bandwidth form a 484+996-tone RU. In such a solution, when the 240 MHz bandwidth includes two MRUs, and each RU includes a 996-tone RU and a 484-tone RU, a communication standard may specify frequency locations of the 996-tone RU and the 484-tone RU that form each MRU in the 240 MHz bandwidth, so that the frequency locations of the 996-tone RU and the 484-tone RU that form each MRU are fixed and single in the 240 MHz bandwidth. In this way, a number of indices for indicating the frequency locations of the 996-tone RU and the 484-tone RU that form each MRU in the 240 MHz bandwidth can be reduced, and a resource unit allocation subfield can indicate richer information by using saved indices.

Optionally, the indices 2 to 9 indicating the one to eight user fields in Table 12 may include an RU allocation indicating part and a user field indicating part. The RU allocation indicating part indicates frequency locations, in the 240 MHz bandwidth, of a 996-tone RU and a 484-tone RU that form a 996+484-tone RU in the 240 MHz bandwidth and frequency locations of a 996-tone RU and a 484-tone RU that form a 484+996-tone RU in the 240 MHz bandwidth. The user field quantity indicating part indicates a number of user fields contributed to a user specific field of a same EHT-SIG content channel as the resource unit allocation subfield. The user field quantity indicating part may be, for example, 3 bits.

Specifically, a structure of the index 2 to the index 9 may be $k_n k_{n-1} \ldots k_2 k_1 y_2 y_1 y_0$, where $k_n k_{n-1} \ldots k_2 k_1$ is the part indicating an MRU frequency location, n is a number of bits of the RU allocation indicating part, and $y_2 y_1 y_0$ is the user field indicating part, is 3 bits, and indicates the one to eight user fields separately. In an optional embodiment, the structure of the indices 2 to 9 may be a structure shown in Table 13.

TABLE 13

| Resource unit allocation subfield | RU allocation indicating part | User field indicating part $y_2y_1y_0$ | Indicated content |
|---|---|---|---|
| Index 2 | $k_nk_{n-1} \ldots k_2k_1$ | 000 | (996 + 484) and (484 + 996) in the 240 MHz bandwidth contributes one user field to a user specific field in a same EHT-SIG content channel as this resource unit allocation subfield |
| Index 3 | | 001 | (996 + 484) and (484 + 996) in the 240 MHz bandwidth contributes two user fields to a user specific field in a same EHT-SIG content channel as this resource unit allocation subfield |
| Index 4 | | 010 | (996 + 484) and (484 + 996) in the 240 MHz bandwidth contributes three user fields to a user specific field in a same EHT-SIG content channel as this resource unit allocation subfield |
| Index 5 | | 011 | (996 + 484) and (484 + 996) in the 240 MHz bandwidth contributes four user fields to a user specific field in a same EHT-SIG content channel as this resource unit allocation subfield |
| Index 6 | | 100 | (996 + 484) and (484 + 996) in the 240 MHz bandwidth contributes five user fields to a user specific field in a same EHT-SIG content channel as this resource unit allocation subfield |
| Index 7 | | 101 | (996 + 484) and (484 + 996) in the 240 MHz bandwidth contributes six user fields to a user specific field in a same EHT-SIG content channel as this resource unit allocation subfield |
| Index 8 | | 110 | (996 + 484) and (484 + 996) in the 240 MHz bandwidth contributes seven user fields to a user specific field in a same EHT-SIG content channel as this resource unit allocation subfield |
| Index 9 | | 111 | (996 + 484) and (484 + 996) in the 240 MHz bandwidth contributes eight user fields to a user specific field in a same EHT-SIG content channel as this resource unit allocation subfield |

In some other embodiments of this application, as specified in a communication standard (for example, 802.11be and a standard later than 802.11be), in the 240 MHz bandwidth, a 996-tone RU and a 484-tone RU in only one 160 MHz subblock can be combined into a 996+484-tone RU or a 484+996-tone RU. A 996+484-tone RU in this embodiment is an MRU including a 996-tone RU with a low frequency and a 484-tone RU with a high frequency. A 484+996-tone RU in the embodiment of the PPDU communication method in this application is an MRU including a 484-tone RU with a low frequency and a 996-tone RU with a high frequency.

In a possible implementation, in the consecutive 240 MHz bandwidth, the 160 MHz subblock that is allowed to include a 996+484-tone RU or a 484+996-tone RU is fixed. For example, as specified in a communication standard, in the consecutive 240 MHz bandwidth, a 996-tone RU and a 484-tone RU in only a primary 160 MHz subblock (160 MHz subblock including a primary 80 MHz subblock and a secondary 80 MHz subblock) in the 240 MHz bandwidth can be combined into a 996+484-tone RU or a 484+996-tone RU.

In another possible implementation, in the consecutive 240 MHz bandwidth, a 160 MHz subblock that is allowed to include a 996+484-tone RU or a 484+996-tone RU is variable, and may be understood as dynamic or semi-static. For example, the AP may send indication information to indicate that a 996-tone RU and a 484-tone RU in the first 80 MHz subblock and the second 80 MHz subblock in the 240 MHz bandwidth are allowed to be combined into a 996+484-tone RU or a 484+996-tone RU, or indicate that a 996-tone RU and a 484-tone RU in the second 80 MHz subblock and the third 80 MHz subblock are allowed to be combined into a 996+484-tone RU. In this way, the STA can determine, based on the 160 MHz subblock that is allowed to include a 996+484-tone RU or a 484+996-tone RU, to determine frequency locations of the 996-tone RU and the 484-tone RU that form the 996+484-tone RU or the 484+996-tone RU in the 240 MHz bandwidth. The STA may send the indication information to the STA in one of a beacon frame, a probe response frame, or an association response frame.

This can avoid a problem that the consecutive 240 MHz bandwidth includes two 996+484-tone RUs, and can avoid a problem that the STA cannot accurately learn of an RU allocation status due to unclear indication of a resource unit allocation subfield, so that the STA receives data from an RU that is allocated to the STA and the STA correctly reads data.

Optionally, the 240 MHz bandwidth may be the complete bandwidth for transmitting the PPDU. Alternatively, the 240 MHz bandwidth may be 240 MHz other than punctured 80 MHz in a bandwidth, of 320 MHz, for transmitting the PPDU. In this case, the 320 MHz bandwidth includes a primary 160 MHz subblock and a secondary 160 MHz subblock. If one 80 MHz subblock of the primary 160 MHz subblock is punctured, the secondary 160 MHz subblock is allowed to include a 996+484-tone RU or a 484+996-tone RU. If one 80 MHz subblock of the secondary 160 MHz subblock is punctured, the primary 160 MHz subblock may be allowed to include a 996+484-tone RU or a 484+996-tone RU.

It should be understood that, a solution to accurately indicating a 996-tone RU and a 484-tone RU that form an MRU in this embodiment of this application and a solution in which a resource unit allocation subfield cannot accurately indicate that the 320 MHz bandwidth includes a 2*996-tone RU and a 996+484-tone RU may be separately implemented, or may be implemented in combination.

The foregoing embodiments of this application describe the method provided in embodiments of this application from perspectives of the access point and the station. To implement the functions in the foregoing method provided in embodiments of this application, the access point and the station may include a hardware structure and a software module, to implement the foregoing functions in a form of the hardware structure, the software module, or a combination of the hardware structure and the software module. A function in the foregoing functions may be performed in a form of the hardware structure, the software module, or a combination of the hardware structure and the software module.

Figure 12:
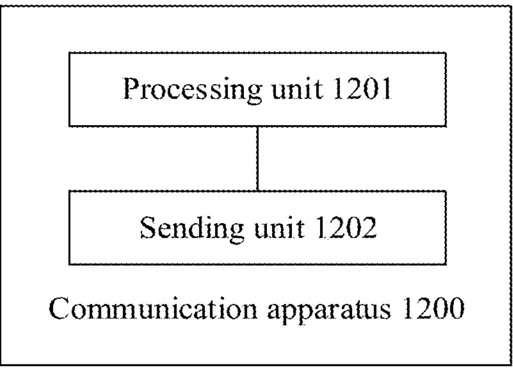
FIG. 12 is a schematic diagram of a structure of a communication apparatus according to an embodiment of this application.

Refer to FIG. 12. FIG. 12 is a schematic diagram of a structure of a PPDU communication apparatus according to an embodiment of this application. The communication apparatus 1200 includes a processing unit 1201 and a sending unit 1202. The communication apparatus 1200 is a PPDU sending apparatus. The communication apparatus 1200 may be a station or an access point. The processing unit 1201 may be understood as a processor of a communication apparatus, and the sending unit 1202 may be understood as a transmitter of a transceiver of the communication apparatus.

The processing unit 1201 is configured to generate a PPDU, where the PPDU includes a plurality of resource unit allocation subfields, the plurality of resource unit allocation subfields include a resource unit allocation subfield corresponding to an MRU, the resource unit allocation subfield corresponding to the MRU indicates that a 242-tone RU corresponding to the resource unit allocation subfield belongs to the MRU, and a number of resource unit allocation subfields corresponding to the MRU in a resource unit allocation subfield corresponding to each 80 MHz subblock in a plurality of 80 MHz subblocks in a bandwidth for transmitting the PPDU is for determining or indicating a type of the MRU.

The sending unit 1202 is configured to send the PPDU.

The bandwidth for transmitting the PPDU is greater than or equal to 80 MHz. The bandwidth includes one or more 80 MHz subblocks. For example, three 80 MHz subblocks are included when the bandwidth is 240 MHz, four 80 MHz subblocks are included when the bandwidth is 320 MHz. In this way, a resource unit allocation subfield indication manner is simple, and the communication apparatus 1200 can determine the type of the MRU based on the number of resource unit allocation subfields corresponding to the MRU in the resource unit allocation subfield corresponding to each 80 MHz subblock in the plurality of 80 MHz subblocks in the bandwidth for transmitting the PPDU, to determine an RU forming the MRU. The bandwidth for transmitting the PPDU is greater than or equal to 80 MHz. This can implement combination of a plurality of RUs into one MRU and allocation of the MRU to one or more users.

Figure 13:
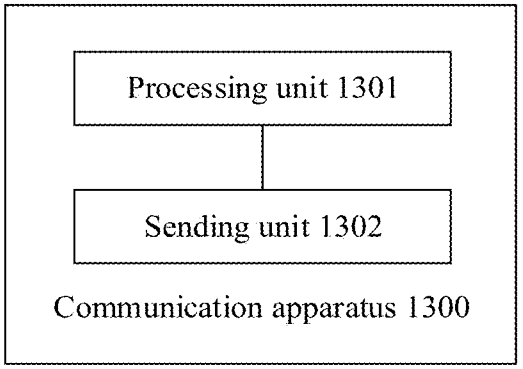
FIG. 13 is a schematic diagram of a structure of a communication apparatus according to an embodiment of this application.

Refer to FIG. 13. FIG. 13 is a schematic diagram of a structure of a PPDU communication apparatus according to an embodiment of this application. The communication apparatus 1300 includes a processing unit 1301 and a sending unit 1302. The communication apparatus 1300 is a PPDU sending apparatus. The communication apparatus 1300 may be a station or an access point. The processing unit 1301 may be understood as a processor of a communication apparatus, and the sending unit 1302 may be understood as a transmitter of a transceiver of the communication apparatus.

The processing unit 1301 is configured to generate a PPDU, where the PPDU includes a plurality of resource unit allocation subfields, the plurality of resource unit allocation subfields include a resource unit allocation subfield indicating two first MRUs, a 240 MHz bandwidth to which the two first MRUs belong is consecutive 240 MHz in a bandwidth for transmitting the PPDU, and frequency locations, in the 240 MHz bandwidth, of a 996-tone RU and a 484-tone RU that form each of the first RUs are set according to a standard.

The sending unit 1302 is configured to send the PPDU.

In this way, the communication standard specifies the frequency locations, in the 240 MHz bandwidth, of the 996-tone RU and the 484-tone RU that form each first MRU. The communication apparatus 1300 can accurately determine the frequency locations, in the 240 MHz bandwidth, of the 996-tone RU and the 484-tone RU that form each first MRU, thereby allocating an MRU obtained by combining a 996-tone RU and a 484-tone RU to one or more users. In addition, in such a solution, different combination cases do not need to be indicated by different indices of a resource unit allocation subfield, and a number of indices used for the resource unit allocation subfield to indicate a 996+484-tone RU and a 484+996-tone RU can be reduced.

Figure 14:
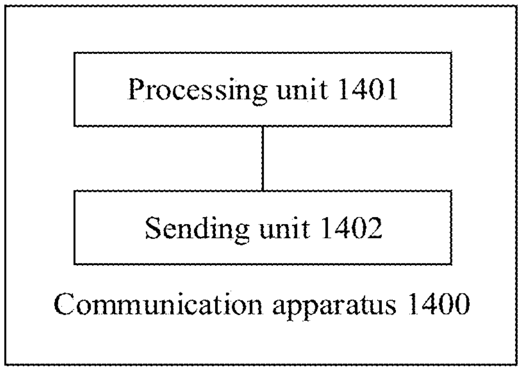
FIG. 14 is a schematic diagram of a structure of a communication apparatus according to an embodiment of this application.

Refer to FIG. 14. FIG. 14 is a schematic diagram of a structure of a PPDU communication apparatus according to an embodiment of this application. The communication apparatus 1400 includes a processing unit 1401 and a sending unit 1402. The communication apparatus 1400 is a PPDU sending apparatus. The communication apparatus 1400 may be a station or an access point. The processing unit 1401 may be understood as a processor of a communication apparatus, and the sending unit 1402 may be understood as a transmitter of a transceiver of the communication apparatus.

The processing unit 1401 is configured to generate a PPDU, where the PPDU includes a plurality of resource unit allocation subfields, the plurality of resource unit allocation subfields include a resource unit allocation subfield indicating a first MRU and a resource unit allocation subfield indicating a second MRU, and frequency locations, in a bandwidth for transmitting the PPDU, of a 996-tone RU and a 484-tone RU that form the first RU and a 2*996-tone RU and a 484-tone RU that form the second MRU are set according to a standard.

The sending unit 1402 is configured to send the PPDU.

In this way, the standard specifies frequency locations, in a 320 MHz bandwidth, of the 996-tone RU and the 484-tone RU that form the first RU and the 2*996-tone RU and the 484-tone RU that form the second MRU. The communication apparatus 1400 can accurately determine the frequency locations, in the 320 MHz bandwidth, of the 996-tone RU and the 484-tone RU that form the first RU and the 2*996- tone RU and the 484-tone RU that form the second MRU, thereby allocating an MRU obtained by combining a 2*996-tone RU and a 484-tone RU to one or more users. In addition, in such a solution, different combination cases do not need to be indicated by different indices of a resource unit allocation subfield, and a number of indices used for the resource unit allocation subfield to indicate a 2*996+484-tone RU and a 484+2*996-tone RU can be reduced.

Figure 15:
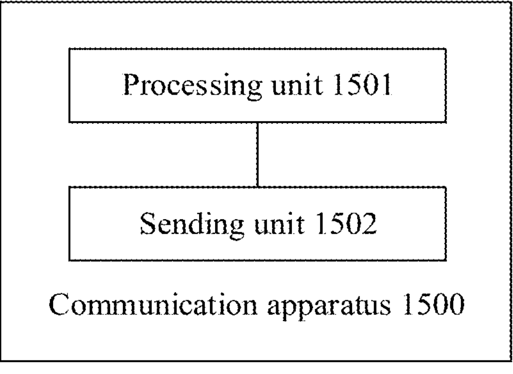
FIG. 15 is a schematic diagram of a structure of a communication apparatus according to an embodiment of this application.

Refer to FIG. 15. FIG. 15 is a schematic diagram of a structure of a PPDU communication apparatus according to an embodiment of this application. The communication apparatus 1500 includes a processing unit 1501 and a sending unit 1502. The communication apparatus 1500 is a PPDU sending apparatus. The communication apparatus 1500 may be a station or an access point. The processing unit 1501 may be understood as a processor of a communication apparatus, and the sending unit 1502 may be understood as a transmitter of a transceiver of the communication apparatus.

The processing unit 1501 is configured to generate a PPDU, where the PPDU includes a plurality of resource unit allocation subfields, the plurality of resource unit allocation subfields include a resource unit allocation subfield indicating a first MRU, the first MRU consists of a 996-tone RU and a 484-tone RU, and a frequency location of a 160 MHz subblock to which the first MRU belongs in a bandwidth for transmitting the PPDU is a frequency location that is set according to a standard or is a frequency location indicated by indication information sent by an AP.

The sending unit 1502 is configured to send the PPDU.

That is, a 996-tone RU and a 484-tone RU can be combined into an MRU only in an allowed 160 MHz subblock specified in a standard or in an allowed 160 MHz subblock indicated by the indication information sent by the AP.

In this way, the communication apparatus 1500 can accurately determine that a 996+484-tone RU or a 484+996-tone RU includes a 996-tone RU and a 484-tone RU of which 160 MHz subblock, thereby allocating an MRU obtained by combining a 996-tone RU and a 484-tone RU to one or more users. In addition, in such a solution, different combination cases do not need to be indicated by different indices of a resource unit allocation subfield, and a number of indices used for the resource unit allocation subfield to indicate a 996+484-tone RU and a 484+996-tone RU can be reduced.

Figure 16:
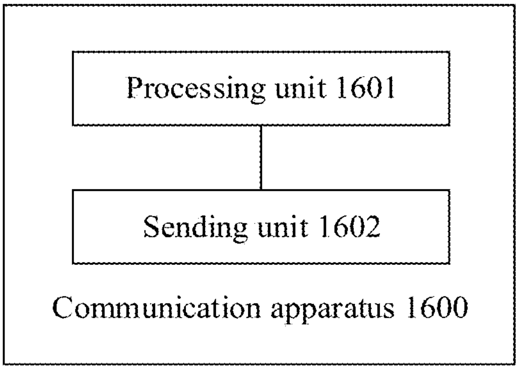
FIG. 16 is a schematic diagram of a structure of a communication apparatus according to an embodiment of this application.

Refer to FIG. 16. FIG. 16 is a schematic diagram of a structure of a PPDU communication apparatus according to an embodiment of this application. The communication apparatus 1600 includes a processing unit 1601 and a sending unit 1602. The communication apparatus 1600 is a PPDU sending apparatus. The communication apparatus 1600 may be a station or an access point. The processing unit 1601 may be understood as a processor of a communication apparatus, and the sending unit 1602 may be understood as a transmitter of a transceiver of the communication apparatus.

The processing unit 1601 is configured to generate a PPDU, where the PPDU includes a plurality of resource unit allocation subfields, the plurality of resource unit allocation subfields include a resource unit allocation subfield indicating a first MRU, a bandwidth for transmitting the PPDU includes consecutive 240 MHz, the first MRU includes a 996-tone RU and a 484-tone RU in the 240 MHz bandwidth, the resource unit allocation subfield indicating the first MRU further indicates frequency locations of the 996-tone RU and the 484-tone RU in a 160 MHz subblock to which the first MRU belongs, and a resource unit allocation subfield indicating the first MRU in a resource unit allocation subfield corresponding to the lowest 80 MHz frequency and/or a resource unit allocation subfield corresponding to the highest 80 MHz frequency in the 240 MHz bandwidth is for determining or indicating frequency locations of the 996-tone RU and the 484-tone RU in the 240 MHz bandwidth.

The sending unit 1602 is configured to send the PPDU.

It should be understood that this solution may be applied to a scenario in which the 240 MHz bandwidth includes one first MRU, or may be applied to a scenario in which the 240 MHz bandwidth includes two first MRUs.

In such a solution, when determining frequency locations of a 996-tone RU and a 484-tone RU that form a 996+484-tone RU or a 484+996-tone RU, the communication apparatus 1600 skips a resource unit allocation subfield corresponding to the second lowest 80 MHz frequency in the 240 MHz bandwidth, and can accurately determine, based on the resource unit allocation subfield corresponding to the lowest 80 MHz frequency and/or the resource unit allocation subfield corresponding to the highest 80 MHz frequency, frequency locations, in the 240 MHz bandwidth, of the 996-tone RU and the 484-tone RU that form the 996+484-tone RU or the 484+996-tone RU, thereby allocating an MRU obtained by combining a 996-tone RU and a 484-tone RU to one or more users.

Figure 17:
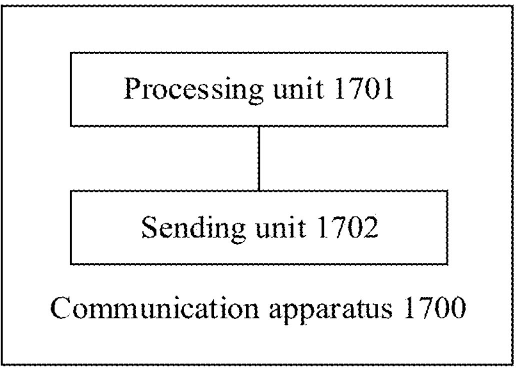
FIG. 17 is a schematic diagram of a structure of a communication apparatus according to an embodiment of this application.

Refer to FIG. 17. FIG. 17 is a schematic diagram of a structure of a PPDU communication apparatus according to an embodiment of this application. The communication apparatus 1700 includes a processing unit 1701 and a sending unit 1702. The communication apparatus 1700 is a PPDU sending apparatus. The communication apparatus 1700 may be a station or an access point. The processing unit 1701 may be understood as a processor of a communication apparatus, and the sending unit 1702 may be understood as a transmitter of a transceiver of the communication apparatus.

The processing unit 1701 is configured to generate a PPDU, where the PPDU includes a plurality of resource unit allocation subfields, the plurality of resource unit allocation subfields include a resource unit allocation subfield indicating a first MRU, a bandwidth for transmitting the PPDU includes consecutive 240 MHz, the first MRU includes a 996-tone RU and a 484-tone RU in the 240 MHz bandwidth, the resource unit allocation subfield indicating the first MRU further indicates frequency locations of the 996-tone RU and the 484-tone RU in a 160 MHz subblock to which the first MRU belongs and a location of the 160 MHz subblock in the 240 MHz bandwidth, and a resource unit allocation subfield indicating the first MRU in a resource unit allocation subfield corresponding to the second lowest 80 MHz frequency in the 240 MHz bandwidth is for determining or indicating frequency locations of the 996-tone RU and the 484-tone RU in the 240 MHz bandwidth.

The sending unit 1702 is configured to send the PPDU.

In such a solution, when determining frequency locations of a 996-tone RU and a 484-tone RU that form a 996+484-tone RU or a 484+996-tone RU, the communication apparatus 1700 can accurately determine, based on the resource unit allocation subfield corresponding to the second lowest 80 MHz frequency and/or a resource unit allocation subfield corresponding to the highest 80 MHz frequency, frequency locations, in the 240 MHz bandwidth, of the 996-tone RU and the 484-tone RU that form the 996+484-tone RU or the 484+996-tone RU, thereby allocating an MRU obtained by combining a 996-tone RU and a 484-tone RU to one or more users.

Figure 18:
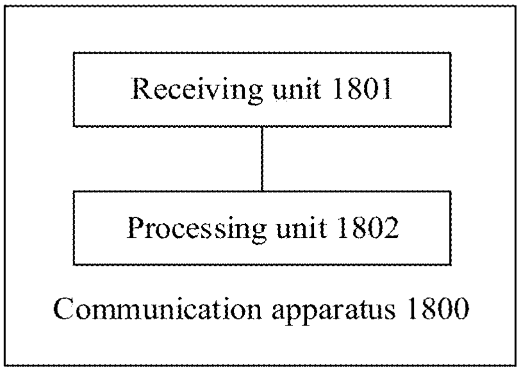
FIG. 18 is a schematic diagram of a structure of a communication apparatus according to an embodiment of this application.

Refer to FIG. 18. FIG. 18 is a schematic diagram of a structure of a PPDU communication apparatus according to an embodiment of this application. The communication apparatus 1800 includes a receiving unit 1801 and a processing unit 1802. The communication apparatus 1800 is a PPDU receiving apparatus. The communication apparatus may be a station or an access point. The receiving unit 1801 may be understood as a receiver of a transceiver of a communication apparatus, and the processing unit 1802 may be understood as a processor of the communication apparatus.

The receiving unit 1801 is configured to receive a PPDU, where the PPDU includes a plurality of resource unit allocation subfields, the plurality of resource unit allocation subfields include a resource unit allocation subfield corresponding to an MRU, the resource unit allocation subfield corresponding to the MRU indicates that a 242-tone RU corresponding to the resource unit allocation subfield belongs to the MRU, and a number of resource unit allocation subfields corresponding to the MRU in a resource unit allocation subfield corresponding to each 80 MHz subblock in a plurality of 80 MHz subblocks in a bandwidth for transmitting the PPDU is for determining a type of the MRU.

The processing unit 1802 is configured to parse at least a part of resource unit allocation subfields in the plurality of resource unit allocation subfields, to determine RUs that form an MRU.

It may be understood that the MRU indicated by the resource unit allocation subfield is an MRU included in the bandwidth for transmitting the PPDU. Specifically, the communication apparatus may determine, based on the number of resource unit allocation subfields corresponding to the MRU in the resource unit allocation subfield corresponding to each 80 MHz subblock in the plurality of 80 MHz subblocks in the bandwidth for transmitting the PPDU, which type of MRU is included in the bandwidth for transmitting the PPDU.

In this way, a resource unit allocation subfield indication manner is simple, and the communication apparatus 1900 can determine, based on a resource unit allocation subfield, which type of MRU is included in the bandwidth for transmitting the PPDU. This can implement combination of a plurality of RUs into one MRU and allocation of the MRU to one or more users.

Figure 19:
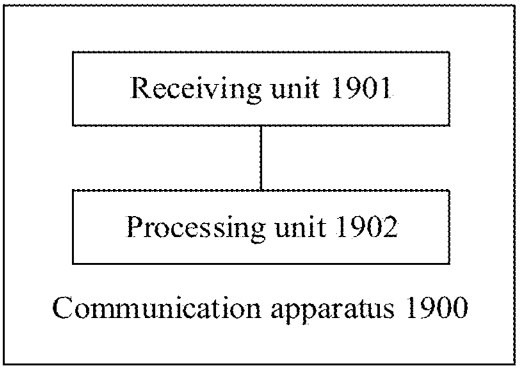
FIG. 19 is a schematic diagram of a structure of a communication apparatus according to an embodiment of this application.

Refer to FIG. 19. FIG. 19 is a schematic diagram of a structure of a PPDU communication apparatus according to an embodiment of this application. The communication apparatus 1900 includes a receiving unit 1901 and a processing unit 1902. The communication apparatus 1900 is a PPDU receiving apparatus. The communication apparatus may be a station or an access point. The receiving unit 1901 may be understood as a receiver of a transceiver of a communication apparatus, and the processing unit 1902 may be understood as a processor of the communication apparatus.

The receiving unit 1901 is configured to receive a PPDU, where the PPDU includes a plurality of resource unit allocation subfields, the plurality of resource unit allocation subfields include a resource unit allocation subfield indicating two first MRUs, a 240 MHz bandwidth to which the two first MRUs belong is consecutive 240 MHz in a bandwidth for transmitting the PPDU, and frequency locations, in the 240 MHz bandwidth, of a 996-tone RU and a 484-tone RU that form each of the first RUs are set according to a standard.

The processing unit 1902 is configured to parse at least a part of resource unit allocation subfields in the plurality of resource unit allocation subfields, to determine RUs that form an MRU.

In such a solution, the communication standard specifies the frequency locations, in the 240 MHz bandwidth, of the 996-tone RU and the 484-tone RU that form each first MRU, and the communication apparatus can determine, based on the resource unit allocation subfield, that the bandwidth for transmitting the PPDU includes two first MRUs, and can accurately determine the frequency locations, in the 240 MHz bandwidth, of the 996-tone RU and the 484-tone RU that form each first MRU, thereby allocating an MRU obtained by combining a 996-tone RU and a 484-tone RU to one or more users. In addition, in such a solution, different combination cases do not need to be indicated by different indices of a resource unit allocation subfield, and a number of indices used for the resource unit allocation subfield to indicate a 996+484-tone RU and a 484+996-tone RU can be reduced.

Figure 20:
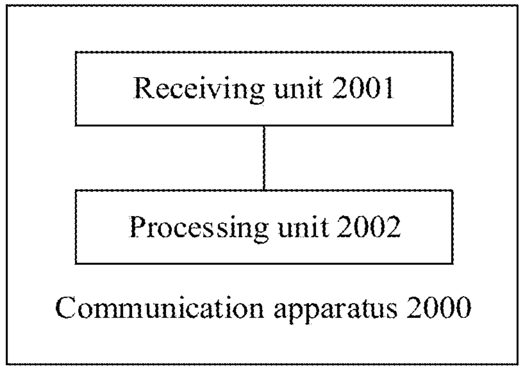
FIG. 20 is a schematic diagram of a structure of a communication apparatus according to an embodiment of this application.

Refer to FIG. 20. FIG. 20 is a schematic diagram of a structure of a PPDU communication apparatus according to an embodiment of this application. The communication apparatus 2000 includes a receiving unit 2001 and a processing unit 2002. The communication apparatus 2000 is a PPDU receiving apparatus. The communication apparatus may be a station or an access point. The receiving unit 2001 may be understood as a receiver of a transceiver of a communication apparatus, and the processing unit 2002 may be understood as a processor of the communication apparatus.

The receiving unit 2001 is configured to receive a PPDU, where the PPDU includes a plurality of resource unit allocation subfields, the plurality of resource unit allocation subfields include a resource unit allocation subfield indicating a first MRU and a resource unit allocation subfield indicating a second MRU, and frequency locations, in a bandwidth for transmitting the PPDU, of a 996-tone RU and a 484-tone RU that form the first RU and a 2*996-tone RU and a 484-tone RU that form the second MRU are set according to a standard.

The processing unit 2002 is configured to parse at least a part of resource unit allocation subfields in the plurality of resource unit allocation subfields, to determine RUs that form an MRU.

In such a solution, the standard specifies the frequency locations, in a 320 MHz bandwidth, of the 996-tone RU and the 484-tone RU that form the first RU and the 2*996-tone RU and the 484-tone RU that form the second MRU. The communication apparatus 2000 can determine, based on the resource unit allocation subfields, that the bandwidth for transmitting the PPDU includes the first MRU and the second MRU, and can accurately determine the frequency locations, in the 320 MHz bandwidth, of the 996-tone RU and the 484-tone RU that form the first RU and the 2*996-tone RU and the 484-tone RU that form the second MRU, thereby allocating an MRU obtained by combining a 2*996-tone RU and a 484-tone RU to one or more users. In addition, in such a solution, different combination cases do not need to be indicated by different indices of a resource unit allocation subfield, and a number of indices used for the resource unit allocation subfield to indicate a 2*996+484-tone RU and a 484+2*996-tone RU can be reduced.

Figure 21:
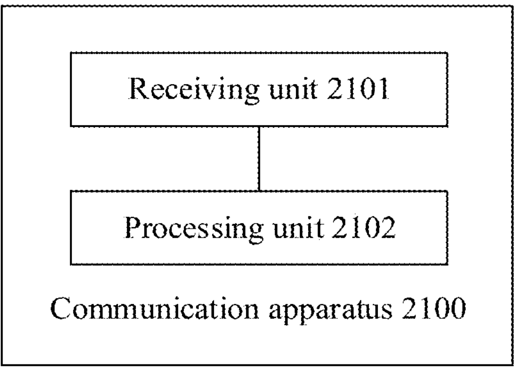
FIG. 21 is a schematic diagram of a structure of a communication apparatus according to an embodiment of this application.

Refer to FIG. 21. FIG. 21 is a schematic diagram of a structure of a PPDU communication apparatus according to an embodiment of this application. The communication apparatus 2100 includes a receiving unit 2101 and a processing unit 2102. The communication apparatus 2100 is a PPDU receiving apparatus. The communication apparatus may be a station or an access point. The receiving unit 2201 may be understood as a receiver of a transceiver of a communication apparatus, and the processing unit 2202 may be understood as a processor of the communication apparatus.

The receiving unit 2101 is configured to receive a PPDU, where the PPDU includes a plurality of resource unit allocation subfields, the plurality of resource unit allocation subfields include a resource unit allocation subfield indicating a first MRU, the first MRU consists of a 996-tone RU and a 484-tone RU, and a frequency location of a 160 MHz subblock to which the first MRU belongs in a bandwidth for transmitting the PPDU is a frequency location that is set according to a standard or is a frequency location indicated by indication information sent by an AP.

The processing unit 2102 is configured to parse at least a part of resource unit allocation subfields in the plurality of resource unit allocation subfields, to determine RUs that form an MRU.

In this way, the communication apparatus 2100 can determine, based on the resource unit allocation subfields, that the bandwidth for transmitting the PPDU includes an MRU including the 996-tone RU and the 484-tone RU, and can accurately determine that a 996+484-tone RU or a 484+996-tone RU includes a 996-tone RU and a 484-tone RU of which 160 MHz subblock, thereby allocating an MRU obtained by combining a 996-tone RU and a 484-tone RU to one or more users. In addition, in such a solution, different combination cases do not need to be indicated by different indices of a resource unit allocation subfield, and a number of indices used for the resource unit allocation subfield to indicate a 996+484-tone RU and a 484+996-tone RU can be reduced.

Figure 22:
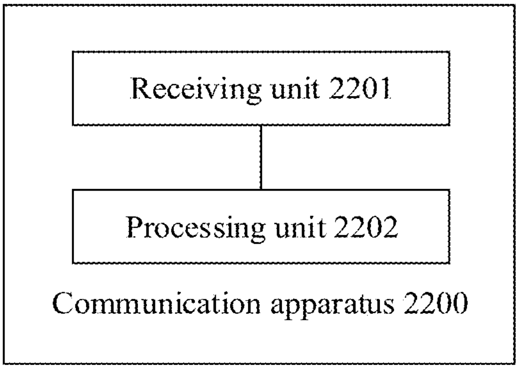
FIG. 22 is a schematic diagram of a structure of a communication apparatus according to an embodiment of this application.

Refer to FIG. 22. FIG. 22 is a schematic diagram of a structure of a PPDU communication apparatus according to an embodiment of this application. The communication apparatus 2200 includes a receiving unit 2201 and a processing unit 2202. The communication apparatus 2200 is a PPDU receiving apparatus. The communication apparatus may be a station or an access point. The receiving unit 2201 may be understood as a receiver of a transceiver of a communication apparatus, and the processing unit 2202 may be understood as a processor of the communication apparatus.

The receiving unit 2201 is configured to receive a PPDU, where the PPDU includes a plurality of resource unit allocation subfields, the plurality of resource unit allocation subfields include a resource unit allocation subfield indicating a first MRU, a bandwidth for transmitting the PPDU includes consecutive 240 MHz, the first MRU includes a 996-tone RU and a 484-tone RU in the 240 MHz bandwidth, the resource unit allocation subfield indicating the first MRU further indicates frequency locations of the 996-tone RU and the 484-tone RU in a 160 MHz subblock to which the first MRU belongs, and a resource unit allocation subfield indicating the first MRU in a resource unit allocation subfield corresponding to the lowest 80 MHz frequency and/or a resource unit allocation subfield corresponding to the highest 80 MHz frequency in the 240 MHz bandwidth is for determining or indicating frequency locations of the 996-tone RU and the 484-tone RU in the 240 MHz bandwidth.

The processing unit 2202 is configured to parse at least a part of resource unit allocation subfields in the plurality of resource unit allocation subfields, to determine RUs that form an MRU.

Specifically, the processing unit 2202 of the communication apparatus can determine, based on the resource unit allocation subfield corresponding to the lowest 80 MHz frequency and the resource unit allocation field corresponding to the highest 80 MHz frequency, the frequency locations, in the 240 MHz bandwidth, of the 996-tone RU and the 484-tone RU that form the first MRU, that is, determine RUs at which frequency locations in the 240 MHz bandwidth the RUs that form the first MRU are.

In such a solution, when determining frequency locations of a 996-tone RU and a 484-tone RU that form a 996+484-tone RU or a 484+996-tone RU, the communication apparatus 2200 skips a resource unit allocation subfield corresponding to the second lowest 80 MHz frequency in the 240 MHz bandwidth, and can accurately determine, based on the resource unit allocation subfield corresponding to the lowest 80 MHz frequency and/or the resource unit allocation subfield corresponding to the highest 80 MHz frequency, frequency locations, in the 240 MHz bandwidth, of the 996-tone RU and the 484-tone RU that form the 996+484-tone RU or the 484+996-tone RU, thereby allocating an MRU obtained by combining a 996-tone RU and a 484-tone RU to one or more users.

Figure 23:
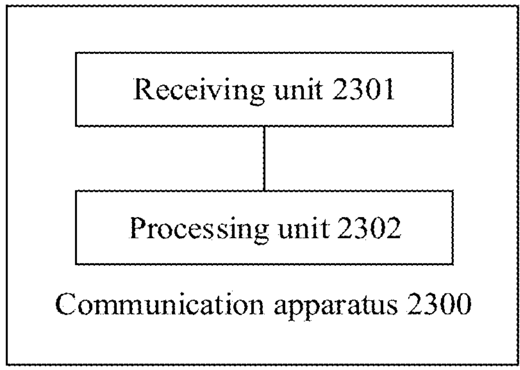
FIG. 23 is a schematic diagram of a structure of a communication apparatus according to an embodiment of this application.

Refer to FIG. 23. FIG. 23 is a schematic diagram of a structure of a PPDU communication apparatus according to an embodiment of this application. The communication apparatus 2300 includes a receiving unit 2301 and a processing unit 2302. The communication apparatus 2300 is a PPDU receiving apparatus. The communication apparatus may be a station or an access point. The receiving unit 2301 may be understood as a receiver of a transceiver of a communication apparatus, and the processing unit 2302 may be understood as a processor of the communication apparatus.

The receiving unit 2301 is configured to receive a PPDU, where the PPDU includes a plurality of resource unit allocation subfields, the plurality of resource unit allocation subfields include a resource unit allocation subfield indicating a first MRU, a bandwidth for transmitting the PPDU includes consecutive 240 MHz, the first MRU includes a 996-tone RU and a 484-tone RU in the 240 MHz bandwidth, the resource unit allocation subfield indicating the first MRU further indicates frequency locations of the 996-tone RU and the 484-tone RU in a 160 MHz subblock to which the first MRU belongs and a location of the 160 MHz subblock in the 240 MHz bandwidth, and a resource unit allocation subfield indicating the first MRU in a resource unit allocation subfield corresponding to the second lowest 80 MHz frequency in the 240 MHz bandwidth is for determining or indicating frequency locations of the 996-tone RU and the 484-tone RU in the 240 MHz bandwidth.

The processing unit 2302 is configured to parse at least a part of resource unit allocation subfields in the plurality of resource unit allocation subfields, to determine RUs that form an MRU.

Specifically, the communication apparatus can determine, based on the resource unit allocation subfield corresponding to the second lowest 80 MHz frequency and a resource unit allocation field corresponding to the highest 80 MHz frequency, the frequency locations, in the 240 MHz bandwidth, of the 996-tone RU and the 484-tone RU that form the first MRU, that is, determine RUs at which frequency locations in the 240 MHz bandwidth the RUs that form the first MRU are.

It should be understood that this solution may be applied to a scenario in which the 240 MHz bandwidth includes one first MRU, or may be applied to a scenario in which the 240 MHz bandwidth includes two first MRUs.

In such a solution, when determining frequency locations of a 996-tone RU and a 484-tone RU that form a 996+484-tone RU or a 484+996-tone RU, the communication apparatus can accurately determine, based on the resource unit allocation subfield corresponding to the second lowest 80 MHz frequency and/or a resource unit allocation subfield corresponding to the highest 80 MHz frequency, frequency locations, in the 240 MHz bandwidth, of the 996-tone RU and the 484-tone RU that form the 996+484-tone RU or the 484+996-tone RU, thereby allocating an MRU obtained by combining a 996-tone RU and a 484-tone RU to one or more users.

For related content of the foregoing communication apparatus embodiments, refer to related content of the foregoing method embodiments. Details are not described herein again.

A person skilled in the art may further understand that various illustrative logical blocks (illustrative logical blocks) and steps (steps) that are listed in the embodiments of this application may be implemented by electronic hardware, computer software, or a combination thereof. Whether the functions are implemented by hardware or software depends on a particular application and a design requirement of the entire system. A person skilled in the art may use various methods to implement the described functions for each particular application, but it should not be considered that the implementation goes beyond the scope of the embodiments of this application.

This application further provides a computer-readable storage medium. The computer-readable storage medium stores a computer program, and when the computer-readable storage medium is executed by a computer, a function of any one of the foregoing method embodiments is implemented.

This application further provides a computer program product including instructions. When the computer program product is executed by a computer, a function in any one of the foregoing method embodiments is implemented.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high density digital video disc (digital video disc, DVD)), a semiconductor medium (for example, a solid state drive (solid state disk, SSD)), or the like.

A person of ordinary skill in the art may understand that various reference numerals such as “first” and “second” in this application are merely used for differentiation for ease of description, and are not used to limit a scope of the embodiments of this application, or represent a sequence.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

“Predefine” in this application may be understood as “define”, “predefine”, “store”, “pre-store”, “pre-negotiate”, “pre-configure”, “solidify”, or “pre-burn”.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method in a wireless local area network, comprising:

generating a physical layer protocol data unit (PPDU), wherein the PPDU comprises a signal field; and sending the PPDU; wherein:

the signal field comprises a common field, and the common field comprises a plurality of resource unit allocation subfields;

each of the plurality of resource unit allocation subfields corresponds to one 242-tone resource unit (RU) in a frequency domain resource;

the resource unit allocation subfield of the plurality of resource unit allocation subfields comprises an index, and wherein the index indicates information of a multiple resource unit (MRU) in which the 242-tone RU corresponding to the resource unit allocation subfield is located, and indicates a quantity of user fields corresponding to the resource unit allocation subfield in a content channel in which the resource unit allocation subfield is located; and the MRU is formed by two or more RUs whose sizes are greater than or equal to 242 tones, and is one of the following MRUs:

an MRU formed by a 484-tone RU and a 242-tone RU;

an MRU formed by a 484-tone RU and a 996-tone RU;

an MRU formed by a 484-tone RU and a 2*996-tone RU;

an MRU formed by a 484-tone RU and a 3*996-tone RU; or an MRU formed by three 996-tone RUs, and wherein the information of the MRU comprises a RU number of a corresponding 242-tone RU, 484-tone RU, or 996-tone RU forming the MRU, and the RU number indicates a frequency location of the corresponding 242-tone RU, 484-tone RU, or 996-tone RU, and multiple 242-tone RUs have respective RU numbers, and the respective RU numbers of the multiple 242-tone RUs are sequentially numbered in an ascending order of absolute frequencies.

2. The method according to claim 1, wherein:

the information of the MRU comprises a frequency location of a RU forming the MRU.

3. The method according to claim 1, wherein the MRU is an MRU formed by a 484-tone RU and a 996-tone RU in a 160 MHz channel in the wireless local area network, and the resource unit allocation subfield specifically indicates RU sequence numbers of the 484-tone RU and the 996-tone RU that form the MRU in the 160 MHz channel in which the MRU is located.

4. The method according to claim 1, wherein the MRU is an MRU formed by a 242-tone RU and a 484-tone RU in an 80 MHz channel in the wireless local area network, and the resource unit allocation subfield specifically indicates RU sequence numbers of the 242-tone RU and the 484-tone RU that form the MRU in the 80 MHz channel in which the MRU is located.

5. The method according to claim 1, wherein the MRU is an MRU formed by two 996-tone RUs and a 484-tone RU in a 240 MHz channel in the wireless local area network, and the resource unit allocation subfield specifically indicates RU sequence numbers of the 484-tone RU and the 996-tone RUs that form the MRU in the 240 MHz channel in which the MRU is located.

6. An apparatus, comprising:

at least one processor; a transceiver; and at least one memory coupled to the at least one processor and storing programming instructions for execution by the at least one processor and causing the apparatus to perform operations comprising:

generating a physical layer protocol data unit (PPDU), wherein the PPDU comprises a signal field; and sending the PPDU, wherein:

the signal field comprises a common field, and the common field comprises a plurality of resource unit allocation subfields;

each of the plurality of resource unit allocation subfields corresponds to one 242-tone resource unit (RU) in a frequency domain resource;

the resource unit allocation subfield of the plurality of resource unit allocation subfields comprises an index, and wherein the index indicates information of a multiple resource unit (MRU) in which the 242-tone RU corresponding to the resource unit allocation subfield is located, and indicates a quantity of user fields corresponding to the resource unit allocation subfield in a content channel in which the resource unit allocation subfield is located; and the MRU is formed by two or more RUs whose sizes are greater than or equal to 242 tones, and is one of the following MRUs:

an MRU formed by a 484-tone RU and a 242-tone RU;

an MRU formed by a 484-tone RU and a 996-tone RU;

an MRU formed by a 484-tone RU and a 2*996-tone RU;

an MRU formed by a 484-tone RU and a 3*996-tone RU; or an MRU formed by three 996-tone RUs, and wherein the information of the MRU comprises a RU number of a corresponding 242-tone RU, 484-tone RU, or 996-tone RU forming the MRU, and the RU number indicates a frequency location of the corresponding 242-tone RU, 484-tone RU, or 996-tone RU, and multiple 242-tone RUs have respective RU numbers, and the respective RU numbers of the multiple 242-tone RUs are sequentially numbered in an ascending order of absolute frequencies.

7. The apparatus according to claim 6, wherein:

the information of the MRU comprises a frequency location of a RU forming the MRU.

8. The apparatus according to claim 6, wherein the MRU is an MRU formed by a 484-tone RU and a 996-tone RU in a 160 MHz channel, and the resource unit allocation subfield specifically indicates RU sequence numbers of the 484-tone RU and the 996-tone RU that form the MRU in the 160 MHz channel in which the MRU is located.

9. The apparatus according to claim 6, wherein the MRU is an MRU formed by a 242-tone RU and a 484-tone RU in an 80 MHz channel, and the resource unit allocation subfield specifically indicates RU sequence numbers of the 242-tone RU and the 484-tone RU that form the MRU in the 80 MHz channel in which the MRU is located.

10. The apparatus according to claim 6, wherein the MRU is an MRU formed by two 996-tone RUs and a 484-tone RU in a 240 MHz channel, and the resource unit allocation subfield specifically indicates RU sequence numbers of the 484-tone RU and the 996-tone RUs that form the MRU in the 240 MHz channel in which the MRU is located.

11. A non-transitory computer-readable storage medium, wherein the non-transitory computer-readable storage medium stores computer instructions, and the computer instructions indicate a communication apparatus to perform operations comprising:

generating a physical layer protocol data unit (PPDU), wherein the PPDU comprises a signal field; and sending the PPDU; wherein:

the signal field comprises a common field, and the common field comprises a plurality of resource unit allocation subfields;

each of the plurality of resource unit allocation subfields corresponds to one 242-tone resource unit (RU) in a frequency domain resource;

the resource unit allocation subfield of the plurality of resource unit allocation subfields comprises an index, and wherein the index indicates information of a multiple resource unit (MRU) in which the 242-tone RU corresponding to the resource unit allocation subfield is located, and indicates a quantity of user fields corresponding to the resource unit allocation subfield in a content channel in which the resource unit allocation subfield is located; and the MRU is formed by two or more RUs whose sizes are greater than or equal to 242 tones, and is one of the following MRUs:

an MRU formed by a 484-tone RU and a 242-tone RU;

an MRU formed by a 484-tone RU and a 996-tone RU;

an MRU formed by a 484-tone RU and a 2*996-tone RU;

an MRU formed by a 484-tone RU and a 3*996-tone RU; or an MRU formed by three 996-tone RUs, and wherein the information of the MRU comprises a RU number of a corresponding 242-tone RU, 484-tone RU, or 996-tone RU forming the MRU, and the RU number indicates a frequency location of the corresponding 242-tone RU, 484-tone RU, or 996-tone RU, and multiple 242-tone RUs have respective RU numbers, and the respective RU numbers of the multiple 242-tone RUs are sequentially numbered in an ascending order of absolute frequencies.

12. The non-transitory computer-readable storage medium according to claim 11, wherein:

the information of the MRU comprises a frequency location of a RU forming the MRU.

13. The non-transitory computer-readable storage medium according to claim 11, wherein the MRU is an MRU formed by a 484-tone RU and a 996-tone RU in a 160 MHz channel, and the resource unit allocation subfield specifically indicates RU sequence numbers of the 484-tone RU and the 996-tone RU that form the MRU in the 160 MHz channel in which the MRU is located.

14. The non-transitory computer-readable storage medium according to claim 11, wherein the MRU is an MRU formed by a 242-tone RU and a 484-tone RU in an 80 MHz channel, and the resource unit allocation subfield specifically indicates RU sequence numbers of the 242-tone RU and the 484-tone RU that form the MRU in the 80 MHz channel in which the MRU is located.

15. The non-transitory computer-readable storage medium according to claim 11, wherein the MRU is an MRU formed by two 996-tone RUs and a 484-tone RU in a 240 MHz channel, and the resource unit allocation subfield specifically indicates RU sequence numbers of the 484-tone RU and the 996-tone RUs that form the MRU in the 240 MHz channel in which the MRU is located.

* * * * *